US009570032B2

(12) United States Patent
Kimura et al.

(10) Patent No.: US 9,570,032 B2
(45) Date of Patent: Feb. 14, 2017

(54) DISPLAY DEVICE, LIQUID CRYSTAL DISPLAY DEVICE AND ELECTRONIC DEVICE INCLUDING THE SAME

(71) Applicant: SEMICONDUCTOR ENERGY LABORATORY CO., LTD., Atsugi-shi, Kanagawa-ken (JP)

(72) Inventors: Hajime Kimura, Kanagawa (JP); Atsushi Umezaki, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 14/855,932

(22) Filed: Sep. 16, 2015

(65) Prior Publication Data

US 2016/0005373 A1 Jan. 7, 2016

Related U.S. Application Data

(62) Division of application No. 12/478,129, filed on Jun. 4, 2009, now Pat. No. 9,142,179.

(30) Foreign Application Priority Data

Jun. 9, 2008 (JP) ................................. 2008-150608

(51) Int. Cl.
*G06F 3/038* (2013.01)
*G09G 3/36* (2006.01)

(52) U.S. Cl.
CPC .......... *G09G 3/3688* (2013.01); *G09G 3/3607* (2013.01); *G09G 3/3655* (2013.01);
(Continued)

(58) Field of Classification Search
CPC ................. G09G 2310/027; G09G 2310/0297; G09G 3/3688; G09G 3/3696; G09G 2320/068; G09G 2320/0673; G09G 2330/021; G09G 2330/02
(Continued)

(56) References Cited

U.S. PATENT DOCUMENTS 4,806,923 A 2/1989 Yanai et al.
5,574,475 A 11/1996 Callahan et al.
(Continued)

FOREIGN PATENT DOCUMENTS

CN 001404602 A 3/2003
CN 001405745 A 3/2003
(Continued)

OTHER PUBLICATIONS

Kim.S, "66.1: Invited Paper: The World's Largest (82-In.) TFT-LCD", SID Digest '05 : SID International Symposium Digest of Technical Papers, May 24, 2005, vol. 36, pp. 1842-1847.
(Continued)

*Primary Examiner* — Towfiq Elahi
(74) *Attorney, Agent, or Firm* — Nixon Peabody LLP; Jeffrey L. Costellia

(57) ABSTRACT

A liquid crystal display device includes a pixel having a first to nth (n is a natural number of 2 or more) subpixels and a circuit. To the circuit, N (N is a natural number of 2 or more) wirings for supplying a digital signal with N bits and first to nth wiring groups having M (M is a natural number of 2 or more) wirings for supplying M different voltages are electrically connected. The liquid crystal display device has a function of converting the digital signal into n analog signals by using the M voltages supplied to the first to nth wiring groups and inputting the n analog signals to first to nth subpixels. The first to nth subpixels each include an electrode for driving a liquid crystal element.

9 Claims, 16 Drawing Sheets

(52) U.S. Cl.
CPC ..... *G09G 3/3696* (2013.01); *G09G 2310/027* (2013.01); *G09G 2320/068* (2013.01); *G09G 2320/0673* (2013.01); *G09G 2330/023* (2013.01)

(58) Field of Classification Search
USPC .......................................................... 345/211
See application file for complete search history.

(56) References Cited

U.S. PATENT DOCUMENTS

| | | | |
|---|---|---|---|
| 5,856,818 | A | 1/1999 | Oh et al. |
| 6,388,653 | B1 | 5/2002 | Goto et al. |
| 6,628,253 | B1 | 9/2003 | Hiroki |
| 6,806,859 | B1 | 10/2004 | Kanoh et al. |
| 6,952,194 | B1 | 10/2005 | Yamazaki et al. |
| 7,023,458 | B2 | 4/2006 | Kudo et al. |
| 7,110,011 | B2 | 9/2006 | Yamaguchi et al. |
| 7,116,297 | B2 | 10/2006 | Koga et al. |
| 7,119,775 | B2 | 10/2006 | Ozaki |
| 7,123,228 | B2 | 10/2006 | Ozaki |
| 7,145,536 | B1 | 12/2006 | Yamazaki et al. |
| 7,193,637 | B2 | 3/2007 | Kudo et al. |
| 7,202,845 | B2 | 4/2007 | Koga et al. |
| 7,221,304 | B2 | 5/2007 | Yen |
| 7,365,805 | B2 | 4/2008 | Maekawa et al. |
| 7,511,693 | B2 | 3/2009 | Kudo et al. |
| 7,612,788 | B2 | 11/2009 | Chang et al. |
| 7,750,900 | B2 | 7/2010 | Tsuchi et al. |
| 7,817,124 | B2 | 10/2010 | Shin et al. |
| 7,855,720 | B2 | 12/2010 | Yoshioka et al. |
| 7,898,623 | B2 | 3/2011 | Kimura et al. |
| 7,952,565 | B2 | 5/2011 | Park et al. |
| 7,982,702 | B2 | 7/2011 | Kamada et al. |
| 8,009,132 | B2 | 8/2011 | Shin et al. |
| 8,120,561 | B2 | 2/2012 | Kudo et al. |
| 8,154,497 | B2 | 4/2012 | Lee et al. |
| 8,154,678 | B2 | 4/2012 | Kimura et al. |
| 8,207,923 | B2 | 6/2012 | Shin et al. |
| 8,264,446 | B2 | 9/2012 | Lee et al. |
| 8,339,530 | B2 | 12/2012 | Kimura et al. |
| 8,587,742 | B2 | 11/2013 | Kimura et al. |
| 8,941,789 | B2 | 1/2015 | Yoo et al. |
| 2002/0004216 | A1 | 1/2002 | Abbott et al. |
| 2002/0186230 | A1 | 12/2002 | Kudo et al. |
| 2003/0011553 | A1 | 1/2003 | Ozaki |
| 2004/0085277 | A1 | 5/2004 | Yamaguchi et al. |
| 2004/0104878 | A1 | 6/2004 | Tsutsui et al. |
| 2004/0125067 | A1 | 7/2004 | Kim et al. |
| 2006/0125761 | A1* | 6/2006 | Ahn ..................... G09G 3/3685 345/98 |
| 2006/0158420 | A1* | 7/2006 | Chang .................. G09G 3/3688 345/100 |
| 2006/0164352 | A1 | 7/2006 | Yoo et al. |
| 2006/0232534 | A1 | 10/2006 | Koga et al. |
| 2006/0279498 | A1 | 12/2006 | Kaneda et al. |
| 2007/0070008 | A1 | 3/2007 | Shin et al. |
| 2007/0075952 | A1 | 4/2007 | Hamahashi et al. |
| 2007/0145893 | A1 | 6/2007 | Jung et al. |
| 2007/0195041 | A1 | 8/2007 | Lee |
| 2007/0241952 | A1 | 10/2007 | Kim et al. |
| 2008/0001635 | A1 | 1/2008 | Miyake |
| 2008/0042992 | A1 | 2/2008 | Kim |
| 2008/0316077 | A1 | 12/2008 | Matsuo |
| 2012/0139972 | A1 | 6/2012 | Kudo et al. |
| 2015/0241740 | A1 | 8/2015 | Yoo et al. |

FOREIGN PATENT DOCUMENTS

| | | | |
|---|---|---|---|
| CN | 001475854 | A | 2/2004 |
| CN | 001936682 | A | 3/2007 |
| EP | 1345202 | A | 9/2003 |
| EP | 1385139 | A | 1/2004 |
| JP | 61-165734 | A | 7/1986 |
| JP | 61-219992 | A | 9/1986 |
| JP | 09-026765 | A | 1/1997 |
| JP | 09-102049 | A | 4/1997 |
| JP | 11-311971 | A | 11/1999 |
| JP | 2000-338918 | A | 12/2000 |
| JP | 2003-050566 | A | 2/2003 |
| JP | 2003-098998 | A | 4/2003 |
| JP | 2003-308048 | A | 10/2003 |
| JP | 2005-316211 | A | 11/2005 |
| JP | 2006-201757 | A | 8/2006 |
| JP | 2006-209135 | A | 8/2006 |
| JP | 2006-270858 | A | 10/2006 |
| JP | 2007-025701 | A | 2/2007 |
| JP | 2007-041578 | A | 2/2007 |
| JP | 2007-058217 | A | 3/2007 |
| JP | 2007-101630 | A | 4/2007 |
| JP | 2007-124606 | A | 5/2007 |
| JP | 2007-226196 | A | 9/2007 |
| JP | 2008-034955 | A | 2/2008 |
| JP | 2008-047125 | A | 2/2008 |
| JP | 2008-085711 | A | 4/2008 |
| KR | 2006-0083650 | A | 7/2006 |
| KR | 2007-0034145 | A | 3/2007 |
| KR | 2007-0088011 | A | 8/2007 |
| TW | 200528825 | | 9/2005 |
| TW | 200632492 | | 9/2006 |
| WO | WO-2006/070507 | | 7/2006 |

OTHER PUBLICATIONS

Itakura.T et al., "A 402-Output TFT-LCD Driver IC With Power Control Based on the Number of Colors Selected", IEEE Journal of Solid-State Circuits, Mar. 1, 2003, vol. 38, No. 3, pp. 503-510.
Search Report (Application No. 09161629.2) Dated Jun. 10, 2010.
European Office Action (Application No. 09161629.2) Dated May 31, 2012.
Chinese Office Action (Application No. 200910148960.1) Dated Sep. 5, 2012.
Chinese Office Action (Application No. 200910148960.1) Dated May 14, 2013.
Taiwanese Office Action (Application No. 98119081) Dated Jul. 11, 2014.
Korean Office Action (Application No. 2009-0050316) Dated Feb. 28, 2015.
Taiwanese Office Action (Application No. 104101545) Dated May 5, 2016.

* cited by examiner

DISPLAY DEVICE, LIQUID CRYSTAL DISPLAY DEVICE AND ELECTRONIC DEVICE INCLUDING THE SAME

BACKGROUND OF THE INVENTION

1. Field of the Invention

One embodiment of this invention relates to a display device or a driving method of the display device. In specific, one embodiment of this invention relates to a liquid crystal display device in which a pixel is divided into a plurality of subpixels and a driving method of the liquid crystal display device. Further, one embodiment of this invention relates to a liquid crystal display device or an electronic device including the liquid crystal display device in a display portion.

2. Description of the Related Art

Liquid crystal display devices are used for a variety of electronic products such as cell phones and television receiver and many research is conducted for further improvement in the quality.

While advantages of a liquid crystal display device are small size, light weight, and low power consumption compared to a CRT (cathode-ray tube) and, a problem of the liquid crystal display device is the narrow viewing angle. In recent years, many research about a multi domain method, that is, an alignment division method are made for improving viewing angle characteristics. For example, an MVA (multi-domain vertical alignment) mode which is a combination of a VA (vertical alignment) mode and a multi-domain mode, a PVA (patterned vertical alignment) mode, and the like can be given.

In addition, researches are made in which one pixel is divided into a plurality of subpixels and the alignment state of liquid crystals in each subpixel is made different so as to improve the viewing angle. However, since the pixel is divided into the plurality of subpixels, a plurality of signals needs to be input to one pixel. Therefore, the number of signals needed for driving a display device is increased. In view of this, research on conversion of a signal for one pixel into signals for respective subpixels is conducted (see Reference 1).

Reference 1: Japanese Published Patent Application No. 2007-226196

SUMMARY OF THE INVENTION

However, in a display device disclosed in Reference 1, signals corresponding to respective subpixels are generated outside a panel. Therefore, when the pixel is divided into a plurality of subpixels, the number of connection between the panel and an external component is largely increased. As a result, poor connection is generated in a connection portion between the panel and the external component, whereby a problem of decrease in reliability is concerned. Alternatively, an yield in production of the display device is decreased, whereby a problem of an increase in a cost is concerned. Alternatively, the number of connection between the panel and the external component is increased, whereby a problem in that it is difficult to obtain a high-definition display device is concerned.

Alternatively, in order to generate signals corresponding to respective subpixels, a look-up table is used in some cases. Accordingly, a problem in that it is difficult to form a part for generating the signals corresponding to the respective subpixels and the pixel over the same substrate is concerned.

Alternatively, in order to read the signals corresponding to the respective subpixels from a memory element in which the look-up table is stored, the memory element needs to be driven at high speed. Therefore, as the look-up table is read from the memory element, heat is generated, whereby power consumption is increased in some cases. Alternatively, since the memory element for storing the look-up table is needed, a cost is increased. Alternatively, a pathway from generating the signals corresponding to the respective subpixels to writing the signals to the respective subpixel is long, and a connection portion of the panel and the external component exists in the course of the pathway. Therefore, the signals are likely to be influenced by noise and display quality is decreased, which is a problem.

In view of the foregoing problems, one object is to convert one digital signal into a plurality of analog signals without using a look-up table. Alternatively, another object is to reduce the number of connection between a panel and an external component. Alternatively, another object is to increase reliability. Alternatively, another object is to improve an yield. Alternatively, another object is to reduce a cost. Alternatively, another object is to make a high-definition display portion. Alternatively, another object is to try to achieve a low price. Alternatively, another object is to make heat less likely to be generated. Alternatively, another object is to reduce power consumption. Alternatively, another object is to increase display quality by enhancing resistance to noise. Besides, another object is to provide a better display device or semiconductor device by using a variety of other means.

One embodiment of this invention relates to a display device in which a pixel is divided into a plurality of subpixels and a converter circuit for converting a signal for one pixel into signals for respective subpixels, for example, a digital-analog converter circuit, is included. In one feature of the structure of a digital-analog converter circuit of this invention, a wiring for supplying a signal for one pixel and a wiring group including wirings to which a plurality of voltages is supplied are electrically connected to each other. For example, one wiring group has a plurality of voltages corresponding to the gray level of one subpixel. Note that in the case where the pixel includes n subpixels, the number of wiring groups is n. For example, the digital-analog converter circuit selects any one of a plurality of voltages in an i-th (i is any one of 1 to n) wiring group and writes the one of the plurality of voltages to an i-th subpixel.

Note that each of a plurality of voltages (hereinafter also referred to as a gray-level voltage group) which is input to a plurality of wiring groups is generated in a reference driver (hereinafter also referred to as a gray-level voltage generation circuit). The digital-analog converter circuit includes or does not include the reference driver.

Note that one reference driver generates a plurality of gray-level voltage groups or a plurality of reference drivers each generate one gray-level voltage group.

Note that the pixel is not necessarily divided into a plurality of subpixels. It is also possible that the pixel is not divided into a plurality of subpixels in some cases.

Note that the term “group” is referred to as a bunch in many cases. For example, a voltage group is referred to as a plurality of voltages. As another example of the “group,” a wiring group is referred to as a plurality of wirings. As another example of the “group,” a current group is referred to as a plurality of currents. As another example of the “group,” a signal group is referred to as a plurality of signals.

Note that, for example, any one of a voltage group means any one of a plurality of voltages in one voltage group.

Similarly, for example, any one of a wiring group means a wiring, which is included in the wiring group, to which any one of a plurality of voltages is applied.

Note that, for example, a plurality of voltage groups means a plurality of bunches (groups) each of which has a plurality of voltages. Similarly, for example, a plurality of wiring groups means a plurality of bunches (groups) each of which includes a plurality of wirings.

One embodiment of this invention is a liquid crystal display device including a first to nth (n is a natural number of 2 or more) subpixels each provided with an electrode for driving a liquid crystal element, and a circuit having a function of converting a digital signal with N (N is a natural number of 2 or more) bits into n analog signals by using M (M is a natural number of 2 or more) different voltages supplied from first to nth wiring groups, and a function of inputting the n analog signals to the first to nth subpixels, respectively.

Another embodiment of this invention is a liquid crystal display device including a first to nth (n is a natural number of 2 or more) subpixels each provided with an electrode for driving a liquid crystal element, and first to nth circuits each having a function of converting a digital signal with N (N is a natural number of 2 or more) bits into an analog signal by using M (M is a natural number of 2 or more) different voltages supplied from a wiring group, and a function of inputting the analog signal to any one of the first to nth subpixels.

Another embodiment of this invention is a liquid crystal display device including a first subpixel and a second subpixel each provided with an electrode for driving a liquid crystal element, and a circuit having a function of converting a digital signal with N (N is a natural number of 2 or more) bits into a first analog signal and a second analog signal by using M (M is a natural number of 2 or more) different voltages supplied from a first wiring group and a second wiring group, and a function of inputting the first analog signal to the first subpixel and the second analog signal to the second subpixel.

Another embodiment of this invention is a liquid crystal display device including a first to nth (n is a natural number of 2 or more) subpixels each provided with an electrode for driving a liquid crystal element, a first circuit having a function of decoding a first digital signal with N (N is a natural number of 2 or more) bits and converting the first digital signal into a second digital signal, and n second circuits each having a function of converting the second digital signal into an analog signal by using M (M is a natural number of 2 or more) different voltages supplied from a wiring group, and a function of inputting the analog signal to any one of the first to nth subpixels.

Another embodiment of this invention is a liquid crystal display device including a first subpixel and a second subpixel each provided with an electrode for driving a liquid crystal element, a first circuit having a function of decoding a first digital signal with N (N is a natural number of 2 or more) bits and converting the first digital signal into a second digital signal, and two second circuits each having a function of converting the second digital signal into an analog signal by using M (M is a natural number of 2 or more) different voltages supplied from a wiring group, and a function of inputting the analog signal to the first subpixel or the second subpixel.

Another embodiment of this invention is a liquid crystal display device including a first mode, a second mode, a pixel having a first subpixel and a second subpixel, and a circuit. The circuit is electrically connected to N (N is a natural number of 2 or more) wirings for supplying a digital signal with N bits, a first wiring group and a second wiring group each having M (M is a natural number of 2 or more) wirings for supplying M different voltages, and a third wiring group and a fourth wiring group each having M wirings for supplying M different voltages. In the first mode, the circuit has functions of converting the digital signal into a first analog signal and a second analog signal by using the M voltages supplied to the first wiring group and the second wiring group and respectively inputting the first analog signal to the first subpixel and the second analog signal to the second subpixel. In the second mode, the circuit has functions of converting the digital signal into a third analog signal and a fourth analog signal by using the M voltages supplied to the third wiring group and the fourth wiring group and respectively inputting the third analog signal to the first subpixel and the fourth analog signal to the second subpixel. The first subpixel and the second subpixel each include an electrode for driving a liquid crystal element.

Another embodiment of this invention is a liquid crystal display device including a first mode, a second mode, a pixel having a first subpixel and a second subpixel, a first circuit, a second circuit, a third circuit, and a fourth circuit. The first circuit is electrically connected to N (N is a natural number of 2 or more) wirings for supplying a digital signal with N bits, and a first wiring group having M (M is a natural number of 2 or more) wirings for supplying M different voltages. The second circuit is electrically connected to N wirings for supplying a digital signal with N bits, and a second wiring group having M wirings for supplying M different voltages. The third circuit is electrically connected to N wirings for supplying a digital signal with N bits, and a third wiring group having M wirings for supplying M different voltages. The fourth circuit is electrically connected to N wirings for supplying a digital signal with N bits, and a fourth wiring group having M wirings for supplying M different voltages. In the first mode, the first circuit and the second circuit each have functions of converting the digital signal into a first analog signal and a second analog signal by using the M voltages supplied to the first wiring group and the second wiring group and respectively inputting the first analog signal to the first subpixel and the second analog signal to the second subpixel. In the second mode, the third circuit and the fourth circuit have functions of converting the digital signal into a third analog signal and a fourth analog signal by using the M voltages supplied to the third wiring group and the fourth wiring group and respectively inputting the third analog signal to the first subpixel and the fourth analog signal to the second subpixel. The first subpixel and the second subpixel each include an electrode for driving a liquid crystal element.

Another embodiment of this invention is a liquid crystal display device including a first mode, a second mode, a pixel having a first subpixel and a second subpixel, a first circuit, a second circuit, a third circuit, a fourth circuit, a fifth circuit, and a sixth circuit. The first circuit has functions of decoding a first digital signal with N (N is a natural number of 2 or more) bits, converting the first digital signal into a second digital signal, and inputting the second digital signal to each of the third circuit and the fourth circuit, by using $2^N$ wirings. The second circuit has functions of decoding the first digital signal with N bits, converting the first digital signal into a third digital signal, and inputting the third digital signal to each of the third circuit and the fourth circuit, by using $2^N$ wirings. The third circuit is electrically connected to a first wiring group having M (M is a natural number of 2 or more) wirings for supplying M different voltages. The fourth circuit is electrically connected to a second wiring group having M (M is a natural number of 2 or more) wirings for supplying M different voltages. The fifth circuit is electrically connected to a third wiring group having M (M is a natural number of 2 or more) wirings for supplying M different voltages. The sixth wiring is electrically connected to a fourth wiring group having M (M is a natural number of 2 or more) wirings for supplying M different voltages. In the first mode, the third circuit and the fourth circuit each have functions of converting the second digital signal into a first analog signal and a second analog signal by using the M voltages supplied to the $2^N$ wirings and the wiring group and respectively inputting the first analog signal to the first subpixel and the second analog signal to the second subpixel. In the second mode, the fifth circuit and the sixth circuit have functions of converting the third digital signal into a third analog signal and a fourth analog signal by using the M voltages supplied to the wiring group and respectively inputting the third analog signal to the first subpixel and the fourth analog signal to the second subpixel. The first subpixel and the second subpixel each include an electrode for driving a liquid crystal element.

Note that various types of switches can be used as a switch. An electrical switch, a mechanical switch, and the like are given as examples. That is, any element can be used as long as it can control current flow, without limitations to a certain element. For example, a transistor (e.g., a bipolar transistor or a MOS transistor), a diode (e.g., a PN diode, a PIN diode, a Schottky diode, an MIM (metal insulator metal) diode, an MIS (metal insulator semiconductor) diode, or a diode-connected transistor), or the like can be used as a switch. Alternatively, a logic circuit combining such elements can be used as a switch.

An example of a mechanical switch is a switch formed using MEMS (micro electro mechanical system) technology, such as a digital micromirror device (DMD). Such a switch includes an electrode which can be moved mechanically, and operates by controlling conduction and non-conduction based on movement of the electrode.

Note that a CMOS switch may be used as a switch by using both N-channel and P-channel transistors.

Note that when a transistor is used as a switch, the switch includes an input terminal (one of a source terminal and a drain terminal), an output terminal (the other of the source terminal and the drain terminal), and a terminal for controlling conduction (a gate terminal). On the other hand, when a diode is used as a switch, the switch does not have a terminal for controlling conduction in some cases. Therefore, when a diode is used as a switch, the number of wirings for controlling terminals can be further reduced compared to the case of using a transistor as a switch.

Note that when it is explicitly described that "A and B are connected," the case where A and B are electrically connected, the case where A and B are functionally connected, and the case where A and B are directly connected are included therein. Here, each of A and B corresponds to an object (e.g., a device, an element, a circuit, a wiring, an electrode, a terminal, a conductive film, or a layer). Accordingly, another connection relation shown in drawings and texts is included without being limited to a predetermined connection relation, for example, the connection relation shown in the drawings and the texts.

For example, in the case where A and B are electrically connected, one or more, elements which enable electric connection between A and B (e.g., a switch, a transistor, a capacitor, an inductor, a resistor, and/or a diode) may be connected between A and B. Alternatively, in the case where A and B are functionally connected, one or more circuits which enable functional connection between A and B (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up dc-dc converter or a step-down dc-dc converter) or a level shifter circuit for changing a potential level of a signal; a voltage source; a current source; a switching circuit; an amplifier circuit such as a circuit which can increase signal amplitude, the amount of current, or the like, an operational amplifier, a differential amplifier circuit, a source follower circuit, or a buffer circuit; a signal generating circuit; a memory circuit; and/or a control circuit) may be connected between A and B. For example, in the case where a signal output from A is transmitted to B even if another circuit is provided between A and B, A and B are connected functionally.

Note that when it is explicitly described that "A and B are electrically connected", the case where A and B are electrically connected (i.e., the case where A and B are connected by interposing another element or another circuit therebetween), the case where A and B are functionally connected (i.e., the case where A and B are functionally connected by interposing another circuit therebetween), and the case where A and B are directly connected (i.e., the case where A and B are connected without interposing another element or another circuit therebetween) are included therein. That is, when it is explicitly described that "A and B are electrically connected", the description is the same as the case where it is explicitly only described that "A and B are connected".

Note that a display element, a display device which is a device having a display element, a light-emitting element, and a light-emitting device which is a device having a light-emitting element can use various types and can include various elements. For example, a display medium, whose contrast, luminance, reflectivity, transmittivity, or the like changes by an electromagnetic action, such as an EL (electro-luminescence) element (e.g., an EL element including organic and inorganic materials, an organic EL element, or an inorganic EL element), an LED (a white LED, a red LED, a green LED, a blue LED, or the like), a transistor (a transistor which emits light depending on current), an electron emitter, a liquid crystal element, electronic ink, an electrophoresis element, a grating light valve (GLV), a plasma display panel (PDP), a digital micromirror device (DMD), a piezoelectric ceramic display, or a carbon nanotube can be included as a display element, a display device, a light-emitting element, or a light-emitting device. Note that display devices using an EL element include an EL display; display devices using an electron emitter include a field emission display (FED), an SED-type flat panel display (SED: surface-conduction electron-emitter display), and the like; display devices using a liquid crystal element include a liquid crystal display (e.g., a transmissive liquid crystal display, a transflective liquid crystal display, a reflective liquid crystal display, a direct-view liquid crystal display, or a projection liquid crystal display); and display devices using electronic ink or an electrophoresis element include electronic paper.

Note that a liquid crystal element is an element which controls transmission or non-transmission of light by an optical modulation action of liquid crystals and includes a pair of electrodes and liquid crystals. The optical modulation action of liquid crystals is controlled by an electric filed applied to the liquid crystal (including a lateral electric field, a vertical electric field and a diagonal electric field). The following liquid crystals can be used for a liquid crystal element: a nematic liquid crystal, a cholesteric liquid crystal, a smectic liquid crystal, a discotic liquid crystal, a thermotropic liquid crystal, a lyotropic liquid crystal, a low molecular liquid crystal, a high molecular liquid crystal, a PDLC (polymer dispersed liquid crystal), a ferroelectric liquid crystal, an anti-ferroelectric liquid crystal, a main chain type liquid crystal, a side chain type polymer liquid crystal, a plasma addressed liquid crystal (PALC), a banana-shaped liquid crystal, a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optical compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, and a blue-phase mode. Note that this invention is not limited thereto, and various kinds of liquid crystal elements can be used.

Note that various types of transistors can be used as a transistor, without being limited to a certain type. For example, a thin film transistor (TFT) including a non-single-crystal semiconductor film typified by amorphous silicon, polycrystalline silicon, microcrystalline (also referred to as microcrystal, nanocrystal, semi-amorphous) silicon, or the like can be used. In the case of using the TFT, there are various advantages. For example, since the TFT can be formed at temperature lower than that of the case of using single crystal silicon, manufacturing cost can be reduced or a manufacturing apparatus can be made larger. Since the manufacturing apparatus is made larger, the TFT can be formed using a large substrate. Therefore, many display devices can be formed at the same time at low cost. In addition, a substrate having low heat resistance can be used because of low manufacturing temperature. Therefore, the transistor can be formed using a light-transmitting substrate. Accordingly, transmission of light in a display element can be controlled by using the transistor formed using the light-transmitting substrate. Alternatively, part of a film which forms the transistor can transmit light because the film thickness of the transistor is thin. Therefore, the aperture ratio can be improved.

Note that when a catalyst (e.g., nickel) is used in forming polycrystalline silicon, crystallinity can be further improved and a transistor having excellent electric characteristics can be formed.

Note that when a catalyst (e.g., nickel) is used in the case of forming microcrystalline silicon, crystallinity can be further improved and a transistor having excellent electric characteristics can be formed. At this time, crystallinity can be improved by just performing heat treatment without performing laser light irradiation.

Note that polycrystalline silicon and microcrystalline silicon can be formed without using a catalyst (e.g., nickel).

Note that it is preferable that the crystallinity of silicon be improved to polycrystalline, microcrystalline, or the like in the whole panel; however, this invention is not limited to this. The crystallinity of silicon may be improved only in part of the panel. Selective increase in crystallinity can be achieved by selective laser irradiation or the like. For example, only a peripheral driver circuit region excluding pixels may be irradiated with laser light. Alternatively, only a region of a gate driver circuit, a source driver circuit, or the like may be irradiated with laser light. Further alternatively, only part of a source driver circuit (e.g., an analog switch) may be irradiated with laser light.

Alternatively, a transistor can be formed by using a semiconductor substrate, an SOI substrate, or the like.

Alternatively, a transistor including a compound semiconductor or an oxide semiconductor such as ZnO, a-InGaZnO, SiGe, GaAs, IZO, ITO, or SnO, a thin film transistor obtained by thinning such a compound semiconductor or an oxide semiconductor, or the like can be used. Note that such a compound semiconductor or an oxide semiconductor can be used for not only a channel portion of the transistor but also other applications. For example, such a compound semiconductor or an oxide semiconductor can be used as a resistor element, a pixel electrode, or a light-transmitting electrode.

Alternatively, a transistor formed by using an inkjet method or a printing method, or the like can be used.

Alternatively, a transistor including an organic semiconductor or a carbon nanotube, or the like can be used.

In addition, various types of transistors can be used. For example, a MOS transistor, a junction transistor, a bipolar transistor, or the like can be employed.

Further, a MOS transistor, a bipolar transistor and/or the like may be mixed on one substrate.

Furthermore, various transistors other than the above-described types of transistors can be used.

Note that a transistor can be formed using various types of substrates without being limited to a certain type. As the substrate, for example, a single crystal substrate, an SOI substrate, a glass substrate, a quartz substrate, a plastic substrate, a stainless steel substrate, a substrate including a stainless steel foil, or the like can be used.

Note that a structure of a transistor can be various forms without being limited to a certain structure. For example, a multi-gate structure having two or more gate electrodes may be used. When the multi-gate structure is used, a structure where a plurality of transistors are connected in series is provided because channel regions are connected in series.

As another example, a structure where gate electrodes are formed above and below a channel may be employed.

A structure where a gate electrode is formed above a channel region, a structure where a gate electrode is formed below a channel region, a staggered structure, an inverted staggered structure, a structure where a channel region is divided into a plurality of regions, or a structure where channel regions are connected in parallel or in series can be used. Further alternatively, a source electrode or a drain electrode may overlap with a channel region (or part of it).

Note that various types of transistors can be used as a transistor and the transistor can be formed using various types of substrates. Accordingly, all the circuits that are necessary to realize a predetermined function can be formed using the same substrate. For example, all the circuits that are necessary to realize the predetermined function can be formed using a glass substrate, a plastic substrate, a single crystal substrate, an SOI substrate, or any other substrate. When all the circuits that are necessary to realize the predetermined function are formed using the same substrate, cost can be reduced by reduction in the number of component parts or reliability can be improved by reduction in the number of connection to circuit components. Alternatively, part of the circuits which are necessary to realize the predetermined function can be formed using one substrate and another part of the circuits which are necessary to realize the predetermined function can be formed using another substrate. That is, not all the circuits that are necessary to realize the predetermined function are required to be formed using the same substrate. For example, part of the circuits which are necessary to realize the predetermined function may be formed by transistors using a glass substrate and another part of the circuits which are necessary to realize the predetermined function may be formed using a single crystal substrate, so that an IC chip formed by a transistor over the single crystal substrate can be connected to the glass substrate by COG (chip on glass) and the IC chip may be provided over the glass substrate. Alternatively, the IC chip can be connected to the glass substrate by TAB (tape automated bonding) or a printed wiring board. When part of the circuits are formed using the same substrate in this manner, cost can be reduced by reduction in the number of component parts or reliability can be improved by reduction in the number of connection to circuit components. Further alternatively, when circuits with high driving voltage and high driving frequency, which consume large power, are formed, for example, over a single crystal semiconductor substrate instead of forming such circuits using the same substrate and an IC chip formed by the circuit is used, increase in power consumption can be prevented.

Note that a transistor is an element having at least three terminals of a gate, a drain, and a source. The transistor has a channel region between a drain region and a source region, and current can flow through the drain region, the channel region, and the source region. Here, since the source and the drain of the transistor change depending on the structure, the operating condition, and the like of the transistor, it is difficult to define which is source or drain. Therefore, a region functioning as source and drain is not called the source or the drain in some cases. In such a case, one of the source and the drain may be referred to as a first terminal and the other thereof may be referred to as a second terminal, for example. Alternatively, one of the source and the drain may be referred to as a first electrode and the other thereof may be referred to as a second electrode. Further alternatively, one of the source and the drain may be referred to as a first region and the other thereof may be called a second region.

Note that a transistor may be an element including at least three terminals of a base, an emitter and a collector. In this case also, the emitter and the collector may be similarly denoted as a first terminal and a second terminal.

Note that a semiconductor device corresponds to a device having a circuit including a semiconductor element (e.g., a transistor, a diode, or a thyristor). The semiconductor device may also include all devices that can function by utilizing semiconductor characteristics. Alternatively, the semiconductor device corresponds to a device having a semiconductor material.

Note that a display device corresponds to a device having a display element. The display device may include a plurality of pixels each having a display element. Note that the display device may also include a peripheral driver circuit for driving the plurality of pixels. The peripheral driver circuit for driving the plurality of pixels may be formed over the same substrate as the plurality of pixels. The display device may also include a peripheral driver circuit provided over a substrate by wire bonding or bump bonding, namely, an IC chip connected by chip on glass (COG) or an IC chip connected by TAB or the like. Further, the display device may also include a flexible printed circuit (FPC) to which an IC chip, a resistor, a capacitor, an inductor, a transistor, or the like is attached. Note also that the display device includes a printed wiring board (PWB) which is connected through a flexible printed circuit (FPC) and to which an IC chip, a resistor element, a capacitor element, an inductor, a transistor, or the like is attached. The display device may also include an optical sheet such as a polarizing plate or a retardation plate. Note that the display device may also include a lighting device, a housing, an audio input and output device, a light sensor, or the like.

Note that a lighting device may include a backlight unit, a light guide plate, a prism sheet, a diffusion sheet, a reflective sheet, a light source (e.g., an LED or a cold cathode fluorescent lamp), a cooling device (e.g., a water cooling device or an air cooling device), or the like.

In addition, a light-emitting device corresponds to a device having a light-emitting element or the like. When a light-emitting element is used as a display element, a light-emitting device is a typical example of a display device.

Note that a reflective device corresponds to a device having a light-reflecting element, a light-diffraction element, a light-reflecting electrode, or the like.

A liquid crystal display device corresponds to a display device including a liquid crystal element. Liquid crystal display devices include a direct-view liquid crystal display, a projection liquid crystal display, a transmissive liquid crystal display, a reflective liquid crystal display, a semi-transmissive liquid crystal display, and the like.

Note also that a driving device corresponds to a device having a semiconductor element, an electric circuit, an electronic circuit and/or the like. For example, a transistor which controls input of a signal from a source signal line to a pixel (also called a selection transistor, a switching transistor, or the like), a transistor which applies voltage or current to a pixel electrode, a transistor which applies voltage or current to a light-emitting element, and the like are examples of the driving device. A circuit which supplies a signal to a gate signal line (also called a gate driver, a gate line driver circuit, or the like), a circuit which supplies a signal to a source signal line (also called a source driver, a source line driver circuit, or the like) are also examples of the driving device.

Note that a display device, a semiconductor device, a lighting device, a cooling device, a light-emitting device, a reflective device, a driving device, and the like are provided together in some cases. For example, a display device includes a semiconductor device and a light-emitting device in some cases. Alternatively, a semiconductor device includes a display device and a driving device in some cases.

According to one embodiment of this invention, since one digital signal can be converted into a plurality of analog signals, a look-up table can be unnecessary. Therefore, heat generation or an increase in power consumption due to reading a look-up table from a memory element can be prevented. Alternatively, since signals corresponding to respective subpixels can be generated on a panel, the number of connection between the panel and an external component can be small. Alternatively, poor connection in the connection portion of the panel and the external component can be suppressed, whereby reliability can be increased. Alternatively, an yield in production of a display device can be increased. Alternatively, a production cost of the display device can be reduced. Alternatively, since the number of connection between the panel and the external component can be reduced, a high-definition display portion can be obtained. Alternatively, since the number of connection between the panel and the external component can be reduced, resistance to noise can be enhanced and display quality can be increased.

DETAILED DESCRIPTION OF THE INVENTION

Figure 1A:
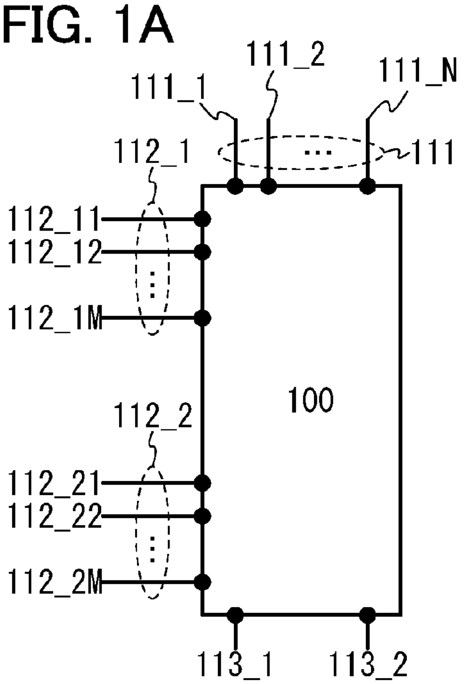
FIGS. 1A to 1C are diagrams illustrating a circuit of one embodiment of this invention.

Hereinafter, embodiments will be described with reference to drawings. However, it is easily understood by those skilled in the art that the invention can be implemented with a variety of different forms, and embodiments and details of this invention can be variously changed without departing from the scope and spirit of this invention. Therefore, this invention is not interpreted as being limited to the description of the embodiments below. Note that in a structure of this invention described below, common portions and portions having a similar function are denoted by the same reference numerals in all diagrams, and description thereof is omitted.

Hereinafter, embodiment modes will be described with reference to a variety of drawings. In that case, in one embodiment, the contents (or may be part of the contents) described in each drawing can be freely applied to, combined with, or replaced with the contents (or may be part of the contents) described in another drawing. Further, even more drawings can be formed when each part in a drawing described in one embodiment is combined with another part in the drawing.

Similarly, the contents (or may be part of the contents) described in each drawing of embodiment or a plurality of embodiments can be freely applied to, combined with, or replaced with the contents (or may be part of the contents) described in a drawing of another embodiment or a plurality of other embodiments. Further, even more drawings can be formed when each part in the drawing of embodiment or a plurality of embodiments is combined with part of another embodiment or a plurality of other embodiments.

Note that the contents (or may be part of the contents) described in one embodiment will show an example of an embodied case of other contents (or may be part of the contents) described in the embodiment, an example of slight transformation thereof, an example of partial modification thereof, an example of improvement thereof, an example of detailed description thereof, an application example thereof, an example of related part thereof, or the like. Therefore, the contents (or may be part of the contents) described in one embodiment can be freely applied to, combined with, or replaced with other contents (or may be part of the contents) described in the embodiment.

Note that the contents (or may be part of the contents) described in one embodiment or a plurality of embodiments will show an example of an embodied case of the contents (or may be part of the contents) described in the embodiment or the plurality of embodiments, an example of slight transformation thereof, an example of partial modification thereof, an example of improvement thereof, an example of detailed description thereof, an application example thereof, an example of related part thereof, or the like. Therefore, the contents (or may be part of the contents) described in another embodiment can be freely applied to, combined with, or replaced with other contents (or may be part of the contents) described in another embodiment or a plurality of other embodiments.

(Embodiment 1)

In this embodiment, a digital-analog converter portion will be described. The digital-analog converter portion of this embodiment converts one digital signal (e.g., a digital signal with N bits (N is a natural number of 2 or more)) into n (n is a natural number of 2 or more) analog signals. In order to realize this, n groups (e.g., voltage groups or current groups) are input to the digital-analog converter portion. Note that a structure in which some of the respective groups input to the digital-analog converter portion can be used as one in common is possible. In this case, less than n groups are input to the digital analog converter portion.

Note that the values (e.g., voltage or current) of the n analog signals are different from each other. However, some of the n analog signals have the same value in some cases. Alternatively, all the values of the n analog signals are the same in some cases. For example, in the case of a digital signal with the maximum or minimum gray levels, the values of analog signals supplied to the respective subpixels are the same in some cases.

With reference to FIG. 1A, the digital-analog converter portion in the case where one digital signal is converted into two analog signals is described, for example.

A digital-analog converter portion 100 is connected to a wiring group 111, a wiring group 112_1, a wiring group 112_2, a wiring 113_1 and a wiring 113_2.

The wiring group 111, the wiring group 112_1, and the wiring group 112_2 each include a plurality of wirings.

A digital signal is input to the wiring group 111. Therefore, the number of bits in the digital signal corresponds to the number of wirings in the wiring group 111 in many cases. For example, in the case where the digital signal has N bits, the wiring group 111 includes N wirings of wirings 111_1 to 111_N (N is a natural number).

A first voltage group is input to the wiring group 112_1. Accordingly, the number of voltages in the first voltage group corresponds to the number of wirings of the wiring group 112_1 in many cases. For example, in the case where the number of voltages in the first wiring group is M, the wiring group 112_1 includes M wirings of wirings 112_11 to 112_1M (M is a natural number of 2 or more). Therefore, the M different voltages are supplied to the M wirings in the wiring group 112_1. In addition, in some cases, the wiring group 112_1 is called a first wiring group depending on the number of wiring groups provided in the digital-analog converter portion 100.

Note that terms such as first, second, third to Nth (N is a natural number) seen in this specification are used in order to avoid confusion between components and do not set a limitation on number.

A second voltage group is input to the wiring group 112_2. Accordingly, the number of voltages in the second voltage group corresponds to the number of wirings of the wiring group 112_2 in many cases. For example, in the case where the number of voltages in the second voltage group is M, the wiring group 112_2 includes M wirings of wirings 112_21 to 112_2M. Therefore, the M different voltages are supplied to the M wirings in the wiring group 112_2. In addition, in some cases, the wiring group 112_2 is called a second wiring group depending on the number of wiring groups provided in the digital-analog converter portion 100.

Note that this embodiment is not limited to this. A variety of signals, voltages, or currents can be input to the wiring group 111, the wiring group 112_1, and the wiring group 112_2. Alternatively, a variety of signals, voltages, or currents can be output from the wiring group 111, the wiring group 112_1, and the wiring group 112_2.

A digital signal with N bits has a function of determining the value of an output signal from the digital-analog converter portion 100.

Note that the denotation "a digital signal with N bits" means a digital signal with N bits and also an inverted signal thereof (hereinafter also referred to as an inverted digital signal with N bits) in some cases.

Note that a digital signal with N bits or a signal with the approximately the same amplitude voltage as the digital signal with N bit is input to gate of a transistor in many cases. Further, the first voltage group and the second voltage group are input to one of source and drain of the transistor in many cases. Therefore, in order to make the transistor easily turned on or off, it is preferable that the amplitude voltage of the digital signal with N bits be equal to or greater than the difference between the minimum value and the maximum value of the first voltage group or the difference between the minimum value and the maximum value of the second voltage group, for example. However, this embodiment is not limited thereto and the amplitude voltage of the digital signal with N bits can be smaller.

The first voltage group has a plurality of voltages having different values from each other, and the second voltage group has a plurality of voltages having different values from each other in many cases. In addition, the values of the first voltage group and the second voltage group are different from each other in many cases. However, one of the voltages in the first voltage group and one of the voltages in the second voltage group or a plurality of voltages in the first voltage group and a plurality of voltages in the second voltage group have the same value in some cases. In this case, by sharing the wiring and using the wiring in common, the number of wirings in the wiring group 112_1 and the wiring group 112_2 can be reduced.

Note that a positive first voltage group and a negative first voltage group can be used as the first voltage group, and a positive second voltage group and a negative second voltage group can be used as the second voltage group. In order to achieve this, for example, the number of wirings in the wiring group 112_1 and the number of wirings in the wiring group 112_1 can be increased (for example, approximately twice). In this case, the positive first voltage group and the negative first voltage group are input to the wiring group 112_1 at the same time and the positive second voltage group and the negative second voltage group are input to the wiring group 112_2 at the same time.

In another example, one operation period can include a first sub-operation period and a second sub-operation period. Then, positive polarity and negative polarity are switched to each other in each sub-operation period. Such a case is preferable because the number of wirings does not increase. For example, in the first sub-operation period, the positive first voltage group is input to the wiring group 112_1 and the positive second voltage group is input to the wiring group 112_2. In the second sub-operation period, the negative first voltage group is input to the wiring group 112_1 and the negative second voltage group is input to the wiring group 112_2.

Note that a positive voltage is a voltage which makes the potential of a pixel electrode higher than the potential of a common electrode (hereinafter such potential is referred to as a common potential) when the positive voltage is input to the pixel electrode in the liquid crystal display device. On the other hand, a negative voltage is a voltage which makes the potential of the pixel electrode lower than the common potential.

Note that in the case where a positive voltage and a negative voltage are input to the digital-analog converter portion 100 as the first voltage group and the second voltage group, inversion drive can be achieved by using the digital-analog converter portion 100 for a liquid crystal display device. In the inversion drive, the polarity of a voltage applied to the pixel electrode is inverted in accordance with the potential (the common potential) of the common electrode in a liquid crystal element in each frame or each pixel with respect to every certain period. By the inversion drive, uneven display such as flickering of an image and deterioration in a liquid crystal material can be suppressed. Note that as an example of the inversion drive, source line inversion drive, gate line inversion drive, dot inversion drive and the like can be given as well as frame inversion drive.

Note that respective values (or polarities) of the first voltage group and the second group can be changed with time. In such a case, one operation period includes a plurality of sub-operation periods. Then, the respective values (or polarities) of the first voltage group and the second voltage group are changed in every sub-operation period. In this manner, the number of voltages in the first voltage group and the second voltage group, that is, the number of wirings in the wiring group 112_1 and the wiring group 112_2 can be reduced. Alternatively, one of the first voltage group and the second voltage group can be omitted.

Note that a current group can be input to the wiring group 112_1 and the wiring group 112_2. A pixel circuit, element, and the like which operates by current can be driven. Alternatively, the current group and the voltage group can be input to the wiring group 112_1 and the wiring group 112_2.

Note that, for example, the wiring group 111, the wiring group 112_1, the wiring group 112_2, the wiring 113_1, and the wiring 113_2 can function as a first signal line group, a first power supply line group, a second power supply line group, a second signal line, and a third signal line, respectively.

Note that a variety of signals, voltages, or currents as well as the above-described signals and voltages can be input to the digital-analog converter portion 100.

For example, an inverted signal of the digital signal with N bits (hereinafter such a signal is referred to as an inverted digital signal) can be input to the digital-analog converter portion 100. In this case, a new wiring group (e.g., N wirings) may be added so that the inverted digital signal with N bits is input to the digital-analog converter portion 100 through the new wiring group. Note that this new wiring group functions as a signal line group, for example.

Note that the digital-analog converter portion 100 can be referred to as a circuit or a semiconductor device.

Next, the operation of the digital-analog converter portion 100 shown in FIG. 1A will be described.

The digital signal with N bits, the first voltage group, and the second voltage group are input to the digital-analog converter portion 100.

In accordance with the digital signal with N bits, the digital-analog converter portion 100 brings one of the wiring group 112_1 and the wiring 113_1 into conduction and brings the other of the wiring group 112_1 and the wiring 113_1 into out of conduction, so that the potentials of the one of the wiring group 112_1 and the wiring 113_1 are approximately the same. At the same time, in accordance with the digital signal with N bits, the digital-analog converter portion 100 brings one of the wiring group 112_2 and the wiring 113_2 into conduction and brings the other of the wiring group 112_2 and the wiring 113_2 into out of conduction, so that the potentials of the one of the wiring group 112_2 and the wiring 113_2 are approximately the same. In this manner, by the digital-analog converter portion 100, the potential of the wiring 113_1 and the potential of the wiring 113_2 are determined in accordance with the first voltage group and the second voltage group.

Note that the terms "approximately the same" are used in consideration of an error generated by the effect of noise. Accordingly, the error is preferably equal to or less than 10%, more preferably equal to or less than 5%, or further preferably equal to or less than 3%, for example.

In this manner, the digital-analog converter portion 100 converts the digital signal with N bits into a first analog signal and a second analog signal and outputs the first analog signal and the second analog signal to the wiring 113_1 and the wiring 113_2, respectively. Alternatively, the digital-analog converter portion 100 selects one of the first voltage group and one of the second voltage group in accordance with the digital signal with N bits, outputs the one of the first voltage group to the wiring 113_1 as the first analog signal, and outputs the one of the second voltage group to the wiring 113_2 as the second analog signal.

Note that the values of the first analog signal and the second analog signal are different from each other in many cases. However, this embodiment is not limited to this. Depending on the first voltage group and the second voltage group or the value of the digital signal, the values of the first analog signal and the second analog signal are approximately the same in some cases.

Note that although the potential of the first analog signal and the potential of the second analog signal are the same as that of one of the first voltage group or one of the second voltage group in many cases, this embodiment is not limited thereto. For example, a new voltage is generated by dividing any voltage in the first voltage group or the second voltage group with a resistor element or a capacitor element. Then, this newly generated voltage can be output as an analog signal.

Note that each of the wirings included in the wiring group 112_1 and the wiring group 112_2 preferably has a part whose width is larger than that of the wiring included in the wiring group 111. This is because an analog voltage is input to the wiring group 112_1 and the wiring group 112_2 in many cases and wiring resistance per unit length of the wiring group 112_1 and the wiring group 112_2 is preferably lower than that of the wiring group 111.

However, each of the wirings included in the wiring group 112_1 and the wiring group 112_2 may have a part whose width is smaller than that of the wiring included in the wiring group 111. In this case, for example, since each of the number of the wirings in the wiring group 112_1 and the number of wirings in the wiring group 112_2 is larger than that of the wiring group 111, the layout area of the digital-analog converter portion 100 can be small.

Note that it is preferable that each of the wiring 113_1 and the wiring 113_2 also has a part whose width is larger than that of the wiring included in the wiring group 111, like the wiring group 112_1 and the wiring group 112_2. However, each of the wiring 113_1 and the wiring 113_2 can have a part whose width is smaller than that of the wiring included in the wiring group 111, like the wiring group 112_1 and the wiring group 112_2.

Note that the wiring in the wiring group 111 is connected to a gate electrode of a transistor in many cases. Accordingly, part of the wiring included in the wiring group 111, which is connected to the digital-analog converter portion 100, is preferably formed using the same material as the gate electrode of the transistor.

Note that the wiring included in the wiring group 112_1, the wiring included in the wiring group 112_2, the wiring 113_1, and the wiring 113_2 are connected to a source and drain electrode of the transistor in many cases, for example. Accordingly, each of parts of the wiring included in the wiring group 112_1, the wiring included in the wiring group 112_2, the wiring 113_1, and the wiring 113_2, which are connected to the digital-analog converter portion 100, is preferably formed using the same material as a conductive layer connected to a semiconductor layer in the transistor.

Figure 1B:
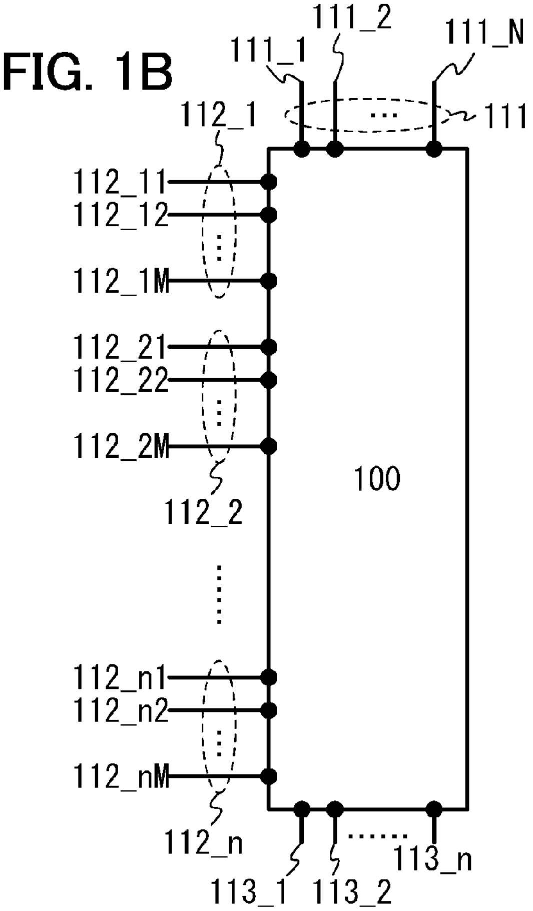

Note that although FIG. 1A shows a case where the digital signal with N bits is converted into the first analog signal and the second analog signal by the digital-analog converter portion 100, this embodiment is not limited thereto. As shown in FIG. 1B, the digital signal with N bits can be converted into n (n is a natural number) analog signals.

The digital-analog converter portion 100 shown in FIG. 1B is connected to the wiring group 111, wiring groups 112_1 to 112_n, and wirings 113_1 to 113_n, for example.

For example, the first to nth voltage groups are input to the wiring groups 112_1 to 112_n and first to nth analog signals are output from the wirings 113_1 to 113_n.

In accordance with the digital signal with N bits, the digital-analog converter portion 100 brings the wirings 113_1 to 113_n and ones of wirings in the wiring groups 112_1 to 112_n into conduction so that the potentials of the wirings 113_1 to 113_n and ones of wirings in the wiring groups 112_1 to 112_n are made to be the same. For example, in accordance with the digital signal with N bits, the digital-analog converter portion 100 brings a wiring 113_i (i is one of 1 to n) and one of a wiring group 112_i into conduction so that the potentials of the wiring 113_i and the one of the wiring group 112_i are made to be the same. In this manner, in the digital-analog converter portion 100, the potentials of the wirings 113_1 to 113_n are determined in accordance with the digital signal with N bits and n voltage groups.

In this manner, the digital-analog converter portion 100 converts the digital signal with N bits into the n analog signals (the first to nth analog signals) and output the n analog signals to the wirings 113_1 to 113_n, respectively. In other words, in accordance with the digital signal with N bits, the digital-analog converter portion 100 selects ones of the respective n voltage groups (the first to nth voltage groups) and output the ones of the respective n voltage groups to the wirings 113_1 to 113_n, respectively.

Note that the magnitude relation of n, N, and M is preferably n<N<M. However, this embodiment is not limited to this.

Note that when the digital-analog converter portion 100 shown in FIG. 1B is used for a display device, a pixel is divided into n subpixels in many cases. In that case, if n is a large number, the number of subpixels becomes large, whereby the area for one pixel is increased and resolution is decreased in some cases. In order to prevent the decrease in resolution, a magnitude relation of n≤5 is preferable. A magnitude relation of n≤3 is more preferable because improvement in a viewing angle is highly effective even when the number of the subpixels is 3 or less. A magnitude relation of n=2 is further preferable. However, this embodiment is not limited to this.

Note that when the digital-analog converter portion 100 shown in FIG. 1B is used for a display device, the pixel is preferably divided into n subpixels. Then, n subpixels are connected to the wirings 113_1 to 113_n. However, the n subpixels can be connected to the wirings 113_1 to 113_n, through a buffer. The digital-analog converter portion 100 outputs the n analog signals each corresponding to the digital signal with N bits to the n subpixels through the wirings 113_1 to 113_n.

However, the wirings 113_1 to 113_n can be connected to pixels, or circuits other than subpixels; for example, the wirings 113_1 to 113_n can be connected to a digital-analog converter portion which is different from the digital-analog converter portion 100. Then, the digital-analog converter portion which is different from the digital-analog converter portion 100 can be connected to the pixel or the subpixel. For example, the digital-analog converter portion 100 functions as a DAC for a high-order bit, selects some voltages, and outputs the voltages to the digital-analog converter portion which is different from the digital-analog converter portion 100. On the other hand, the digital-analog converter portion which is different from the digital-analog converter portion 100 functions as a DAC for a low-order bit, divides some voltages output from the DAC (the digital-analog converter portion 100) for the high-order bit by using a resistor element or a capacitor element, generates a new voltage, and outputs the new voltage to the pixel or the subpixel. In this manner, the number of voltages in the voltage group and the number of wirings in each of the wiring groups 112_1 to 112_n can be reduced.

Figure 1C:
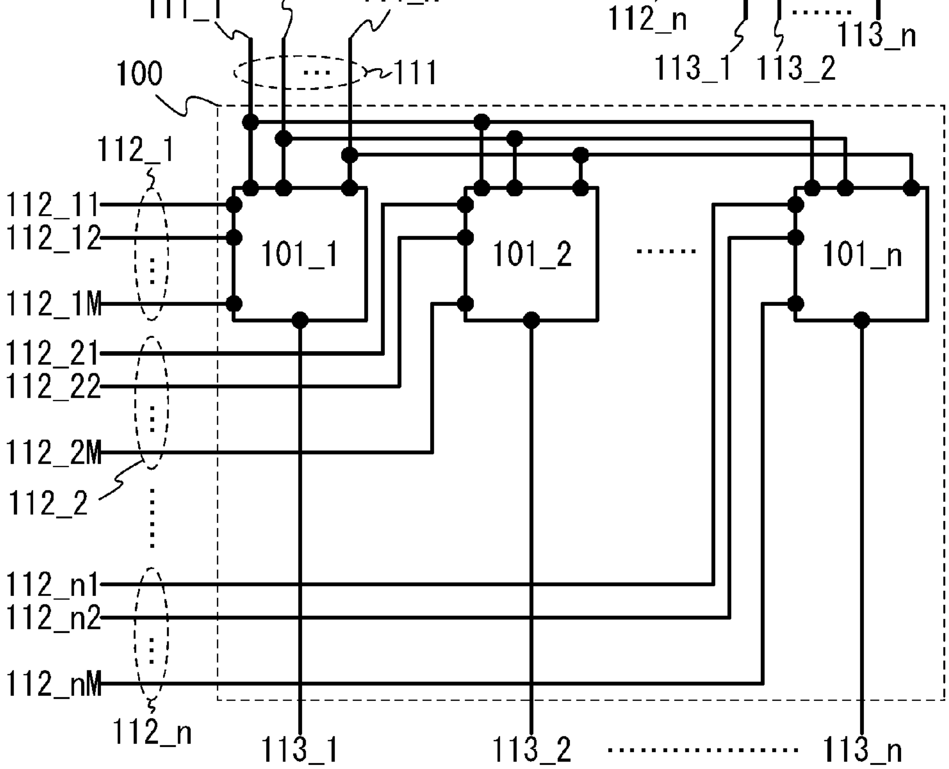

Note that as shown in FIG. 1C, the digital-analog converter portion 100 can include n circuits which function as digital-analog converter circuits (hereinafter referred to as D/A converter circuits or DACs).

As the n circuits which function as the DACs, circuits 101_1 to 101_n are used. For example, as the circuits 101_1 to 101_n, resistor ladder DACs, resistor string DACs, current output DACs, delta-sigma DACs, ROM decoder DACs, tournament DACs, DACs with a demultiplexer, or the like can be used. However, this embodiment is not limited to this.

The circuits 101_1 to 101_n are connected to the wiring group 111. The circuits 101_1 to 101_n are connected to the wiring groups 112_1 to 112_n, respectively. The circuits 101_1 to 101_n are connected to the wirings 113_1 to 113_n, respectively. For example, a circuit 101_i (i is one of 1 to n) is connected to the wiring group 111, the wiring 112_i, and the wiring 113_i.

For example, with respect to the digital signal with N bits, the circuit 101_i brings the wiring 113_i and one of the wiring group 112_i into conduction so that the potentials thereof are made to be the same. In this manner, in the circuit 101_i, the potential of the wiring 113_i is determined with respect to the digital signal with N bits and the input voltage group.

In this manner, the circuit 101_i converts the digital signal with N bits into the analog signal and output the analog signal to the wiring 113_i. In other words, in accordance with the digital signal with N bits, the circuit 101_i selects ones of the input voltage groups and outputs the one from the input voltage groups to the wiring 113_i.

In this manner, in the digital-analog converter portion of this embodiment, since one digital signal can be converted into a plurality of analog signals, a look-up table can be unnecessary. Therefore, heat generation or an increase in power consumption due to reading a look-up table from a memory element can be prevented.

Further, for example, in the case where a video signal is generated in a display device by using the digital-analog converter portion of this embodiment, a portion for generating the video signal and a pixel portion can be formed over the same substrate. Accordingly, since the number of connection between a panel and an external component can be reduced, poor connection in the connection portion of the panel and the external component can be suppressed, whereby improvement in reliability, an increase in yield, reduction in production cost, high-definition, or the like can be achieved.

(Embodiment 2)

In this embodiment, one example of the digital-analog converter portion 100 in which one digital signal is converted into two analog signals as shown in FIG. 1A will be described with reference to FIG. 2A.

The digital-analog converter portion 100 includes a circuit 201, a circuit 202_1, and a circuit 202_2.

The circuit 201 is connected to the wiring group 111 and a wiring group 114. The circuit 202_1 is connected to the wiring group 112_1, the wiring 113_1, and an output terminal of the circuit 201. The circuit 202_2 is connected to the wiring group 112_2, the wiring 113_2, and the output terminal of the circuit 201.

The wiring group 114 includes a plurality of wirings. For example, the wiring group 114 includes N wirings of wirings 114_1 to 114_N.

An inverted digital signal is input to the wiring group 114. Therefore, the number of bits of the inverted digital signal corresponds to the number of wirings in the wiring group 114 in many cases. For example, in the case where the inverted digital signal has N bits, the number of the wirings in the wiring group 114 is N. However, this embodiment is not limited to this, and a variety of signals, voltages, or currents can be input to the wiring group 114.

Note that the amplitude voltage of the inverted digital signal with N bits is preferably the same as an amplitude voltage with N bits. However, this embodiment is no limited to this.

Note that the wiring group 111 and the wiring group 114 can be connected through a circuit such as an inverter, which has a function of inverting and outputting an input signal. For example, a wiring 111_j (j is one of 1 to N) is connected to an input terminal of the inverter, and a wiring 114_j is connected to an output terminal of the inverter. In such a case, the digital signal with N bits which is to be input to the wiring group 111 is inverted by the inverter and then input to the wiring group 114. Accordingly, the inverted digital signal with N bits can be omitted.

Note that if the circuit 201 has a function of generating the inverted digital signal with N bits, the wiring group 114 can be omitted.

Note that the inverted digital signal with N bits is not necessary depending on the configuration of the circuit 201. In this case, the wiring group 114 can be omitted.

The circuit 201 function as a decoder circuit, for example. As the circuit 201, a BCD-DEC (binary coded decimal decoder) circuit, a BCD priority decoder circuit, an address decoder circuit, or the like can be used. However, this embodiment is not limited to these. The circuit 201 may include a plurality of logic circuits or a plurality of combinational logic circuits.

The circuit 202_1 and the circuit 202_2 function as selectors. For example, as the circuits 202_1 and the circuit 202_2, a selector circuit 202_1 and a selector circuit **202_2*a* shown in FIG. 2**A can be used, respectively.

The selector circuit **202_1*a* and the selector circuit 202_2*a* each include a plurality of terminals. For example, in the case where the number of voltages in the first voltage group or in the second voltage group is M, the number of the terminals is (M+1). In the selector circuit 202_1*a*, first to Mth terminals are connected to the wiring group 112_1 (wirings 112_11 to 112_1M, respectively), and the (M+1)th terminal is connected to the wiring 113_1. On the other hand, in the selector circuit 202_2*a*, first to Mth terminals are connected to the wiring group 112_2 (wirings 112_21 to 112_2M, respectively), and the (M+1)th terminal is connected to the wiring 113_2**.

The selector circuit **202_1*a* and the selector circuit 202_2*a* are controlled by an output signal of the circuit 201. For example, in accordance with the output signal of the circuit 201, the selector circuit 202_1*a* brings one of the wiring group 112_1 and the wiring 113_1 into conduction, and the selector circuit 202_2*a* brings one of the wiring group 112_2 and the wiring 113_2** into conduction.

Next, the operation of the digital-analog converter portion 100 shown in FIG. 2A will be described.

The digital signal with N bits and the inverted digital signal with N bits are input to the circuit 201.

The circuit 201 generates a digital signal in accordance with the digital signal with N bits and the inverted digital signal with N bits. In other words, the circuit 201 decodes (decrypts) the digital signal with N bits and the inverted digital signal with N bits. Specifically, for example, the circuit 201 inputs the digital signal with N bits and the inverted digital signal with N bits to the plurality of logic circuits or the plurality of combinational logic circuits to control whether an output signal from each logic circuit is an H signal or an L signal.

Since the number of bits of the digital signal generated by the circuit 201 is the same as the number of voltages in the first voltage group or in the second voltage group in many cases, the number of bits of the digital signal is set to be M and the digital signal having M bits is referred to as a digital signal with M bits. However, the number of bits of the digital signal is not limited to M, and can be M bits or less, or M bits or more.

Note that the amplitude voltage of the digital signal with M bits is the same as that of the digital signal with N bits in many cases. In such a case, a positive power supply voltage and a negative power supply voltage used for the circuit 201 are preferably the same as the value of an H signal of the digital signal with N bits and the value of an L signal of the digital signal with N bits, respectively. However, in the case where the circuit 201 has a level-shift function, the amplitude voltage of the digital signal with M bits can be higher than that of the digital signal with N bits.

After that, the circuit 201 inputs the digital signal with M bits to the circuit 202_1 and the circuit 202_2 to control the circuit 202_1 and the circuit 202_2.

In specific, in accordance with the digital signal with M bits, the circuit 202_1 brings one of the wiring group 112_1 and the wiring 113_1 into conduction so that the potentials thereof are made to be the same. At the same time, in accordance with the digital signal with M bits, the circuit 202_2 brings one of the wiring group 112_2 and the wiring 113_2 into conduction so that the potentials thereof are made to be the same.

In this manner, the circuit 202_1 converts the digital signal with M bits into a first analog signal and outputs the first analog signal to the wiring 113_1. The circuit 202_2 converts the digital signal with M bits into the second analog signal and outputs the second analog signal to the wiring 113_2. Alternatively, in accordance with the digital signal with M bits, the circuit 202_1 selects one of the first voltage group and outputs the one of the first voltage group to the wiring 113_1 as the first analog signal Based on the digital signal with M bits, the circuit 202_2 selects one of the second voltage group and outputs the one of the second voltage group to the wiring 113_2 as the second analog signal.

Note that the digital signal with N bits and the inverted digital signal with N bits can be collectively denoted as a first digital signal. Accordingly, the first digital signal may include the digital signal with N bits and the inverted digital signal with N bits in some cases. However, only the digital signal with N bits can be denoted as the first digital signal without including the inverted signal with N bits.

Note that the digital signal with M bits can be denoted as a second digital signal. However, in the case where the circuit 201 generates the digital signal with M bits and the inverted signal of the digital signal with M bits (hereinafter such an inverted digital signal is referred to as an inverted digital signal with M bits), the digital signal with M bits and the inverted digital signal with M bits can be collectively denoted as the second digital signal.

Note that the number of elements (e.g., a switch and a transistor) included in the circuit 201 is preferably larger than the number of elements included in the circuit 202_1 or the number of elements included in the circuit 202_2. Accordingly, the number of the elements included in the circuit 202_1 and the number of the elements included in the circuit 202_2 are reduced, whereby downsizing of a circuit scale can be achieved. However, this invention is not limited to this, and the number of the elements included in the circuit 201 can be smaller than the number of the elements included in the circuit 202_1 or the circuit 202_2.

Figure 2A:
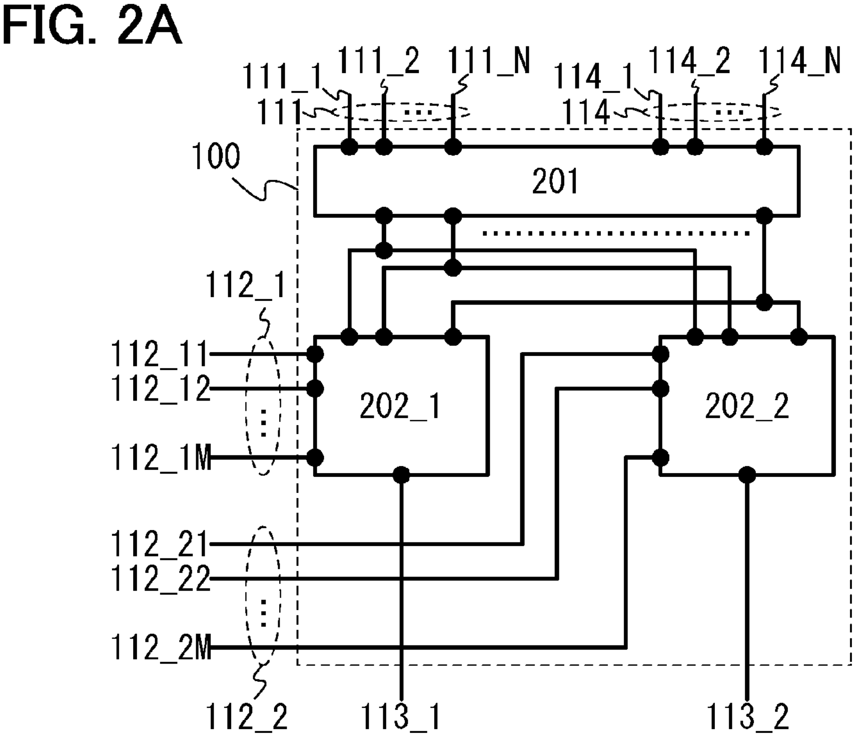
FIGS. 2A and 2B are diagrams illustrating a circuit of one embodiment of this invention.
Figure 2B:
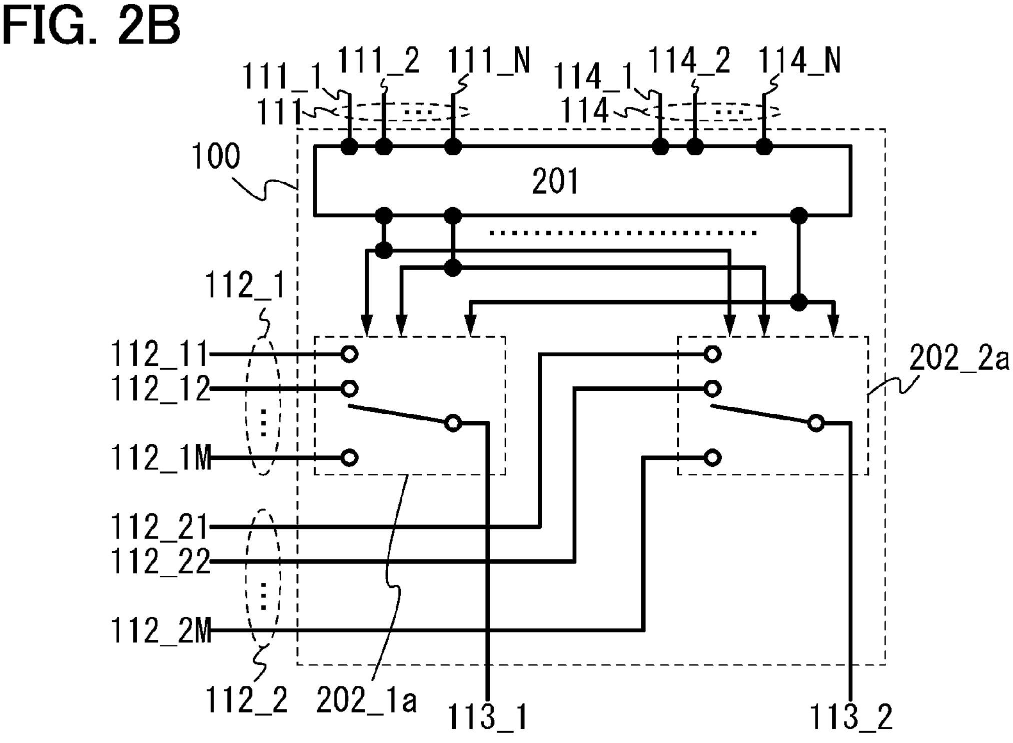
Figure 3:
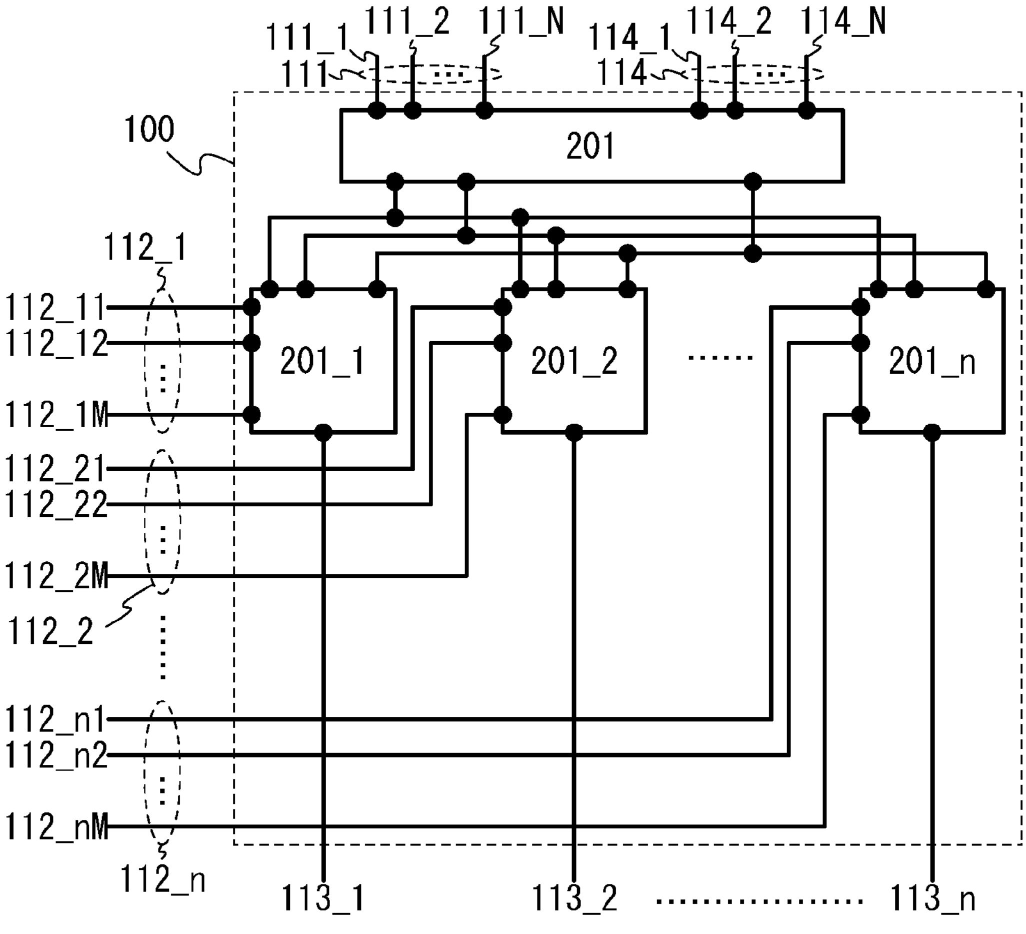
FIG. 3 is a diagram illustrating a circuit of one embodiment of this invention.

Note that as described in FIG. 1B, also in FIG. 2A, the digital-analog converter portion 100 can convert the digital signal with N bits into n analog signals. In this case, for example, the circuit 201 and circuits 202_1 to 202_n are used as shown in FIG. 3

The circuits 202_1 to 202_n are connected to the wiring groups 112_1 to 112_n, respectively, and the wirings 113_1 to 113_n, respectively, and the output terminal of the circuit 201. For example, a circuit 202_i (i is one of 1 to n) is connected to the output terminal of the circuit 201, the wiring group 112_i, and the wiring 113_i.

Each of the circuits 202_1 to 202_n corresponds to the circuit 202_1 or the circuit 202_2 shown in FIG. 2A.

Next, specific examples of the circuit 201, the circuit 202_1, and the circuit 202_2 shown in FIG. 2A will be described with reference to FIG. 4A.

The circuit 201 includes a plurality of logic circuits. The number of logic circuits corresponds to the number of the voltages in the first voltage group or the number of the voltages in the second voltage group in many cases. Accordingly, for example, in the case where the number of the voltages in the first voltage group or the number of the voltages in the second voltage group is M, the circuit 201 includes M logic circuits of logic circuits 203_1 to 203_M.

The logic circuits 203_1 to 203_M each include a plurality of input terminals and one output terminal. The number of input terminals corresponds to the number of the wirings in the wiring group 111 or the number of the wirings in the wiring group 114 in many cases. Accordingly, for example, in the case where the number of the wirings in the wiring group 111 or the number of the wirings in the wiring group 114 is N, the logic circuits 203_1 to 203_M each include N input terminals. However, in the case where wirings different from those of the wiring group 111 and the wiring group 114 are connected to the logic circuits 203_1 to 203_M, the number of input terminals corresponds to the sum of the different wirings and the number of the wirings in the wiring group 111 or the number of the wirings in the wiring group 114 in many cases.

The circuit 201_1 and the circuit 201_2 each include a plurality of switches. The number of switches corresponds to the number of the voltages in the first voltage group or the number of the voltages in the second voltage group in many cases. Accordingly, for example, in the case where the number of the voltages in the first voltage group or the number of the voltages in the second voltage group is M, the circuit 202_1 includes M switches of switches 204_11 to 204_1M, and the circuit 202_2 includes M switches of switches 204_21 to 204_2M.

The N input terminals of the logic circuits 203_1 to 203_M are connected to the wirings 111_1 to 111_N or the wirings 114_1 to 114_N. For example, jth (j is one of 1 to N or a natural number) input terminal of a logic circuit 203_k (k is one of 1 to M) is connected to the wiring 111_j or the wiring 114_j. All the logic circuits 203_1 to 203_M have different combinations of the input terminal and the wiring. For example, 2N combinations can be given at a maximum. However, input terminals in some logic circuits can have the same connection relation. Accordingly, M≤2N is preferable. In addition, M=2N is more preferable.

Output terminals of the logic circuits 203_1 to 203_M are connected to control terminals of the switches 204_11 to 204_1M, respectively, and control terminals of the switches 204_21 to 204_2M, respectively. For example, an output terminal of the logic circuit 203_k is connected to a control terminal of a switch 204_1k and the control terminal of a switch 204_2k.

First terminals of the switches 204_11 to 204_1M are connected to the wirings 112_11 to 112_1M, respectively. Second terminals of the switches 204_11 to 204_1M are all connected to the wiring 113_1. For example, the first terminal of the switch 204_1k is connected to a wiring 112_1k, and the second terminal of the switch 204_1k is connected to the wiring 113_1. However, the second terminals of the switches 204_11 to 204_1M can be connected to their respective wirings.

First terminals of the switches 204_21 to 204_2M are connected to the wirings 112_21 to 112_2M, respectively. Second terminals of the switches 204_21 to 204_2M are all connected to the wiring 113_2. For example, the first terminal of the switch 204_2k is connected to a wiring 112_2k, and the second terminal of the switch 204_2k is connected to the wiring 113_2. However, the second terminals of the switches 204_21 to 204_2M can be connected to their respective wirings.

Next, the operation of the digital-analog converter portion 100 shown in FIG. 4A will be described.

The digital signal with N bits and the inverted digital signal with N bits are input to the N input terminals of the logic circuits 203_1 to 203_M. For example, the digital signal with jth bit or the inverted digital signal with jth bit is input to the jth input terminal of each of the logic circuits 203_1 to 203_M.

The logic circuits 203_1 to 203_M each output an H signal or an L signal in accordance with a combination of the digital signal with N bits and the inverted digital signal with N bits input to each of the logic circuit 203_1 to 203_M. The output signals from these logic circuits 203_1 to 203_M correspond to the digital signals with M bits described in FIG. 2A.

After that, the logic circuits 203_1 to 203_M input the digital signals with M bits to the control terminals of the switches 204_11 to 204_1M and the control terminals of the switches 204_21 to 204_2M so that on and off of the switches 204_11 to 204_1M and the switches 204_21 to 204_2M are controlled. For example, the logic circuit 203_k (k is one of 1 to M) inputs the digital signal to the control terminal of the switch 204_1k and the control terminal of the switch 204_2k so that on and off of the switches 204_1k and 204_2k are controlled. Accordingly, the timings of turning on and off the switches 204_1k and 204_2k are approximately the same.

In specific, when one of the switches 204_11 to 204_1M is turned on in accordance with the digital signal with M bits, the switches 204_11 to 204_1M bring one of the wiring group 112_1 and the wiring 113_1 into conduction so that the potentials thereof are made to be the same. At the same time, when one of the switches 204_21 to 204_2M is turned on with respect to the digital signal with M bits, the switches 204_21 to 204_2M bring one of the wiring group 112_2 and the wiring 113_2 into conduction so that the potentials thereof are made to be the same.

Note that in the case where each of the switches is turned on when an H signal is input to the control terminal, it is preferable that one of the logic circuits 203_1 to 203_M output the H signal in order to turn on one of the switches 204_11 to 204_1M and one of the switches 204_21 to 204_2M on, and that the other logic circuits 203_1 to 203_M output L signals.

On the other hand, in the case where each of the switches is turned on when an L signal is input to the control terminal, it is preferable that one of the logic circuits 203_1 to 203_M output the L signal in order to turn on one of the switches 204_11 to 204_1M and one of the switches 204_21 to 204_2M on, and that the other logic circuits 203_1 to 203_M output H signals.

Note that the number of switches included in the circuit 202_1 corresponds to the number of switches included in the circuit 202_2 in many cases. However, the number of switches included in the circuit 202_1 can be different from that of switches included in the circuit 202_2.

Note that as the logic circuits 203_1 to 203_M, for example, one of AND circuits, OR circuits, NAND circuits, NOR circuits, XOR circuits, XNOR circuits, and the like, or combinational logic circuits of some of them can be used.

Note that as the switches 204_11 to 204_1M and the switches 204_21 to 204_2M, for example, p-channel transistors, n-channel transistors, or CMOS switches in which p-channel transistors and n-channel transistors are combined can be used. Note that gate, a first terminal (one of source and drain), and a second terminal (the other of source and drain) of each transistor correspond to the control terminal, the first terminal, and the second terminal of each of the switches, respectively, and have the same connection structure.

Figure 4A:
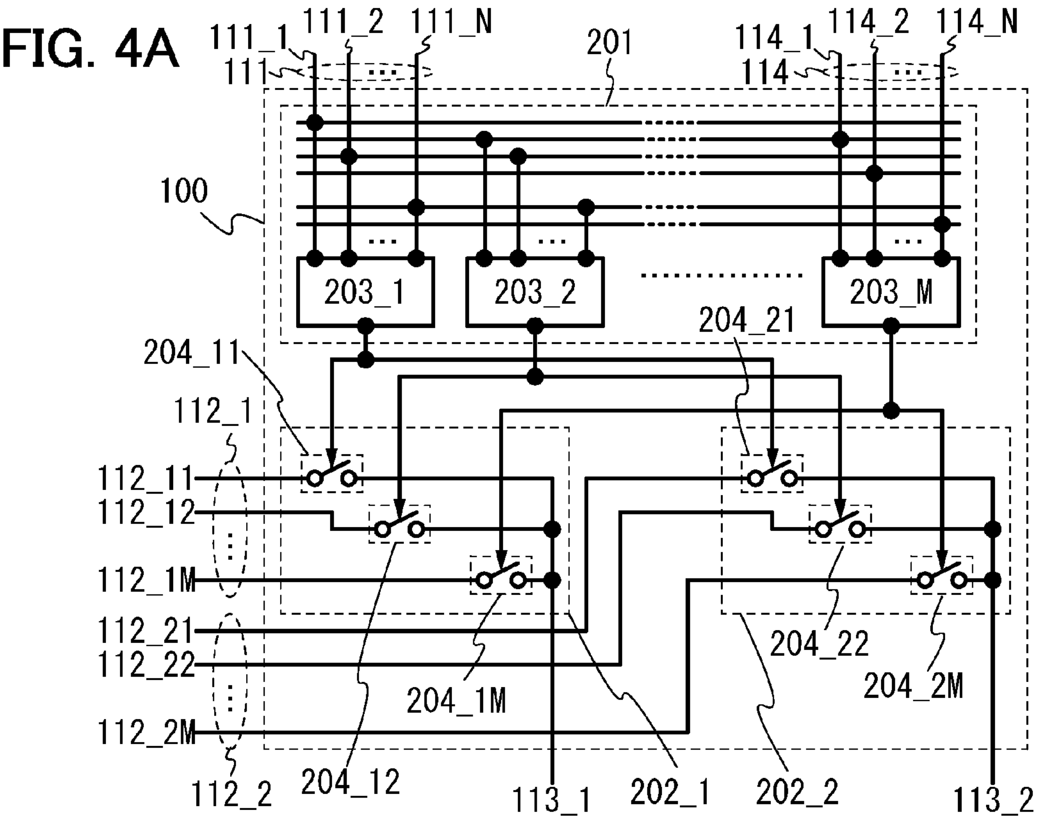
FIGS. 4A and 4B are diagrams illustrating a circuit of one embodiment of this invention.
Figure 4B:
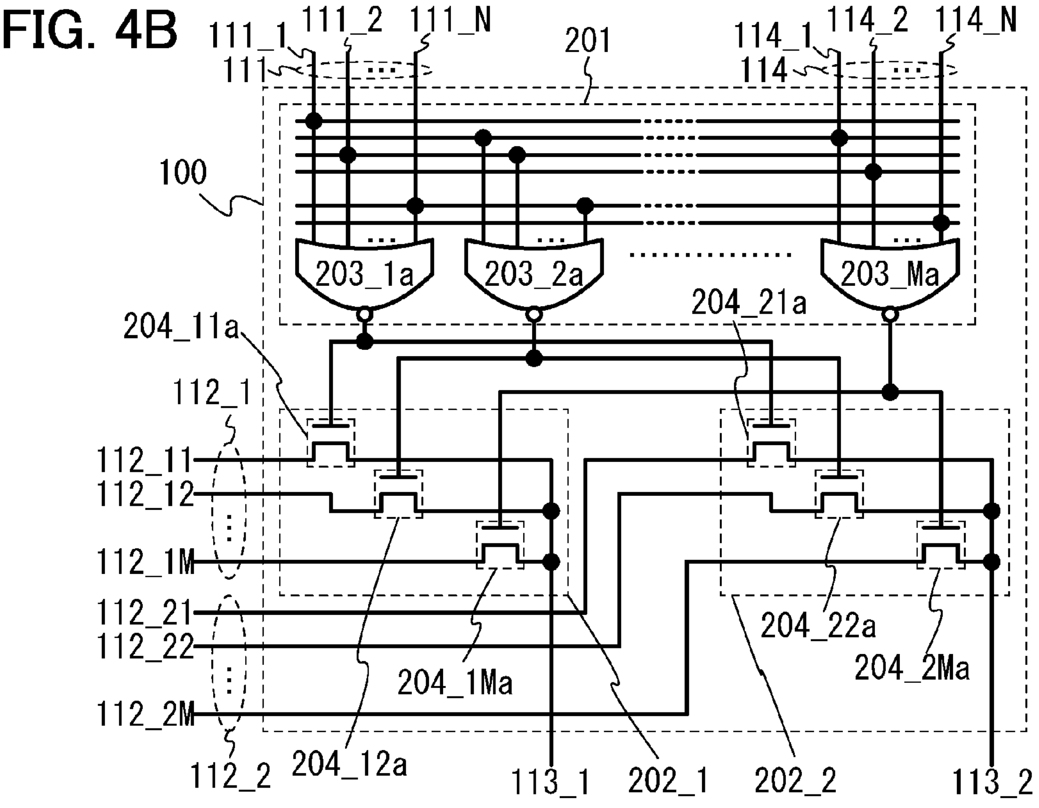

For example, the digital-analog converter portion 100 in the case where n-channel transistors are used as the switches shown in FIG. 4A will be shown in FIG. 4B.

Transistors 204_11*a* to 204_1Ma correspond to the switches 204_11 to 204_1M, respectively, and are n-channel transistors. Transistors 204_21*a* to 204_2Ma correspond to the switches 204_21 to 204_2M and are n-channel transistors.

NOR circuits 203_1*a* to 203_Ma correspond to the logic circuits 203_1 to 203_M, respectively. The NOR circuits are used because n-channel transistors are turned on when H signals are input to gate, and also because the NOR circuits output H signals when input signals are all L signals and the logic circuits output L signals when one of input signals is an H signal. However, this embodiment is not limited to this. For example, as the logic circuits 203_1 to 203_M, AND circuits, circuits in which NAND circuits and inverters are connected in series, a variety of combinational logic circuits, or the like can be used.

In order to make switching noise of the first analog signals approximately the same no matter which transistor is turned on and which voltage is selected, for example, the ratios of W/L (W is channel width and L is channel length) of the transistors 204_11*a* to 204_1Ma are preferably the same. Accordingly, in the case where the digital-analog converter portion 100 shown in FIG. 4B is used for a display device, a first subpixel expresses gray levels in accordance with the first analog signal with approximately the same switching noise no matter which transistor is turned on. Therefore, the adverse effect due to the switching noise of the first analog signal can be reduced. However, this embodiment is not limited to this. For example, when the ratio of W/L of the transistor 204_1ka is W/L1 a(k), the following is possible: W/L1 a(k−1)<W/L1 a(k)<W/L1 a(k+1). At that time, when the potential of the first terminal (the potential of the wiring 112_1 k) is V1 a(k), the following is preferable: V1 a(k−1)<V1 a (k)<V1 a(k+1).

Like the transistors 204_11 a to 204_1Ma, for example, the ratios of W/L (W is channel width and L is channel length) of the transistors 204_21 a to 204_2Ma are preferably the same. However, this embodiment is not limited to this. For example, when the ratio of W/L of the transistor 204_2 ka is W/L2 a(k), the following is possible: W/L2 a(k−1)<W/L2 a(k)<W/L2 a(k+1). At that time, when the potential of the first terminal (the potential of the wiring 112_1 k) is V2 a(k), the following is preferable: V2 a(k−1)<V2 a(k)<V2 a(k+1).

In order to make switching noise of the first analog signal approximately the same as that of the second analog signal, for example, the ratio of W/L of the transistor 204_1 ka and the ratio of W/L of the transistor 204_2 ka are preferably the same. Accordingly, in the case where the digital-analog converter portion 100 shown in FIG. 4B is used for a display device, the first subpixel and a second subpixel express gray levels in accordance with their respective signals with approximately the same switching noise. Therefore, the adverse effect due to the switching noise of the signals can be reduced. However, this embodiment is not limited to this.

The value of an H signal which is an output signal from the circuit 201 is preferably larger than the maximum value of the first voltage group and the maximum value of the second voltage group, for example, so that a voltage (Vgs) between gate and source becomes high when each transistor is turned on. In this manner, the size of each transistor can be small. On the other hand, for example, when each transistor is turned off, the voltage (Vgs) between the gate and the source may be equal to or lower than a threshold voltage. Accordingly, the value of an L signal which is an output signal from the circuit 201 is preferably equal to or smaller than the minimum value of the first voltage group or the minimum value of the second voltage group, whichever is smaller, so that the amplitude of the output signal from the circuit 201 is made to be small. In this manner, a reduction in power consumption can be achieved.

Figure 5A:
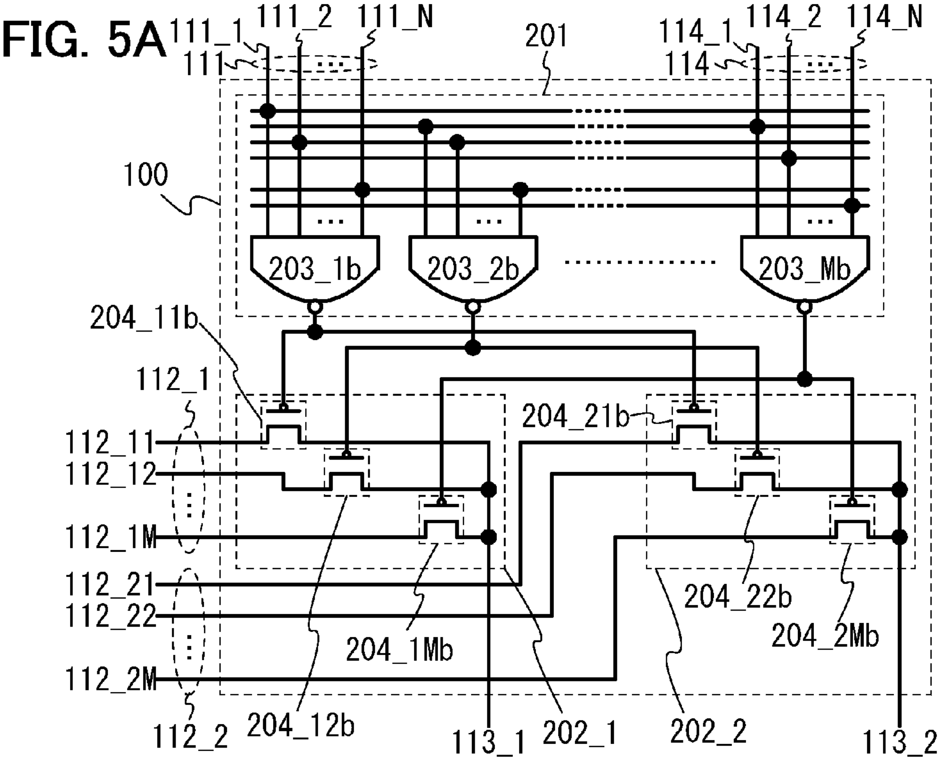
FIGS. 5A and 5B are diagrams illustrating a circuit of one embodiment of this invention.

For example, the digital-analog converter portion 100 in the case where p-channel transistors are used as the switches shown in FIG. 4A will be shown in FIG. 5A.

Transistors 204_11 b to 204_1Mb correspond to the switches 204_11 to 204_1M and are p-channel transistors. Transistors 204_21 b to 204_2Mb correspond to the switches 204_21 to 204_2M and are p-channel transistors.

NAND circuits 203_1 b to 203_Mb correspond to the logic circuits 203_1 to 203_M. The NAND circuits are used because p-channel transistors are turned on when L signals are input to gate, and also because the NAND circuit output L signals when input signals are all H signals and the NAND circuits output H signals when one of input signals is an L signal. However, this embodiment is not limited to this. For example, as the logic circuits 203_1 to 203_M, OR circuits, circuits in which NOR circuits and inverters are connected in series, a variety of combinational logic circuits, or the like can be used.

Like the transistors 204_11 a to 204_1Ma shown in FIG. 4B, the ratios of W/L (W is channel width and L is channel length) of the transistors 204_21 b to 204_2Mb are preferably the same. However, this embodiment is not limited to this. For example, when the ratio of W/L of the transistor 204_1 kb is W/L1b(k), the following is preferable: W/L1b (k−1)<W/L1b(k)<W/L1b(k+1). At that time, when the potential of the first terminal (the potential of the wiring 112_1k) of the transistor 204_1kb is V1 b(k), the following is preferable: V1b(k−1)>V1b(k)>V1b(k+1).

Like the transistors 204_21*a* to 204_2Ma shown in FIG. 4B, the ratios of W/L (W is channel width and L is channel length) of the transistors 204_21*b* to 204_2Mb are preferably the same. However, this embodiment is not limited to this. For example, when the ratio of W/L of the transistor 204_2kb is W/L2b(k), the following is preferable: W/L2b (k−1)<W/L2b(k)<W/L2b(k+1). At that time, when the potential of the first terminal (the potential of the wiring 112_1k) of the transistor 204_2kb is V2b(k), the following is preferable: V2b(k−1)>V2b(k)>V2b(k+1).

As in FIG. 4B, the ratio of W/L of the transistor 204_1kb and the ratio of W/L of the transistor 204_2kb are preferably the same. However, this embodiment is not limited to this.

The value of an L signal which is an output signal from the circuit 201 is preferably smaller than the minimum value of the first voltage group and the minimum value of the second voltage group, for example, so that the absolute value of a voltage (Vgs) between gate and source becomes large when each transistor is turned on. In this manner, the size of each transistor can be small. On the other hand, for example, when each transistor is turned off, the absolute value of the voltage (Vgs) between the gate and the source may be equal to or smaller than the absolute value of a threshold voltage. Accordingly, the value of an H signal which is an output signal from the circuit 201 is preferably equal to or larger than the maximum value of the first voltage group or the maximum value of the second voltage group, whichever is larger, so that the amplitude of the output signal from the circuit 201 is made to be small. In this manner, a reduction in power consumption can be achieved.

Note that a CMOS switch can be used as each switch. In the structure of each CMOS switch, a first terminal of an n-channel transistor and a first terminal of a p-channel transistor are connected to each other and a second terminal of the n-channel transistor and a second terminal of the p-channel transistor are connected to each other. Gate of the p-channel transistor and gate of the n-channel transistor are connected to their respective wirings. For example, the gate of the p-channel transistor is connected to the output terminal of the logic circuit 203_k and the gate of the n-channel transistor is connected to the output terminal of the logic circuit 203_k through a circuit such as an inverter, which has a function of inverting an input signal. Alternatively, the gate of the p-channel transistor is connected to the output terminal of the logic circuit 203_k through a circuit such as an inverter, which has a function of inverting an input signal and the gate of the n-channel transistor is connected to the output terminal of the logic circuit 203_k.

In the case where the CMOS switch is used as each switch, the value of the H signal which is an output signal from the circuit 201 may be approximately equal to or larger than the maximum value of the first voltage group or the maximum value of the second voltage group, whichever is larger. The value of the L signal which is an output signal from the circuit 201 may be approximately equal to or smaller than the minimum value of the first voltage group or the minimum value of the second voltage group, whichever is smaller. Accordingly, a reduction in power consumption can be achieved because the amplitude voltage of the output signal of the circuit 201 is decreased.

Note that although the case where the digital-analog converter portion 100 includes the plurality of logic circuits and the plurality of switches is described, this embodiment is not limited thereto. The digital-analog converter portion 100 may include a logic circuit having a plurality of (e.g., N) input terminals and one output terminal, a first switch, and a second switch. In the logic circuit, one input terminal (e.g., a jth input terminal) is connected to a first wiring or a second wiring and an output terminal is connected to a control terminal of the first switch and a control terminal of the second switch. A first terminal of the first switch is connected to a third wiring and a second terminal of the first switch is connected to a fourth wiring. A first terminal of the second switch is connected to a fifth wiring and a second terminal of the second switch is connected to a sixth wiring.

Note that the first wiring, the second wiring, the third wiring, the fourth wiring, the fifth wiring, and the sixth wiring correspond to one of the wirings included in the wiring group 111, one of the wirings included in the wiring group 114, one of the wirings included in the wiring group 112_1, the wiring 113_1, one of the wiring group 112_2, and the wiring 113_2, respectively. The first switch and the second switch correspond to one of the switches 204_11 to 204_1M and one of the switches 204_21 to 204_2M, respectively.

Figure 5B:
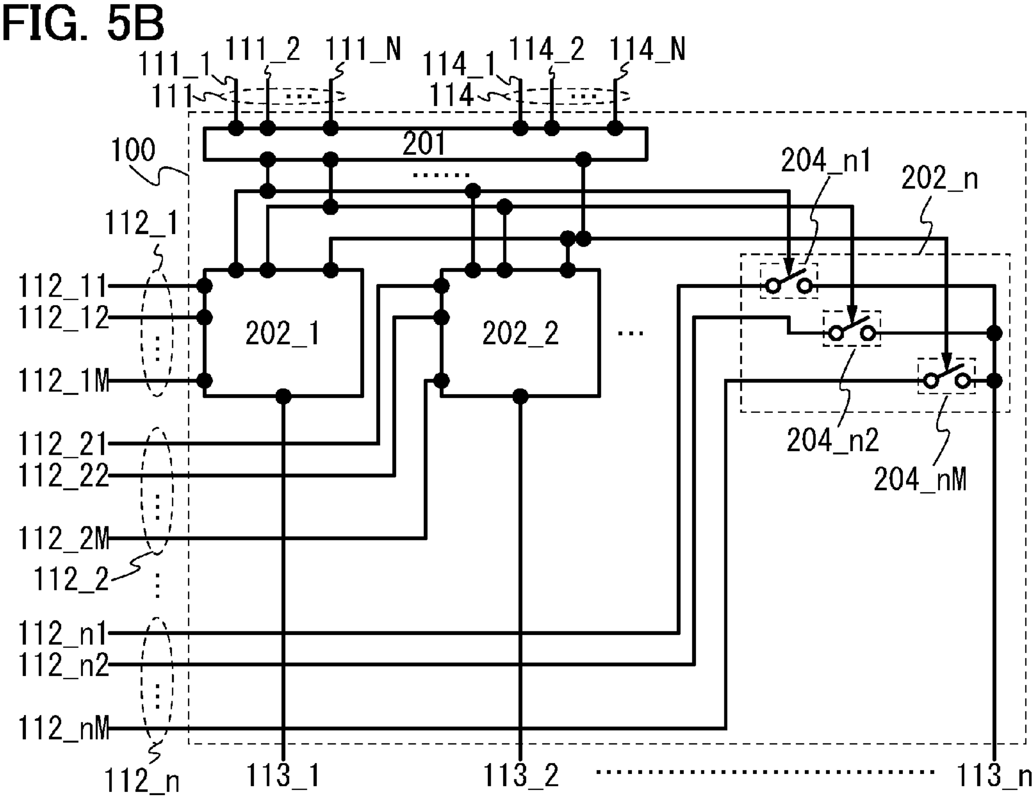

Note that as described in FIG. 1B and FIG. 3, the digital-analog converter portion 100 can convert the digital signal with N bits into n analog signals also in FIG. 4B. In this case, for example, the circuit 201 and the circuits 202_1 to 202_n are used as shown in FIG. 5B.

The circuits 202_1 to 202_n each include a plurality of switches. For example, the circuit 202_i includes switches 204_i1 to 204_iM. The switches 204_i1 to 204_iM correspond to the switches 204_11 to 204_1M or the switches 204_21 to 204_2M shown in FIG. 4A.

First terminals of the switches 204_i1 to 204_iM are connected to the wiring group 112_i, second terminals of the switches 204_i1 to 204_iM are all connected to the wiring 113_i, and control terminals of the switches 204_i1 to 204_iM are connected to the output terminals of the circuit 201.

As described above, since the digital-analog converter portion of this embodiment can convert one digital signal into a plurality of analog signals, a look-up table can be unnecessary. Therefore, heat generation or an increase in power consumption due to reading a look-up table from a memory element can be prevented.

Further, for example, in the case where a video signal is generated in a display device by using the digital-analog converter portion of this embodiment, a portion for generating the video signal and a pixel portion can be formed over the same substrate. Accordingly, since the number of connection between a panel and an external component can be reduced, poor connection in the connection portion of the panel and the external component can be suppressed, whereby improvement in reliability, an increase in yield, reduction in production cost high-definition, or the like can be achieved.

(Embodiment 3)

In this embodiment, one example of the digital-analog converter portion 100 which can separately set the polarity of each analog signal will be described with reference to FIG. 6A.

In order to separately set the polarity of each analog signal, for example, the digital-analog converter portion 100 has a first mode and a second mode. Even when the digital signals with N bits are input, the values (polarities) of the analog signals are different from each other in the first mode and the second mode in many cases.

For example, each analog signal has a positive potential in the first mode and has a negative potential in the second mode. Accordingly, the polarity of each analog signal can be separately set. However, this embodiment is not limited to this. The values and the polarities of the analog signals are the same in the first mode and the second mode in some cases. Alternatively, the values of the analog signals can be different from each other in the first mode and the second mode.

In order to switch the first mode and the second mode to each other, a selecting signal is input, for example. Thus, the digital-analog converter portion 100 is connected to a wiring 115, for example. The selecting signal is input to the wiring 115. The selecting signal is a digital signal and has a function of selecting whether the digital-analog converter portion 100 is operated with the first mode or the second mode, for example. However, in the case where the digital signal with N bits has the same function as the selecting signal, the selecting signal can be omitted.

Note that an inverted signal of the selecting signal (hereinafter such a signal is referred to as an inverted selecting signal) can be input to the digital-analog converter portion 100. In this case, for example, a new wiring is connected to the digital-analog converter portion 100 and the inverted selecting signal is input to the digital-analog converter portion 100 through this wiring. This wiring can function as a signal line, for example. Note that the terms "a selecting signal" mean a selecting signal and also an inverted selecting signal in some cases.

Note that since the selecting signal and the inverted selecting signal are input to the circuit which is the same as that receives the digital signal with N bits, for example, the amplitude voltage of the selecting signal and the amplitude voltage of the inverted selecting signal are preferably the same as that of the digital signal with N bits. However, this embodiment is not limited to this.

In order to separately set the polarity of each analog signal, a positive first voltage group, a negative first voltage group, a positive second voltage group, and a negative second voltage group are input to the digital-analog converter portion 100. In this embodiment, by increasing the number of wirings, these voltage groups are input to the digital-analog converter portion 100 at the same time. For example, the positive first voltage group, the negative first voltage group, the positive second voltage group, and the negative second voltage group are input to a wiring group 112p_1, a wiring group 112n_1, a wiring group 112p_2, and a wiring group 112n_2, respectively.

Note that the wiring group 112p_1 and the wiring group 112n_1 can be collectively denoted as the wiring group 112_1. Also, the wiring group 112p_2 and the wiring group 112n_2 can be collectively denoted as the wiring group 112_2.

Note that the positive first voltage group and the negative first voltage group can be collectively denoted as the first voltage group. Also, the positive second voltage group and the negative second voltage group can be collectively denoted as the second voltage group.

Note that the minimum voltage of the positive first voltage group and the maximum voltage of the negative first voltage group are the same in some cases. Similarly, the minimum voltage of the positive second voltage group and the maximum voltage of the negative second voltage group are the same in some cases.

Next, the operation of the digital-analog converter portion 100 shown in FIG. 6A will be described.

The digital signal with N bits, the positive first voltage group, the negative first voltage group, the positive second voltage group, the negative second voltage group, and the selecting signal are input to the digital-analog converter portion 100.

In the first mode, in accordance with the digital signal with N bits, the digital-analog converter portion 100 brings one of the wiring group 112p_1 and the wiring 113_1 into conduction so that the potentials thereof are the same. At the same time, in accordance with the digital signal with N bits, the digital-analog converter portion 100 brings one of the wiring group 112p_2 and the wiring 113_2 into conduction so that the potentials thereof are made to be the same.

In this manner, in the first mode, the digital-analog converter portion 100 converts the digital signal with N bits into a positive first analog signal and a positive second analog signal. Alternatively, in accordance with the digital signal with N bits, the digital-analog converter portion 100 outputs one of the positive first voltage group to the wiring 113_1 as the positive first analog signal and outputs one of the positive second voltage group to the wiring 113_2 as the positive second analog signal.

On the other hand, in the second mode, in accordance with the digital signal with N bits, the digital-analog converter portion 100 brings one of the wiring group 112n_1 and the wiring 113_1 into conduction so that the potentials thereof are made to be the same. At the same time, in accordance with the digital signal with N bits, the digital-analog converter portion 100 brings one of the wiring group 112n_2 and the wiring 113_2 into conduction so that the potentials thereof are made to be the same.

In this manner, in the second mode, the digital-analog converter portion 100 converts the digital signal with N bits into a negative first analog signal and a negative second analog signal. Alternatively, in accordance with the digital signal with N bits, the digital-analog converter portion 100 outputs one of the positive first voltage group to the wiring 113_1 as the negative first analog signal and outputs one of the negative second voltage group to the wiring 113_2 as the negative second analog signal.

Note that in the digital-analog converter portion 100, the polarities of the first analog signal and the second analog signal can be set to be different from each other in each mode. In order to realize this, for example, the positive second voltage group is input to the wiring group 112n_2 and the negative second voltage group is input to the wiring group 112p_2.

Next, one example of the digital-analog converter portion 100 shown in FIG. 6A will be described with reference to FIG. 6B.

The digital-analog converter portion 100 includes a circuit 201p, a circuit 201n, a circuit 202p_1, a circuit 202n_1, a circuit 202p_2, and a circuit 202n_2.

The circuit 201p and the circuit 201n correspond to the circuit 201 shown in FIG. 4A. The circuit 202p_1 and the circuit 202n_1 correspond to the circuit 202_1 shown in FIG. 4A. The circuit 202p_2 and the circuit 202n_2 correspond to the circuit 202_2 shown in FIG. 4A.

Note that the circuit 201p and the circuit 201n can be collectively denoted as a first circuit. The circuit 202p_1 and the circuit 202n_1 can be collectively denoted as a second circuit. The circuit 202p_2 and the circuit 202n_2 can be collectively denoted as a third circuit.

The circuit 201p is connected to the wiring group 111, the wiring group 114, and the wiring 115. The circuit 201n is connected to the wiring group 111, the wiring group 114, and the wiring 116. The circuit 202p_1 is connected to the wiring group 112p_1, the wiring 113_1, and an output terminal of the circuit 201p. The circuit 202n_1 is connected to the wiring group 112n_1, the wiring 113_1, and an output terminal of the circuit 201n. The circuit 202p_2 is connected to the wiring group 112p_2, the wiring 113_2, and the output terminal of the circuit 201p. The circuit 202n_2 is connected to the wiring group 112n_2, the wiring 113_2, and the output terminal of the circuit 201n.

An inverted selecting signal is input to the wiring 116, for example. However, the wiring 115 and the wiring 116 are connected to each other through an inverter, so that a selecting signal input to the wiring 115 is inverted by the inverter and input to the wiring 116. In this manner, the inverted selecting signal can be omitted.

Next, the operation of the digital-analog converter portion 100 shown in FIG. 6B will be described.

The digital signal with N bits, the inverted digital signal with N bits, and the selecting signal are input to the circuit 201p and the digital signal with N bits, the inverted digital signal with N bits, and the inverted selecting signal are input to the circuit 201n.

Like the circuit 201 shown in FIG. 2A, the circuit 201p converts the digital signal with N bits, the inverted digital signal with N bits, and the selecting signal into digital signals. The circuit 201n converts the digital signal with N bits, the inverted digital signal with N bits, and the inverted selecting signal into digital signals.

Like the circuit 201 in FIG. 2A, the number of bits of the digital signal generated in this circuit 201p and the number of bits of the digital signal generated in the circuit 202n correspond to the number of the voltages in the positive first voltage group, the number of the voltages in the negative first voltage group, the number of the voltages in the positive second voltage group, or the number of voltages in the negative second voltage group in many cases. Accordingly, for example, in the case where the number of these voltages is M, the number of bits of the digital signal generated in this circuit 201p and the number of bits of the digital signal generated in the circuit 202n are M, like the circuit 201 shown in FIG. 2A. Here, the digital signal generated in the circuit 201p is denoted as a first digital signal with M bits and the digital signal generated in the circuit 201n is denoted as a second digital signal with M bits.

After that, the circuit 201p inputs the first digital signal with M bits to the circuit 202p_1 and the circuit 202p_2 so that the circuit 202p_1 and the circuit 202p_2 are controlled. The circuit 201n inputs the second digital signal with M bits to the circuit 202n_1 and the circuit 202n_2 so that the circuit 202n_1 and the circuit 202n_2 are controlled.

In specific, in the first mode, the circuit 202p_1 brings one of the wiring group 112p_1 and the wiring 113_1 into conduction in accordance with the first digital signal with M bits, so that the potentials thereof are the same. At the same time, the circuit 202p_2 brings one of the wiring group 112p_2 and the wiring 113_2 into conduction in accordance with the first digital signal with M bits, so that the potentials thereof are made to be the same. At that time, the circuit 202n_1 brings the wiring group 112n_1 and the wiring 113_1 into non-conduction, and the circuit 202n_2 brings the wiring group 112n_2 and the wiring 113_2 into non-conduction.

In this manner, in the first mode, the circuit 202p_1 converts the first digital signal with M bits into the positive first analog signal and outputs the positive first analog signal to the wiring 113_1. The circuit 202p_2 converts the first digital signal with M bits into the positive second analog signal and outputs the positive second analog signal to the wiring 113_2. Alternatively, in the first mode, the circuit 202p_1 outputs one of the positive first voltage group to the wiring 113_1 as the positive first analog signal in accordance with the first digital signal with M bits. The circuit 202p_2 outputs one of the positive second voltage group to the wiring 113_2 as the positive second analog signal in accordance with the first digital signal with M bits.

On the other hand, in the second mode, the circuit 202n_1 brings one of the wiring group 112n_1 and the wiring 113_1 into conduction in accordance with the second digital signal with M bits, so that the potentials thereof are made to be the same. At the same time, the circuit 202n_2 brings one of the wiring group 112n_2 and the wiring 113_2 into conduction in accordance with the second digital signal with M bits, so that the potentials thereof are made to be the same. At that time, the circuit 202p_1 brings the wiring group 112p_1 and the wiring 113_1 into non-conduction, and the circuit 202p_2 brings the wiring group 112p_2 and the wiring 113_2 into non-conduction.

In this manner, in the second mode, the circuit 202n_1 converts the second digital signal with M bits into the negative first analog signal and outputs the negative first analog signal to the wiring 113_1. The circuit 202n_2 converts the second digital signal with M bits into the negative second analog signal and outputs the negative second analog signal to the wiring 113_2. Alternatively, in the second mode, the circuit 202n_1 outputs one of the negative first voltage group to the wiring 113_1 as the negative first analog signal in accordance with the second digital signal with M bits. The circuit 202n_2 outputs one of the negative second voltage group to the wiring 113_2 as the negative second analog signal with respect to the second digital signal with M bits.

Note that the first digital signal with M bits and the second digital signal with M bits each correspond to the digital signal with M bits described in FIG. 2A.

Note that the first digital signal with M bits and the second digital signal with M bits can be collectively denoted as a second digital signal.

Note that the selecting signal can be denoted as a third digital signal. However, the selecting signal and the inverted selecting signal can be collectively denoted as the third digital signal.

No that the polarities of the first analog signal and the second analog signal can be different from each other. For example, in order to achieve this, the positive second voltage group is input to the wiring group 112n_2 and the negative second voltage group is input to the wiring group 112p_2.

Next, with reference to FIG. 7, specific examples of the circuits 201p, 201n, 202p_1, 202n_1, 202p_2, and 202n_2 in FIG. 6B will be described.

Like the circuit 201 shown in FIG. 4A, the circuit 201p includes a plurality of logic circuits, for example, logic circuits 203p_1 to 203p_M. The circuit 201n includes a plurality of logic circuits, for example, logic circuits 203n_1 to 203n_M.

Like the logic circuits 203_1 to 203_M shown in FIG. 4A, the logic circuits 203p_1 to 203p_M and the logic circuits 203n_1 to 203n_M each include a plurality of input terminals. For example, since the circuit 201p is connected to the wiring 115 as well as the wiring group 111 and the wiring group 114 and the circuit 201n is connected to the wiring 116, the number of the input terminals is (N+1).

Like the circuit 202_1 shown in FIG. 4A, the circuit 202p_1 includes a plurality of switches, for example, switches 204p_11 to 204p_1M. The circuit 202n_1 includes a plurality of switches, for example, switches 204n_11 to 204n_1M.

Like the circuit 202_2 shown in FIG. 4A, the circuit 202p_2 includes a plurality of switches, for example, switches 204p_21 to 204p_2M. The circuit 202n_2 includes a plurality of switches, for example, switches 204n_21 to 204n_2M.

An output terminal of a logic circuit 203p_k is connected to a control terminal of a switch 204p_1k and a control terminal of a switch 204p_2k. An output terminal of a logic circuit 203n_k is connected to a control terminal of a switch 204n_1k and a control terminal of a switch 204n_2k.

A first terminal of the switch 204p_1k is connected to a wiring 112p_1k. A second terminal of the switch 204p_1k is connected to a wiring 113_1. A first terminal of the switch 204n_1k is connected to a wiring 112n_1k. A second terminal of the switch 204n_1k is connected to the wiring 113_1. A first terminal of the switch 204p_2k is connected to a wiring 112p_2k. A second terminal of the switch 204p_2k is connected to a wiring 113_2. A first terminal of the switch 204n_2k is connected to a wiring 112n_2k. A second terminal of the switch 204n_2k is connected to a wiring 113_2.

Next, the operation of the digital-analog converter portion 100 shown in FIG. 7 will be described.

The digital signal with N bits, the inverted digital signal with N bits, and the selecting signal are input to the logic circuits 203p_1 to 203p_M, and the digital signal with N bits, the inverted digital signal with N bits, and the inverted selecting signal are input to the input terminals of the logic circuits 203n_1 to 203n_M.

The logic circuits 203p_1 to 203p_M each output an H signal or an L signal in accordance with a combination of the digital signal with N bits and the inverted digital signal with N bits input. The logic circuits 203n_1 to 203n_M each output an H signal or an L signal in accordance with a combination of the digital signal with N bits and the inverted digital signal with N bits input.

For example, in the case where each switch is turned on when an H signal is input to the control terminal of the switch, in the first mode, one of the logic circuits 203p_1 to 203p_M outputs an H signal, and the logic circuits 203n_1 to 203n_M and the other of the logic circuits 203p_1 to 203p_M all output L signals. On the other hand, in the second mode, one of the logic circuits 203n_1 to 203n_M outputs an H signal, and the logic circuits 203p_1 to 203p_M and the other of the logic circuits 203n_1 to 203n_M all output L signals.

In another example, in the case where each switch is turned on when an L signal is input to the control terminal of the switch, in the first mode, one of the logic circuits 203p_1 to 203p_M outputs an L signal, and the logic circuits 203n_1 to 203n_M and the other of the logic circuits 203p_1 to 203p_M all output H signals. On the other hand, in the second mode, one of the logic circuits 203n_1 to 203n M outputs an L signal, and the logic circuits 203p_1 to 203p_M and the other of the logic circuits 203n_1 to 203n_M all output H signals.

Figure 6B:
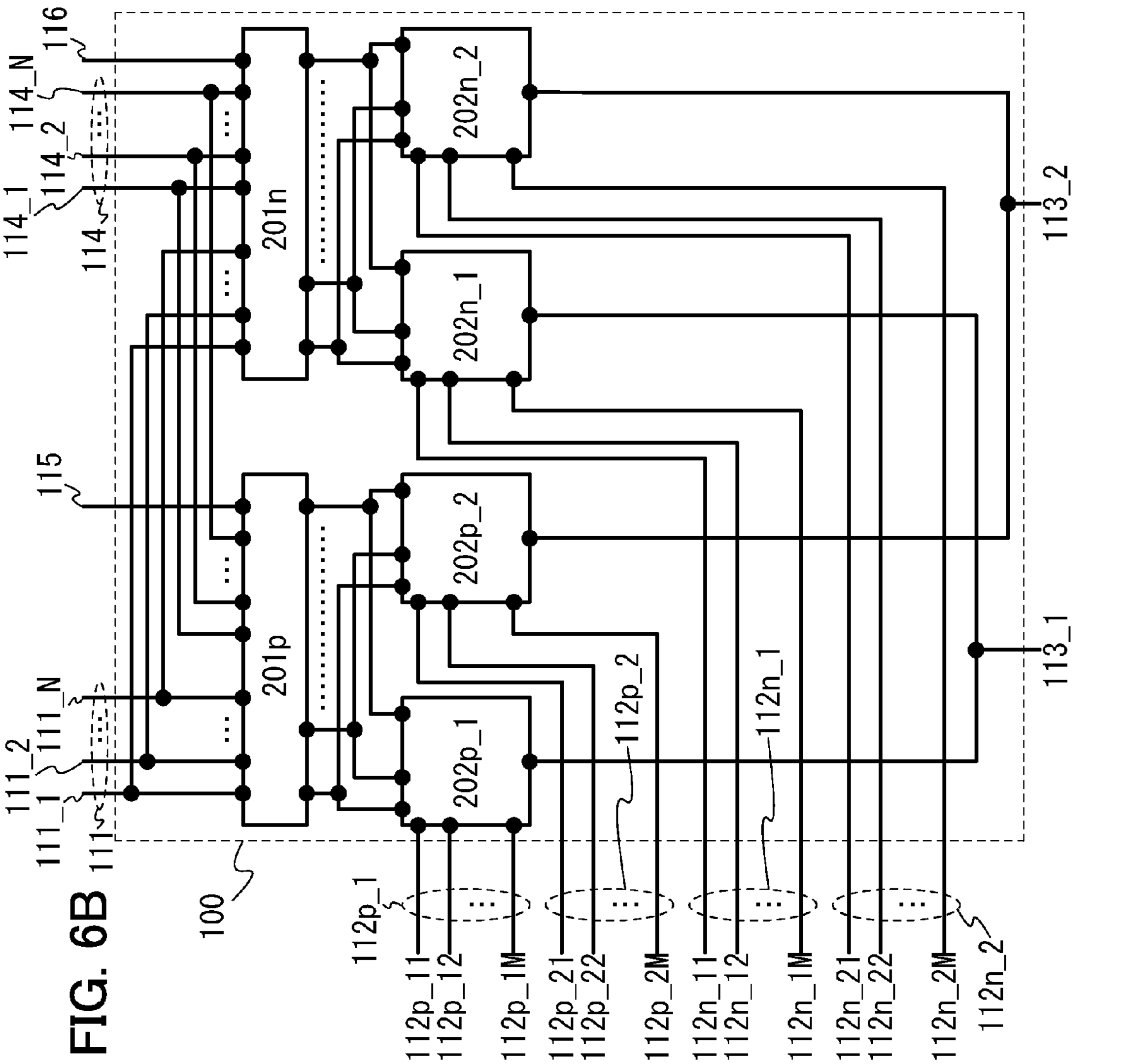
FIGS. 6A and 6B are diagrams illustrating a circuit of one embodiment of this invention.
Figure 6A:
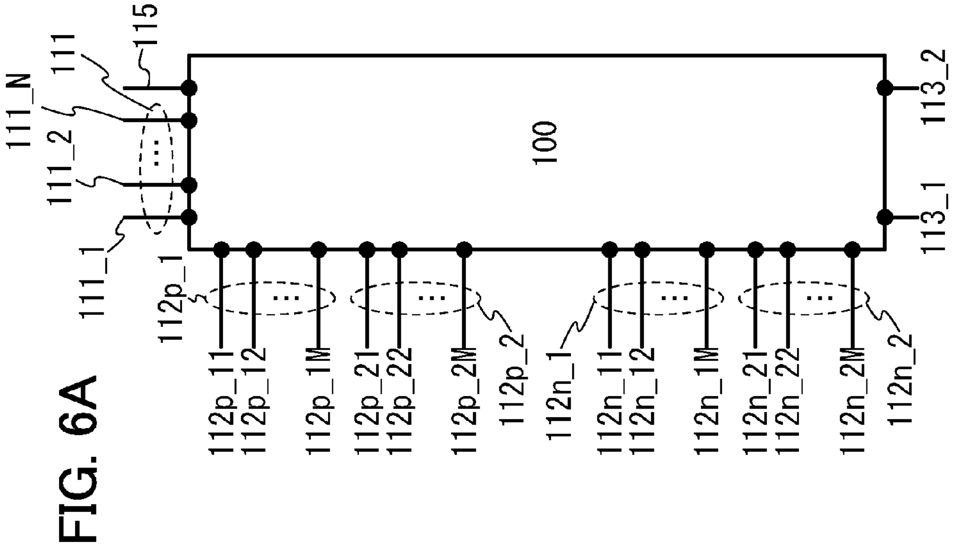
Figure 7:
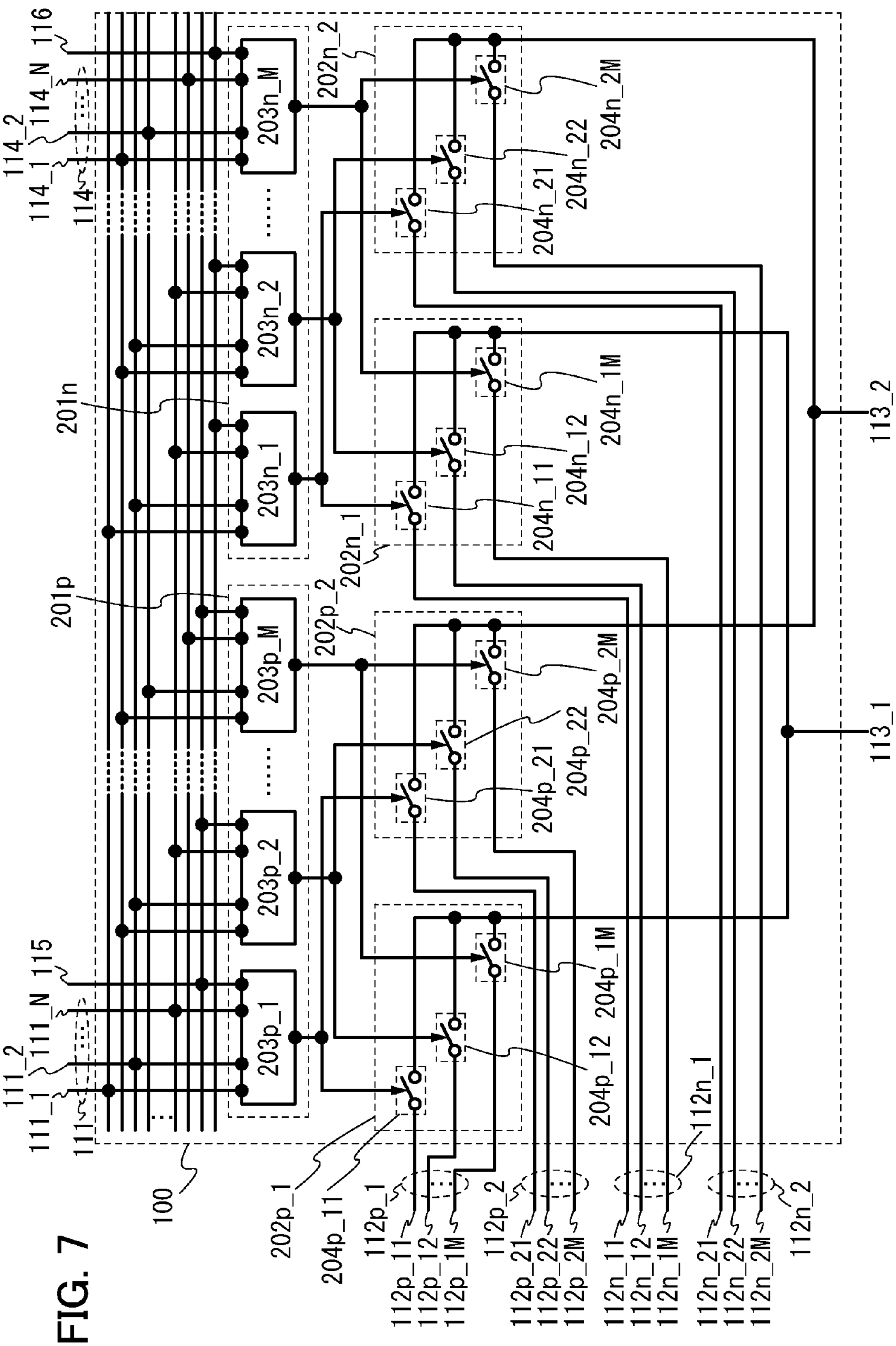
FIG. 7 is a diagram illustrating a circuit of one embodiment of this invention.

Note that output signals of the logic circuits 203p_1 to 203p_M correspond to the first digital signal with M bits in FIG. 6B. Output signals of the logic circuits 203n_1 to 203n_M correspond to the second digital signal with M bits in FIG. 6B.

After that, the logic circuits 203p_1 to 203p_M input the first digital signals with M bits to control terminals of the switches 204p_11 to 204p_1M and control terminals of switches the 204p_21 to 204p_2M, so that on and off of the switches 204p_11 to 204p_1M and the switches 204p_21 to 204p_2M are controlled. For example, the logic circuit 203p_k (k is one of 1 to M) inputs the digital signal to the control terminal of the switch 204p_1k and the control terminal of the switch 204p_2k, so that on and off of the switches 204p_1k and 204p_2k is controlled. Accordingly, the timings of on and off of the switch 204p_1k and the switch 204p_2k are approximately the same in many cases.

At the same time, the logic circuits 203n_1 to 203n_M input the second digital signals with M bits to control terminals of the switches 204n_11 to 204n_1M and control terminals of the switches 204n_21 to 204n_2M, so that on and off of the switches 204n_11 to 204n_1M and the switches 204n_21 to 204n_2M are controlled. For example, the logic circuit 203n_k (k is one of 1 to M) inputs the digital signal to the control terminal of the switch 204n_1k and the control terminal of the switch 204n_2k, so that on and off of the switches 204n_1k and 204n_2k is controlled. Accordingly, the timings of on and off the switch 204n_1k and the switch 204n_2k are approximately the same in many cases.

Specifically, in the first mode, when one of the switches 204p_11 to 204p_1M is turned in response to the first digital signal with M bits, the switches 204p_11 to 204p_1M bring one of the wiring group 112p_1 and the wiring 113_1 into conduction, and the potentials thereof are made to be equal, for example. At the same time, in the first mode, when one of the switches 204p_21 to 204p_2M is turned on in response to the first digital signal with M bits, the switches 204p_21 to 204p_2M bring one of the wiring group 112p_2 and the wiring 113_2 into conduction, and the potentials thereof are made to be the same, for example. At that time, the switches 204n_11 to 204n_1M and the switches 204n_21 to 204n_2M are all turned off with respect to the second digital signal with M bits.

On the other hand, in the second mode, when one of the switches 204n_11 to 204n_1M is turned on in response to the second digital signal with M bits, the switches 204n_11 to 204n_1M bring one of the wiring group 112n_1 and the wiring 113_1 into conduction, and the potentials thereof are made to be the same, for example. At the same time, in the second mode, when one of the switches 204n_1 to 204n_2M is turned on in response to the second digital signal with M bits, the switches 204n_21 to 204n_2M bring one of the wiring group 112n_2 and the wiring 113_2 into conduction, and the potentials thereof are made to be the same, for example. At that time, the switches 204p_11 to 204p_1M and the switches 204p_21 to 204p_2M are all turned off with respect to the first digital signal with M bits.

No that the polarities of the first analog signal and the second analog signal can be different from each other. For example, in order to differentiate the potentials, the positive second voltage group is input to the wiring group 112n_2 and the negative second voltage group is input to the wiring group 112p_2.

Note that as the logic circuits 203p_1 to 203p_M and the logic circuits 203n_1 to 203n_M, for example, one of AND circuits, OR circuits, NAND circuits, NOR circuits, XOR circuits, XNOR circuits, and the like, or combinational circuits thereof can be used, like the logic circuits shown in FIG. 4A.

Note that as the switches 204p_11 to 204p_1M, the switches 204n_11 to 204n_1M, the switches 204p_21 to 204p_2M, and the switches 204n_21 to 204n_2M, for example, p-channel transistors, n-channel transistors, or CMOS switches in which p-channel transistors and n-channel transistors are combined can be used.

Note that although the case where the digital-analog converter portion 100 includes the plurality of logic circuits and the plurality of switches is described, this embodiment is not limited thereto. The digital-analog converter portion 100 may include a first logic circuit having (N+1) input terminals and one output terminal, a second logic circuit having (N+1) input terminals and one output terminal, a first switch, a second switch, a third switch, and a fourth switch. In the first logic circuit, a jth (j is one of 1 to N) input terminal is connected to the first wiring or the second wiring, the (N+1)th input terminal is connected to the third wiring, and the output terminal is connected to a control terminal of the first switch and a control terminal of the second switch. In the second logic circuit, a jth input terminal is connected to the first wiring or the second wiring, the (N+1)th input terminal is connected to the fourth wiring, and the output terminal is connected to a control terminal of the third switch and a control terminal of the fourth switch. The first terminal of the first switch is connected to the fifth wiring and a second terminal of the first switch is connected to the sixth wiring. A first terminal of the second switch is connected to a seventh wiring and a second terminal of the second switch is connected to an eighth wiring. A first terminal of the third switch is connected to a ninth wiring, a second terminal of the third switch is connected to a tenth wiring, a first terminal of the fourth switch is connected to the tenth wiring, and the second terminal of the fourth switch is connected to the eighth wiring.

Note that the first wiring, the second wiring, the third wiring, the fourth wiring, the fifth wiring, the sixth wiring, the seventh wiring, the eighth wiring, the ninth wiring, and the tenth wiring correspond to one of the wiring group 111, one of the wiring group 114, the wiring 115, the wiring 116, one of the wiring group 112p_1, the wiring 113_1, one of the wiring group 112p_2, the wiring 113_2, one of the wiring group 112 n_1, and one of the wiring group 112n_2, respectively.

Note that the first logic circuit, the second logic circuit, the first switch, the second switch, the third switch, and the fourth switch correspond to one of the plurality of logic circuits 203p_1 to 203p_M, one of the logic circuits 203n_1 to 203n_M, one of the switches 204p_11 to 204p_1M, one of the switches 204p_21 to 204 p_2M, one of the switches 204n_11 to 204n_1M, and one of the switches 204 n_21 to 204n_2M, respectively.

As described above, since the digital-analog converter portion of this embodiment can convert one digital signal into a plurality of analog signals, a look-up table can be unnecessary. Therefore, heat generation or an increase in power consumption, or the like due to reading a look-up table from a memory element can be prevented.

Further, for example, in the case where a video signal is generated in a display device by using the digital-analog converter portion of this embodiment, a portion for generating the video signal and a pixel portion can be formed over the same substrate. Accordingly, since the number of connection between a panel and an external component can be reduced, poor connection in the connection portion of the panel and the external component can be suppressed, whereby improvement in reliability, an increase in yield, reduction in production cost high-definition, or the like can be achieved.

(Embodiment 4)

Figure 8A:
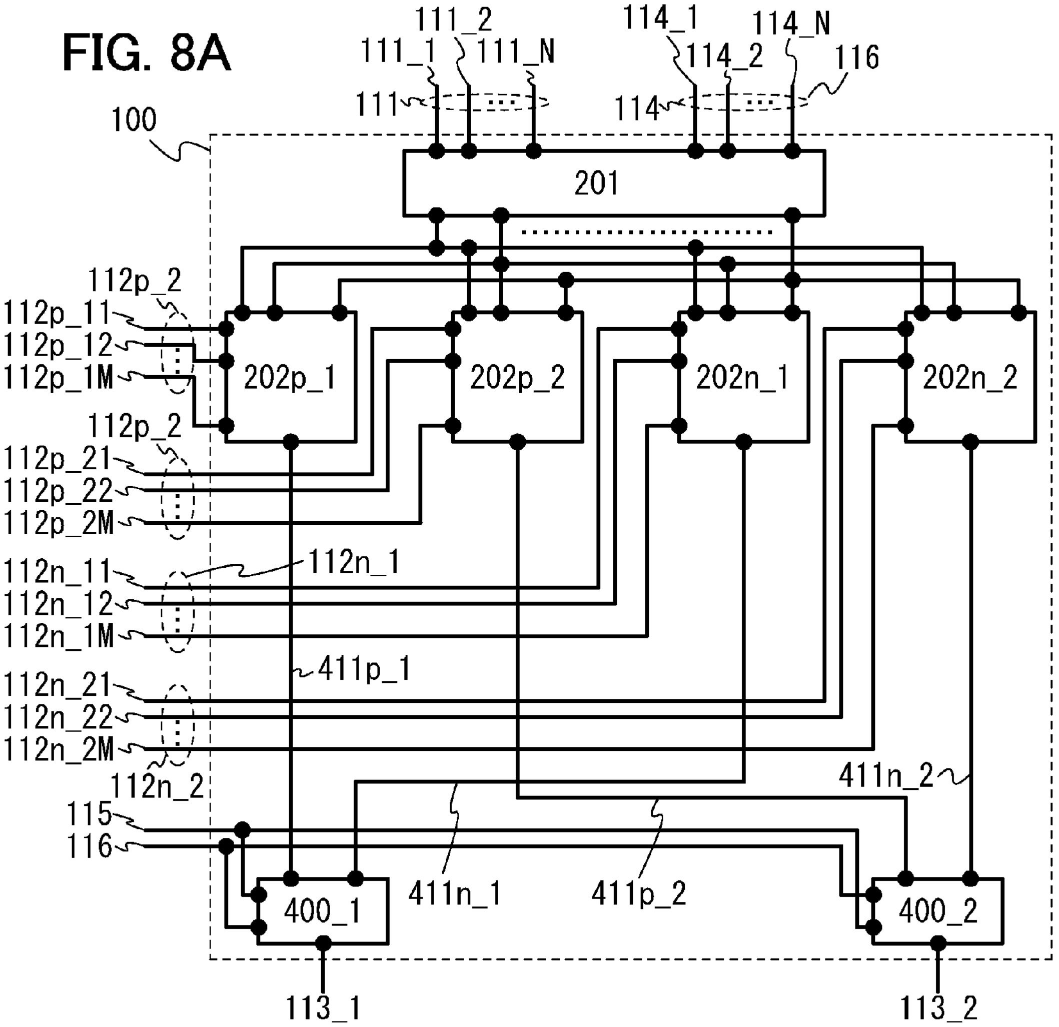
FIGS. 8A to 8C are diagrams illustrating a circuit of one embodiment of this invention.

In this embodiment, one example of the digital-analog converter portion 100 which can separately set the polarities analog signals by a method different from that of Embodiment 3 will be described with reference to FIG. 8A.

The digital-analog converter portion 100 in this embodiment has a first mode and a second mode, as in Embodiment 3.

The digital-analog converter portion 100 includes the circuit 201, the circuit 202p_1, the circuit 202n_1, the circuit 202p_2, the circuit 202n_2, a circuit 400_1, and a circuit 400_2.

The circuit 201 is connected to the wiring group 111 and the wiring group 114. The circuit 202p_1 is connected to the wiring group 112p_1, a wiring 411p_1, and the output terminal of the circuit 201. The circuit 202n_1 is connected to the wiring group 112n_1, a wiring 411n_1, and the output terminal of the circuit 201. The circuit 202p_2 is connected to the wiring group 112p_2, a wiring 411p_2, and the output terminal of the circuit 201. The circuit 202n_2 is connected to the wiring group 112n_2, a wiring 411n_2, and the output terminal of the circuit 201. The circuit 400_1 is connected to the wiring 411p_1, the wiring 411n_1, the wiring 113_1, the wiring 115, and the wiring 116. The circuit 400_2 is connected to the wiring 411p_2, the wiring 411n_2, the wiring 113_2, the wiring 115, and the wiring 116.

Next, the operation of the digital-analog converter portion 100 shown in FIG. 8A will be described.

A digital signal with N bits and an inverted digital signal with N bits are input to the circuit 201.

As in FIG. 4A, the circuit 201 generates a digital signal with M bits in accordance with the digital signal with N bits and the inverted signal with N bits.

After that, the circuit 201 input the digital signal with M bits to the circuit 202p_1, the circuit 202n_1, the circuit 202p_2, and the circuit 202n_2 to control the circuit 202p_1, the circuit 202n_1, the circuit 202p_2, and the circuit 202n_2.

In accordance with the digital signal with M bits, the circuit 202p_1 brings one of the wiring group 112p_1 and the wiring 411p_1 into conduction, and the potentials thereof are made to be approximately equal. With respect to the digital signal with M bits, the circuit 202n_1 brings one of the wiring group 112n_1 and the wiring 411n_1 into conduction, and the potentials thereof are made to be approximately the same. With respect to the digital signal with M bits, the circuit 202p_2 brings one of the wiring group 112p_2 and the wiring 411p_2 into conduction, and the potentials thereof are made to be approximately the same. With respect to the digital signal with M bits, the circuit 202n_2 brings one of the wiring group 112n_2 and the wiring 411n_2 into conduction, and the potentials thereof are made to be approximately the same.

In this manner, one of the positive first voltage group is input from the circuit 202p_1 to the circuit 400_1 through the wiring 411p_1, and one of the negative first voltage group is input from the circuit 202n_1 to the circuit 400_1 through the wiring 411n_1. At the same time, one of the positive second voltage group is input from the circuit 202p_2 to the circuit 400_2 through the wiring 411p_2, and one of the negative second voltage group is input from the circuit 202n_2 to the circuit 400_2 through the wiring 411n_2.

Then, in accordance with a selecting signal and an inverted selecting signal, the circuit 400_1 outputs one of the positive first voltage group or one of the negative first voltage group to the wiring 113_1 as a first analog signal. With respect to the selecting signal and the inverted selecting signal, in the first mode, the circuit 400_1 brings the wiring 411p_1 and the wiring 113_1 into conduction, and the potentials thereof are made to be the same, for example. In this manner, one of the positive first voltage group is output to the wiring 113_1 as a positive first analog signal. On the other hand, with respect to the selecting signal and the inverted selecting signal, in the second mode, the circuit 400_1 brings the wiring 411n_1 and the wiring 113_1 into conduction, and the potentials thereof are made to be the same, for example. In this manner, one of the negative first voltage group is output to the wiring 113_1 as a negative first analog signal.

Further, with respect to a selecting signal and an inverted selecting signal, the circuit 400_2 outputs one of the positive second voltage group or one of the negative second voltage group to the wiring 113_2 as a second analog signal. With respect to the selecting signal and the inverted selecting signal, in the first mode, the circuit 400_2 brings the wiring 411p_2 and the wiring 113_2 into conduction, and the potentials thereof are made to be the same, for example. In this manner, one of the positive second voltage group is output to the wiring 113_2 as a positive second analog signal. On the other hand, with respect to the selecting signal and the inverted selecting signal, in the second mode, the circuit 400_2 brings the wiring 411n_2 and the wiring 113_2 into conduction, and the potentials thereof are made to be approximately the same, for example. In this manner, one of the negative second voltage group is output to the wiring 113_2 as a negative second analog signal.

Figure 8B:
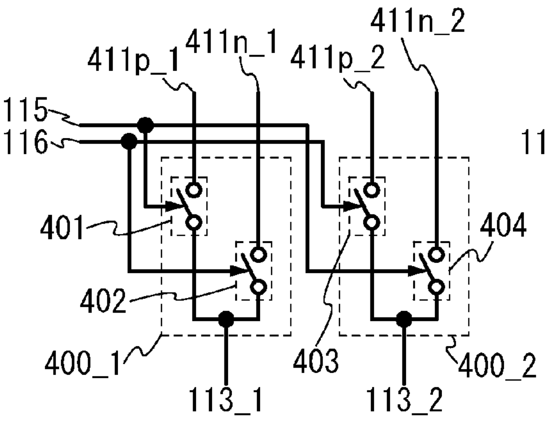

Note that as specific examples of the circuit 400_1 and the circuit 400_2, circuits shown in FIG. 8B can be used. The circuit 400_1 includes a switch 401 and a switch 402, and the circuit 400_2 includes a switch 403 and a switch 404. A first terminal of the switch 401 is connected to the wiring 411p_1, a second terminal of the switch 401 is connected to the wiring 113_1, and a control terminal of the switch 401 is connected to the wiring 115. A first terminal of the switch 402 is connected to the wiring 411n_1, a second terminal of the switch 402 is connected to the wiring 113_1, and a control terminal of the switch 402 is connected to the wiring 116. A first terminal of the switch 403 is connected to the wiring 411p_2, a second terminal of the switch 403 is connected to the wiring 113_2, and a control terminal of the switch 403 is connected to the wiring 115. A first terminal of the switch 404 is connected to the wiring 411n_2, a second terminal of the switch 404 is connected to the wiring 113_2, and a control terminal of the switch 404 is connected to the wiring 116.

The operation of the circuit 400_1 and the circuit 400_2 will be described.

In the first mode, the switch 401 is turned on in response to the selecting signal and brings the wiring 411p_1 and the wiring 113_1 into conduction, and the potentials thereof are made to be the same. At the same time, the switch 403 is turned on with respect to the selecting signal and brings the wiring 411p_2 and the wiring 113_2 into conduction, and the potentials thereof are made to be the same. At that time, the switch 402 and the switch 404 are turned off with respect to the inverted selecting signal.

On the other hand, in the second mode, the switch 402 is turned on with respect to the inverted selecting signal and brings the wiring 411n_1 and the wiring 113_1 into conduction, so that the potentials thereof are made to be the same. At the same time, the switch 404 is turned on with respect to the inverted selecting signal and brings the wiring 411n_2 and the wiring 113_2 into conduction, so that the potentials thereof are made to be the same. At that time, the switch 401 and the switch 403 are turned off with respect to the selecting signal.

Note that in order to make the polarities of the first analog signal and the second analog signal different from each other, the control terminal of the switch 403 can be connected to the wiring 116 and the control terminal of the switch 404 can be connected to the wiring 115.

Note that as the switches 401, 402, 403, and 404, p-channel transistors, n-channel transistors, or CMOS switches in which n-channel transistors and p-channel transistors are combined can be used. Note that gate, a first terminal (one of source and drain), and a second terminal (the other of source and drain) of each transistor correspond to the control terminal, the first terminal, and the second terminal of each of the switches, respectively, and have the same connection structure.

Figure 8C:
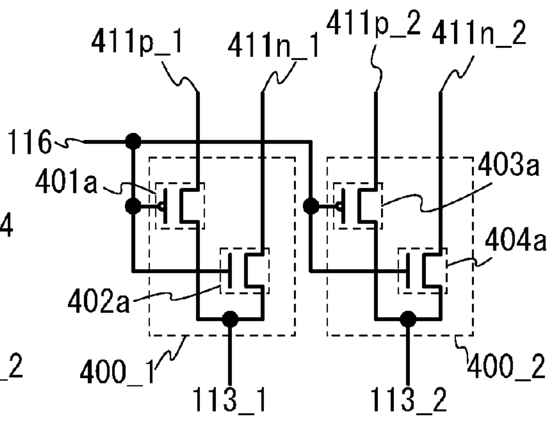

In specific, as shown in FIG. 8C, as the switches 401, 402, 403, and 404, a transistor 401*a*, a transistor 402*a*, a transistor 403*a*, and a transistor 404*a* are preferably used, respectively. The transistor 401*a* and the transistor 403*a* are p-channel transistors and the transistor 402*a* and the transistor 404*a* are n-channel transistors. Further, control terminals of the transistor 401*a*, 402*a*, 403*a*, and 404*a* are all connected to the same wiring (the wiring 116 in FIG. 8C). Accordingly, one of the wiring 115 and the wiring 116 can be omitted.

Here, since a positive voltage is input to a first terminal of the transistor 401*a* and a first terminal of the transistor 403*a*, the potentials thereof are high. Since the transistor 401*a* and the transistor 403*a* are p-channel transistors, the absolute value of a potential difference (Vgs) between gate and source of each of the transistor 401*a* and the transistor 403*a* is large. Accordingly, the size (e.g., channel width W) of each of the transistor 401*a* and the transistor 403*a* can be small. On the other hand, since a negative voltage is input to a first terminal of the transistor 402*a* and a first terminal of the transistor 404*a*, the potentials thereof become low. Since the transistor 402*a* and the transistor 404*a* are n-channel transistors, a potential difference (Vgs) between gate and source of each of the transistor 402*a* and the transistor 404*a* becomes large. Accordingly, the size (e.g., channel width W) of each of the transistor 402*a* and the transistor 404*a* can be small.

Note that in order to make switching noise of the first analog signal approximately the same as that of the second analog signal, for example, the ratio of W/L of the transistor 401*a* and the ratio of W/L of the transistor 403*a* are preferably the same. Accordingly, in the case where the digital-analog converter portion 100 shown in FIG. 8C is used for a display device, the first subpixel and a second subpixel express gray levels in accordance with respective signals with approximately the same switching noise. Therefore, the effect due to the switching noise of the analog signals can be suppressed. However, this embodiment is not limited to this.

Note that for example, the ratio of W/L of the transistor 402*a* and the ratio of W/L of the transistor 404*a* are preferably the same, like the transistor 401*a* and the transistor 403*a*. However, this embodiment is not limited to this.

Note that in the case where the circuits 202p_1, 202n_1, 202p_2, and 202n_2 each includes a transistor, the ratio of W/L of the transistor is preferably lower than the ratios of W/L of the transistors 401*a* to 404*a*. However, this embodiment is not limited to this.

As described above, since the digital-analog converter portion of this embodiment can convert one digital signal into a plurality of analog signals, a look-up table can be unnecessary. Therefore, heat generation or an increase in power consumption, or the like due to reading a look-up table from a memory element can be prevented.

Further, for example, in the case where a video signal is generated in a display device by using the digital-analog converter portion of this embodiment, a portion for generating the video signal and a pixel portion can be formed over the same substrate. Accordingly, since the number of connection between a panel and an external component can be reduced, poor connection in the connection portion of the panel and the external component can be suppressed, whereby improvement in reliability, an increase in yield, reduction in production cost, high-definition, or the like can be achieved.

(Embodiment 5)

In this embodiment, the case where the digital-analog converter portion 100 described in Embodiments 1 to 4 is used for a display device will be described. Note that for example, the case where a digital-analog converter portion which converts one digital signal into two analog signals will be described with reference to FIG. 9A.

The display device includes a pixel 502 which includes the digital-analog converter portion 100, a circuit 501_1, a circuit 501_2, a first subpixel 502_1, and a second subpixel 502_2.

The digital-analog converter portion 100 is connected to the wiring group 111, the wiring group 112_1, the wiring group 112_2, the wiring 113_1, and the wiring 113_2. The circuit 501_1 is connected to the wiring group 112_1. The circuit 501_2 is connected to the wiring group 112_2. The first subpixel 502_1 is connected to the wiring 113_1. The second subpixel 502_2 is connected to the wiring 113_2.

The circuit 501_1 generates a plurality of voltages and inputs the plurality of voltages to the digital-analog converter portion 100 through the wiring group 112_1. The circuit 501_2 generates a plurality of voltages and input the plurality of voltages to the digital-analog converter portion 100 through the wiring group 1122.

Note that the plurality of voltages generated by the circuit 501_1 corresponds to the first voltage group and the plurality of voltages generated by the circuit 501_2 corresponds to the second voltage group.

Note that the circuit 501_1 and the circuit 5012 can function as a first reference driver and a second reference driver, respectively.

As described in Embodiments 1 to 4, the digital-analog converter portion 100 generates a first analog signal and a second analog signal in accordance with a digital signal with N bits, an output voltage (e.g., the first voltage group) of the circuit 501_1, and an output voltage (e.g., the second voltage group) of the circuit 5012. Then, the first analog signal is input to the first subpixel 502_1 through the wiring 113_1, so that the gray level of the first subpixel 502_1 is controlled. The second analog signal is input to the second subpixel 502_2 through the wiring 113_2, so that the gray level of the second subpixel 502_2 is controlled.

The first subpixel 502_1 expresses a gray level with respect to the first analog signal and the second subpixel 502_2 expresses a gray level with respect to the second analog signal. For example, in the case where the first subpixel 502_1 and the second subpixel 502_2 each include a liquid crystal element, the orientation of the liquid crystal element included in the first subpixel 502_1 is changed in accordance with the first analog signal, whereby the transmittance of the liquid crystal element is changed. Similarly, the orientation of the liquid crystal element included in the second subpixel 502_2 is changed in accordance with the second analog signal, whereby the transmittance of the liquid crystal element is changed. For example, in the case where the values of the first analog signal and the second analog signal are different from each other, the orientation state of the liquid crystal element included in the first subpixel 502_1 and the orientation state of the liquid crystal element included in the second subpixel 502_2 are different from each other. Accordingly, improvement in viewing angle characteristics can be achieved.

Note that a variety of circuits can be used for the circuit 501_1 and the circuit 501_2 as long as the circuit has a structure which is capable of generating a plurality of voltages. For example, a structure in which a plurality of resistor elements is connected in series can be employed. In examples shown in FIGS. 9B and 9C, the circuit 501_1 includes a plurality of resistor elements of resistor elements 501_11 to 501_1M, and the circuit 501_2 includes a plurality of resistor elements of resistor elements 501_21 to 501_2M. The resistor elements 501_11 to 501_1M are connected in series between a power supply V1 and a power supply V2. The resistor elements 501_21 to 501_2M are connected in series between a power supply V3 and a power supply V4. The resistor elements 501_11 to 501_1M generate a plurality of voltages (the first voltage group) by dividing a voltage supplied from the power supply V1 and a voltage supplied from the power supply V2. The resistor elements 501_21 to 501_2M generate a plurality of voltages (the second voltage group) by dividing a voltage supplied from the power supply V3 and a voltage supplied from the power supply V4. The first voltage group and the second voltage group depend on the resistance value of a resistor element and a power supply voltage.

Note that in order to reduce the number of power supply and wirings, the circuit 501_1 and the circuit 501_2 can share a power supplies, for example. In a specific example, in the case where the power supply V1 and the power supply V3 are shared, the resistor elements 501_11 to 501_1M are connected in series between the power supply V1 and the power supply V2. Then, the resistor element 501_21 to 501_2M are connected in series between the power supply V1 and the power supply V4.

Note that in order to freely set the characteristics of the first voltage group, one of the resistor elements 501_11 to 501_1M or some of them can be variable resistor elements, for example. Similarly, in order to freely set the characteristics of the second voltage group, one of the resistor elements 501_21 to 501_2M or some of them can be variable resistor elements, for example.

Note that in order to freely set the characteristics of the first voltage group and the second voltage group, a voltage of the power supply V1, a voltage of the power supply V2, a voltage of the power supply V3, or a voltage of the power supply V4 can be a variable power supply. As an example, a variable power supply which selects any one of a plurality of power supplies can be given. Each of the plurality of power supplies is connected to a resistor element (e.g., the resistor element 501_11) through a switch. Then, by controlling on and off of each switch, a voltage to be supplied is controlled.

Figure 9B:
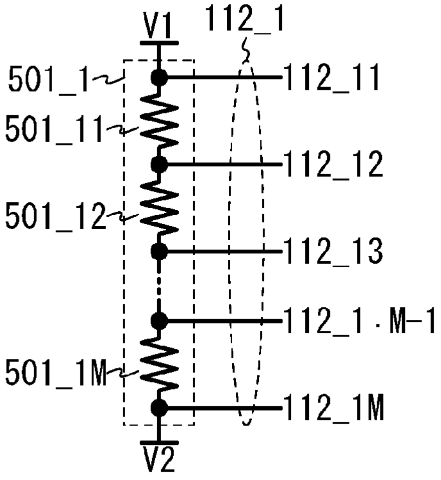
Figure 9C:
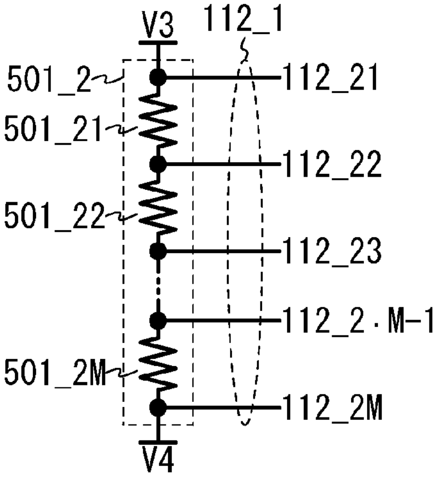
Figure 10A:
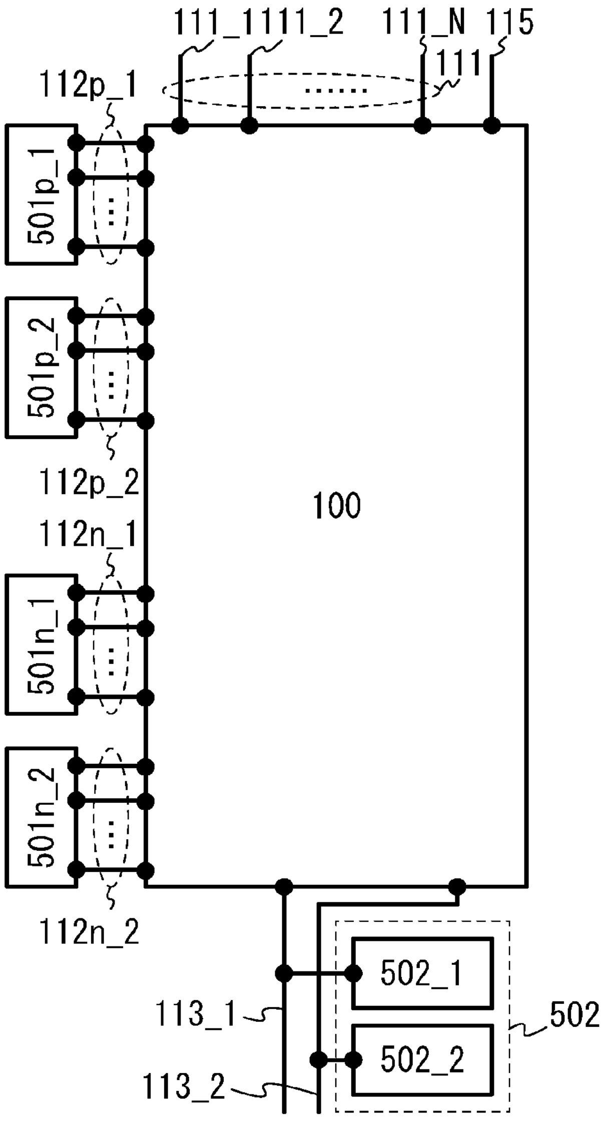
FIGS. 10A and 10B are diagrams illustrating a circuit of one embodiment of this invention.

Note that in the case where the polarity of the first analog signal and the polarity of the second analog signal are separately set, a circuit 501p_1 which generates a positive first voltage group, a circuit 501n_1 which generates a negative second voltage group, a circuit 501p_2 which generates a positive first voltage group, and a circuit 501n_2 which generates a negative second voltage group are used, as shown in one example in FIG. 10A. For example, like the circuit 501_1 or the circuit 501_2 shown in FIGS. 9B and 9C, each of such circuits has a structure in which a plurality of resistor elements is connected in series between two power supplies. Note that in order to output a positive voltage group, for example, at least one of power supply voltages used for the circuit 501p_1 and the circuit 501p_2 is preferably made to be higher than a common voltage. On the other hand, in order to output a negative voltage group, for example, at least one of power supply voltages used for the circuit 501 n_1 and the circuit 501n_2 is preferably made to be lower than the common voltage.

Note that the circuit 501p_1 and the circuit 501n_1 can be collectively denoted as the circuit 501_1 and the circuit 501p_2 and the circuit 501n_2 can be collectively denoted as the circuit 501_2. In this case, for example, the circuit 501_1 and the circuit 501_2 each generate both of the positive voltage group and the negative voltage group.

Figure 10B:
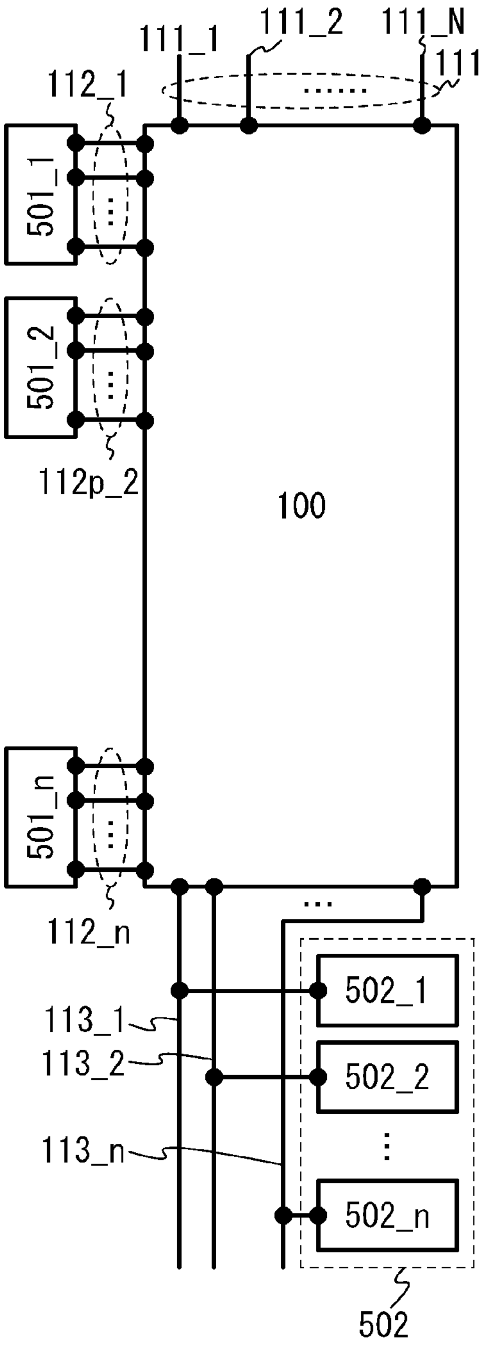

Note that in the case where a digital signal with N bits is converted into n analog signals, the circuits 501_1 to 501_n are used as shown in one example in FIG. 10B. The circuits 501_1 to 501_n each generate a plurality of voltages and output the plurality of voltages to the digital-analog converter portion 100. For example, like the circuit 501_1 or the circuit 501_2 shown in FIGS. 9B and 9C, each of the circuits 501_1 to 501_n has a structure in which a plurality of resistor elements is connected in series between two power supplies. The digital-analog converter portion 100 generates the n analog signals in accordance with n voltage groups and the digital signal with N bits. Then, the digital-analog converter portion 100 input the n analog signals to n subpixels 502_1 to 502_n. For example, an ith (i is one of 1 to n) analog signal is output to a subpixel 502_i.

Figure 9A:
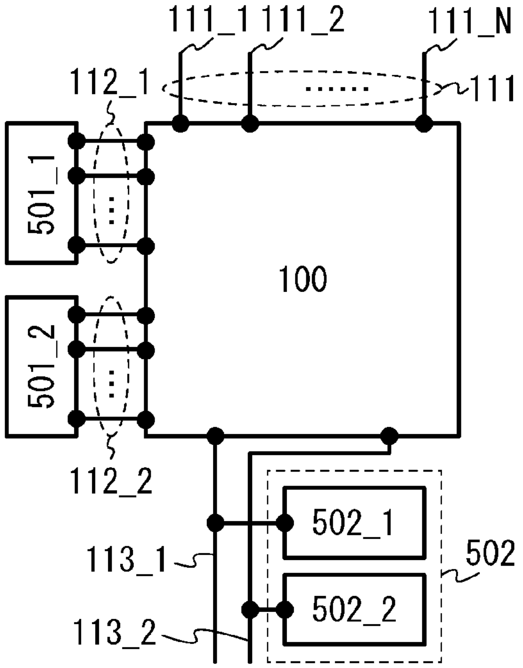
FIGS. 9A to 9C are diagrams illustrating a circuit of one embodiment of this invention.

Next, one example of a display device in more detail than that shown in FIG. 9A will be described with reference to FIG. 11A.

The display device includes a signal line driver circuit 601, a scanning line driver circuit 602, a pixel portion 603, the circuit 501_1, and the circuit 501_2. The signal line driver circuit 601 includes a shift register 621, a first latch portion 622, a second latch portion 623, a plurality of digital-analog converter portions 100, and a buffer portion 625. The pixel portion 603 includes a plurality of pixels 605. The plurality of pixels 605 each includes a first subpixel 606*a* and a second subpixel 606*b*.

The first subpixel 606*a* and the second subpixel 606*b* each has means for storing a signal written.

First signal lines S1_1 to S1_m and second signal lines S2_1 to S2_m are provided by being extended from the signal line driver circuit 601 in column direction.

Scanning lines G1 to Gn are provided by being extended from the scanning driver circuit 602 in row direction.

Note that the first signal lines S1_1 to S1_m, the second signal lines S2_1 to S2_m, and the scanning lines G1 to Gn can function as first signal lines, second signal lines, and third signal lines.

Note that a new wiring such as a capacitor line, a power supply line, a new scanning line, or a new signal line can be additionally provided, depending on the structure of the pixel. For example, the capacitor line is provided in parallel with the scanning lines G1 to Gn and a certain level of voltage is applied to the capacitor line in many cases. However, a signal is input to the capacitor line in some cases.

The pixels 605 are provided in matrix corresponding to the first signal lines S1_1 to S1_m, the second signal lines S2_1 to S2_m, and the scanning lines G1 to Gn, respectively. The first subpixel 606*a* is connected to a first signal line S1_j (one of the first signal lines S1_1 to S1_m) and a scanning line Gi (one of the scanning lines G1 to Gn). The second subpixel 606*b* is connected to a second signal line S2_j (any one of the second signal lines S2_1 to S2_m) and a scanning line Gi (any one of the scanning lines G1 to Gn).

A start pulse (SSP), a clock signal (SCK), and an inverted clock signal (SCKB) are input to the shift register 621. The shift register 621 outputs a sampling pulse to the first latch portion 622 in accordance with such a signal.

Note that as the shift register 621, for example, a counter, a decoder, or the like can be used as long as it can output a sampling pulse.

The sampling pulse and a video signal (Vdata) are input to the first latch portion 622. The first latch portion 622 sequentially stores a video signal in each column in accordance with the sampling pulse. When storing of a video signal in the last column is finished, the first latch portion 622 outputs the stored video signals in respective columns to the second latch portion 623 all at one time. Note that the video signal (Vdata) corresponds to the digital signal with N bits described in Embodiments 1 to 4.

The video signals and a latch pulse (LAT_Pulse) are input to the second latch portion 623 from the first latch portion 622. The second latch portion 623 stores the video signals input from the first latch portion 622 all at one time in accordance with the latch pulse. After that, the second latch portion 623 outputs the video signals to the plurality of digital-analog converter portion 100 all at one time.

Note that for example, by using an output signal, a start pulse, or the like of the shift register as a latch pulse, the latch pulse can be omitted.

Note that a video signal output from each column of the second latch portion 623 in each column corresponds to, for example, the digital signal with N bits described in Embodiments 1 to 4.

The plurality of analog converter portion 100 each convert a video signal into a first analog signal and a second analog signal as described in Embodiments 1 to 4. Then, the plurality of digital-analog converter portion 100 each write the first analog signal to the first subpixel 502_1 through the buffer portion 625 and the second analog signal to the second subpixel 502_2 through the buffer portion 625.

Here, in order to make the amplitude voltage of the video signal low, for example, the first latch portion 622 and/or the second latch portion 623 can have a level-shift function or a level shifter. In this case, the amplitude voltage of the video signal input to the first latch portion 622 is, for example, lower than that of the video signal output from each column of the first latch portion 622 in each column or that of the video signal output from the second latch portion 623 in each column. Accordingly, for example, the driving voltage of the shift register 621, the first latch portion 622, or the second latch portion 623 can be low, whereby reduction in power consumption can be achieved.

Next, one example of the operation of the display device will be described with reference to FIG. 11B. One example of a timing chart in FIG. 11B shows one frame period corresponding to a period when an image of one screen is displayed. In this one frame period, rows of pixels are sequentially selected from first to nth rows. The cycle of one frame period is desirably equal to or less than 1/60 sec. (equal to or more than 60 Hz) so that flickering is not sensed by a viewer of an image. The cycle of one frame period is more desirably equal to or less than 1/120 sec. (frequency is equal to or more than 120 Hz). The cycle of one frame period is still more desirably equal to or less than 1/180 sec. (frequency is equal to or more than 180 Hz). However, in the case where a frame frequency is high, a frame frequency in the display device and the frame frequency of original image data do not correspond to each other in some cases. Therefore, image data needs to be compensated. For example, the image data is compensated by detecting a motion vector. Thus, display with a high frame frequency can be performed. In this manner, the motion of the image is smoothly displayed and display with a few afterimages can be performed.

The scanning line driver circuit 602 outputs scanning signals to the scanning lines G1 to Gn in response to a start pulse (GSP), a clock signal (GCK), and an inverted clock signal (GCKB). The first to nth rows of the pixels are sequentially selected in accordance with the scanning signals. A video signal can be written to the pixels in the selected row. Every time the row of these pixels is selected, the signal line driver circuit 601 writes the first analog signal to the first subpixel 606*a* and the second analog signal to the second subpixel 606*a*. Note that a period when the pixels in one row are selected is referred to as one gate selecting period.

Figure 11A:
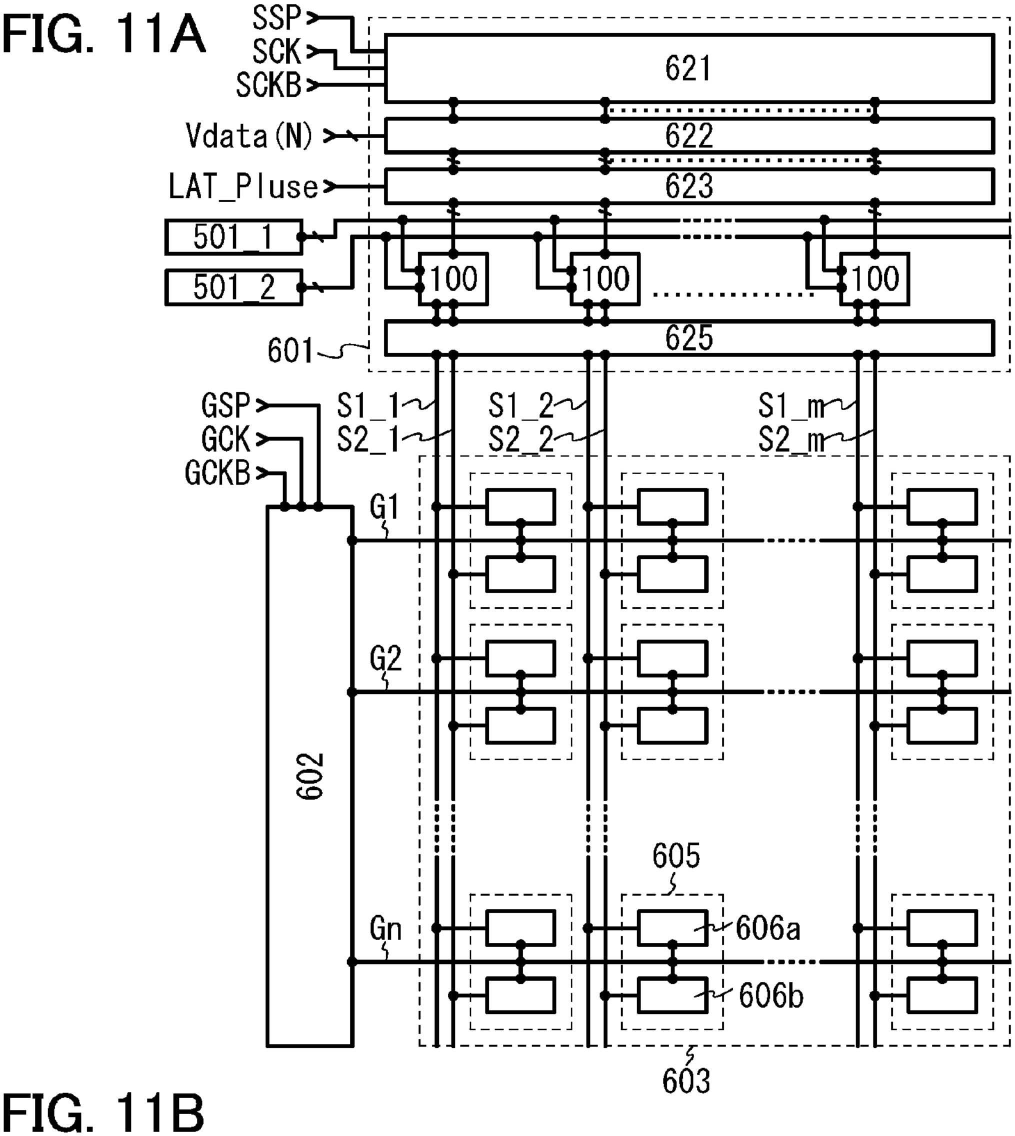
FIGS. 11A and 11B are diagrams illustrating a circuit and a driving method of one embodiment of this invention.
Figure 11B:
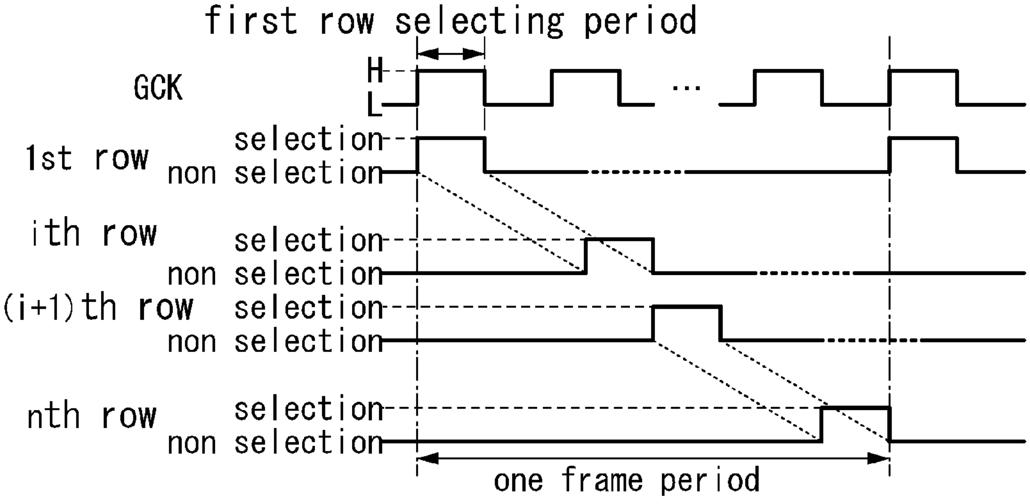

As described above, since each of the digital-analog converter portions 100 in the display device shown in FIG. 11A can convert one digital signal into a plurality of analog signals, the amount of data of a video signal does not increase even though the pixel is divided into a plurality of subpixels. Accordingly, the scale of the circuits for processing a video signal (e.g., the shift register, the first latch portion, and the second latch portion) can be small.

Further, in the display device shown in FIG. 11A, since a look-up table, that is, a memory portion is not necessary for converting one digital signal into the plurality of analog signals, the pixel portion and peripheral circuits thereof (e.g., the signal line driver circuit, the scanning line driver circuit, and the reference driver) can be easily formed over the same substrate.

Note that the structure of the signal line driver circuit 601 is not limited to the structure in FIG. 11A. For example, in the case where the current capability of the digital-analog converter portion 100 is high, the buffer portion 625 can be omitted. In another example, in the case where the voltage groups generated in the circuit 501_a and the circuit 501_2 are input to the digital-analog converter portion 100 through a buffer, the buffer portion 625 can be omitted. For example, in the case where the number of voltages in the voltage group is smaller than the number of the signal lines, the number of buffers is reduced. Therefore, the voltage groups generated in the circuit 501_1 and the circuit 501_2 are preferably input to the digital-analog converter portion 100 through the buffer.

Figure 12A:
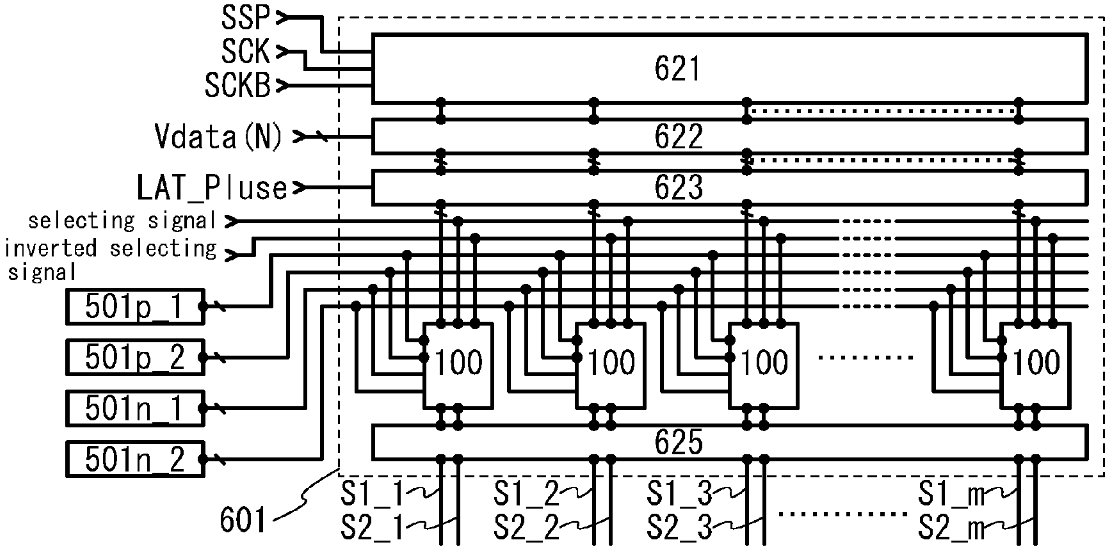
FIGS. 12A and 12B are diagrams illustrating a circuit of one embodiment of this invention.

Note that in order to realize dot inversion drive in each pixel, one example of the signal line driver circuit shown in FIG. 12A is used for the display device. For example, the positive first voltage group, the positive second voltage group, the negative first voltage group, and the negative second voltage group output from the circuit 501p_1, the circuit 501p_2, the circuit 501n_1, and the circuit 501n_2, respectively, which are described in FIG. 10A are input to the plurality of digital-analog converter portion 100. Further, a selecting signal and an inverted selecting signal are input alternately to each column. Then, in the selecting signal and the inverted selecting signal, an H signal and an L signal alternate with each other in every single gate selecting period. Accordingly, for example, by using a clock signal (GCK) and an inverted clock signal (GCKB) as the selecting signal and the inverted selecting signal, the selecting signal and the inverted selecting signal can be omitted. In this manner, the dot inversion drive can be realized.

Note that although one example of the signal line driver circuit in the case where dot inversion drive in each pixel is realized is described in FIG. 12A, this embodiment is not limited to this. For example, dot inversion drive in each subpixel may be realized. In this case, as described in Embodiments 3 and 4, the polarities of the first video signal and the second video signal can be made different from each other by switching the positive first voltage group and the negative second voltage group to each other and inputting each of them to the digital-analog converter portions 100.

In another example, the selecting signal and the inverted selecting signal can be alternately input to every n columns. By switching an H signal and an L signal to each other in the selecting signal and the inverted selecting signal in every n gate selecting periods, dot inversion drive in every n pixels can be realized.

In another example, by switching an H signal and an L signal to each other in the selecting signal and the inverted selecting signal in every single frame period, source line inversion drive can be realized.

Figure 12B:
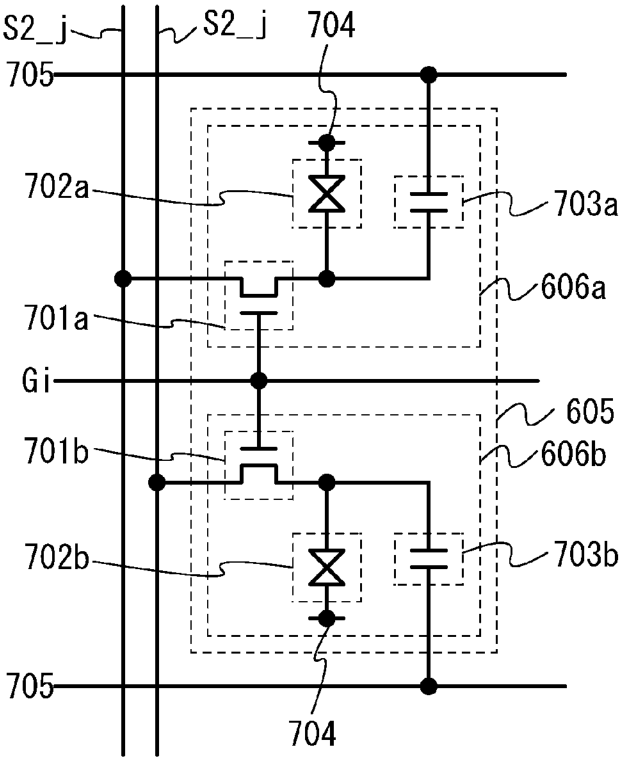

Next, one example in which the pixel 605 includes a liquid crystal element will be described with reference to FIG. 12B. The pixel 605 includes the first subpixel 606*a* including a transistor 701*a*, a liquid crystal element 702*a*, and a capacitor element 703*a* and the second subpixel 606*b* having a transistor 701*b*, a liquid crystal element 702*b*, and a capacitor element 703*b*. A first terminal of the transistor 701*a* is connected to the signal line S1_j, a second terminal of the transistor 701*a* is connected to one electrode of the liquid crystal element 702*a*, and gate of the transistor 701*a* is connected to the scanning line Gi. The capacitor element 703*a* is connected between the second terminal of the transistor 701*a* and a capacitor line 705. The other electrode of the liquid crystal element 702*a* corresponds to a common electrode 704. On the other hand, a first terminal of the transistor 701*b* is connected to the signal line S2_j, a second terminal of the transistor 701*b* is connected to one electrode of the liquid crystal element 702b, and gate of the transistor 701*b* is connected to the scanning line Gi. The capacitor element 703*b* is connected between the second terminal of the transistor 701*b* and a capacitor line 705. The other electrode of the liquid crystal element 702b corresponds to the common electrode 704.

For example, when an ith row is selected, an H signal is input to the scanning line Gi from the scanning line driver circuit 602, whereby the transistor 701*a* and the transistor 701*b* are turned on. Then, a first video signal is written to the first subpixel 606*a* from the signal line driver circuit 601 through the signal line S1_j and a potential difference between the first video signal and the capacitor line 705 is stored in the capacitor element 703*a*. Then, the liquid crystal element 704*a* has a transmittance which is based on the first video signal and expresses a gray level which is based on the first video signal. At the same time, a second video signal is written to the second subpixel 606*b* from the signal line driver circuit 601 through the signal line S2_j and a potential difference between the second video signal and the capacitor line 705 is stored in the capacitor element 703*b*. Then, the liquid crystal element 704*b* has a transmittance which is based on the second video signal and expresses a gray level which is based on the second video signal.

As described above, since the digital-analog converter portion of this embodiment can convert one digital signal into a plurality of analog signals by using the digital-analog converter portion described in Embodiments 1 to 4, a look-up table can be unnecessary. Therefore, heat generation, an increase in power consumption, or the like due to reading a look-up table from a memory element can be prevented.

Further, since a look-up table is not used, a portion for generating a video signal and a pixel portion can be formed over the same substrate. Accordingly, since the number of connection between a panel and an external component can be reduced, poor connection in the connection portion of the panel and the external component can be suppressed, whereby improvement in reliability, an increase in yield, reduction in production cost, high-definition, or the like can be achieved.

Further, the portion for generating the video signal and the pixel portion can be provided close together. Accordingly, a pathway through which the video signal is input to the pixel after the video signal is generated can be shortened. Therefore, noise generated in the video signal can be suppressed, so that display quality can be improved.

(Embodiment 6)

Embodiment 6 will describe a structure of a transistor.

Figure 13:
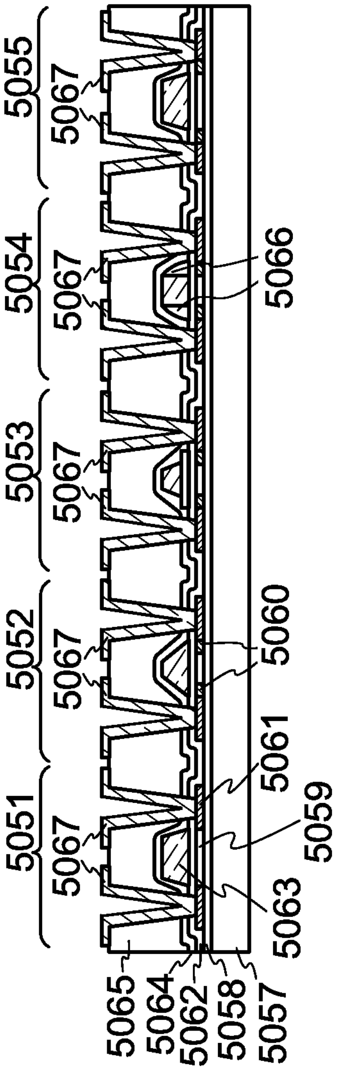
FIG. 13 is a cross-sectional view illustrating a transistor of one embodiment of this invention.

FIG. 13 is one example of cross-sectional view of transistors. However, the structure of the transistor is not limited to that shown in FIG. 13 and a variety of structures can be employed.

Note that although FIG. 13 shows one example of the cross-sectional view of the plurality of transistors juxtaposed, this is representation for describing the structure of the transistor. Therefore, the transistors are not needed to be actually juxtaposed as shown in FIG. 13 and can be separately formed as needed.

A transistor 5051 is one example of a single-drain transistor. A transistor 5052 is one example of a transistor having an angle which is tapered at a certain degrees or more in a gate electrode 5063. A transistor 5053 is one example of a transistor in which the gate electrode 5063 includes at least two layers and a lower gate electrode is longer than an upper gate electrode. A transistor 5054 is one example of a transistor including side walls 5066 which are in contact with the side surfaces of the gate electrode 5063. A transistor 5055 is one example of a transistor in which an LDD (Loft) region is formed in a semiconductor layer by doping with the use of a mask.

Then, layers constituting a transistor are each described.

As one example of a substrate 5057, a glass substrate made of barium borosilicate glass, aluminoborosilicate glass, or the like, a quartz substrate, a ceramic substrate, a metal substrate such as a stainless steel substrate, and the like can be given. Alternatively, a flexible synthetic resin such as plastic typified by polyethylene terephthalate (PET), polyethylene naphthalate (PEN), polyether sulfone (PES), and acrylic, or the like can be used.

An insulating film 5058 serves as a base film. As one example of the insulating film 5058, a single-layer structure or a layered structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y) can be given. In one example in the case where the insulating film 5058 is formed to have a two-layer structure, a silicon nitride oxide film and a silicon oxynitride film can be formed as a first insulating film and a second insulating film, respectively. In another example, in the case where the insulating film 5058 has a three-layer structure, a silicon oxynitride film, a silicon nitride oxide film, and a silicon oxynitride film can be formed as a first insulating film, a second insulating film, and a third insulating film, respectively.

As an example of each of a semiconductor layer 5059, a semiconductor layer 5060, and a semiconductor layer 5061, an amorphous semiconductor, a microcrystalline semiconductor, a semi-amorphous semiconductor (SAS), a polycrystalline semiconductor, a single-crystal semiconductor, or the like can be given.

Note that the semiconductor layer 5059, the semiconductor layer 5060, and the semiconductor layer 5061 preferably have impurity concentrations which are different from each other. For example, the semiconductor layer 5059, the semiconductor layer 5060, and the semiconductor layer 5061 function as a channel region, a lightly doped drain (LDD) region, and source and drain regions, respectively.

Like the insulating film 5058, the insulating film 5062 has, for example, a single-layer structure or a layered structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y).

As one example of the gate electrode 5063, a single-layer conductive film or an accumulated structure of a multi-layer (e.g., two-layer or three-layer) conductive film can be given. As one example of a conductive film used for the gate electrode 5063, a single film of an element such as tantalum (Ta), titanium (Ti), molybdenum (Mo), tungsten (W), chromium (Cr), silicon (Si), or the like; a nitride film containing the aforementioned element (typically, a tantalum nitride film, a tungsten nitride film, or a titanium nitride film); an alloy film in which the aforementioned elements are combined (typically, a Mo—W alloy or a Mo—Ta alloy); a silicide film containing the aforementioned element (typically, a tungsten silicide film or a titanium silicide film); and the like can be used.

Note that the aforementioned single element film, nitride film, alloy film, silicide film, or the like can have a single-layer structure or a layered structure.

As one example of an insulating film 5064, a single-layer structure or a layered structure of an insulating film containing oxygen or nitrogen, such as silicon oxide (SiOx), silicon nitride (SiNx), silicon oxynitride (SiOxNy) (x>y), or silicon nitride oxide (SiNxOy) (x>y); or a film containing carbon, such as DLC (diamond like carbon) can be given.

As one example of an insulating film 5065, a siloxane resin is given. Alternatively, an insulating film containing oxygen or nitrogen such as silicon oxide (SiOx), silicon nitride (SiNx), silicon oxynitride (SiOxNy), (x>y), or silicon nitride oxide (SiNxOy) (x>y) is given. Alternatively, a film containing carbon, such as DLC (Diamond Like Carbon) is given. Alternatively, an organic material such as epoxy, polyimide, polyamide, polyvinylphenol, benzocyclobutene, or acrylic is given. Alternatively, a single-layer structure or a layered structure thereof is given.

As one example of a siloxane resin, a resin including a Si—O—Si bond is given. For example, siloxane includes a skeleton structure of a bond between silicon (Si) and oxygen (O). An organic group containing at least hydrogen (for example, an alkyl group and aromatic hydrocarbon) is used as a substituent. A fluoro group may be included in the organic group.

Note that the insulating film 5065 can be provided to cover the gate electrode 5063 directly without providing the insulating film 5064.

As one example of a conductive film 5067, a single-layer conductive film or an accumulated structure of a multi-layer (e.g., two-layer or three-layer) conductive film can be given. Examples of a material for the conductive film 5067 include a single element film of an element such as Al, Ni, C, W, Mo, Ti, Pt, Cu, Ta, Au, or Mn, a nitride film of any of the elements, an alloy film in which any of the elements are combined, a silicide film of any of the elements, and the like. As one example of an alloy film in which any of the elements are combined, an Al alloy containing C and Ti, an Al alloy containing Ni, an Al alloy containing C and Ni, an Al alloy containing C and Mn, or the like is given.

Note that in the case where the above-described conductive film is formed to have a layered structure, for example, a structure in which Al is sandwiched between Mo, Ti, or the like is preferable. Accordingly, the resistance of Al to heat or a chemical reaction can be enhanced.

As one example of the sidewalls 5066, silicon oxide (SiOx) or silicon nitride (SiNx) can be used.

In this manner, the structure of the transistor described in this embodiment can be employed for the transistor included in the digital-analog converter portion described in Embodiments 1 to 4. The digital-analog converter portion described in Embodiments 1 to 4 can generate signals corresponding to respective subpixels without using a look-up table. Therefore, heat generation, an increase in power consumption, or the like due to reading a look-up table from a memory element can be prevented.

Further, since a look-up table is not used, a portion for generating a video signal and a pixel portion can be formed over the same substrate. Accordingly, since the number of connection between a panel and an external component can be reduced, improvement in reliability, an increase in yield, reduction in cost, high-definition, or the like can be achieved.

(Embodiment 7)

In this embodiment, one example of a formation method of a semiconductor layer will be described. The formation method of the semiconductor layer in this embodiment can be employed for the structure and the manufacturing method of the transistor described in Embodiment 4.

Figure 14A:
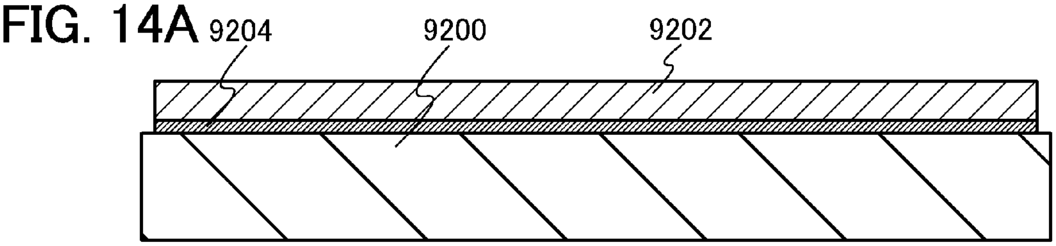
FIGS. 14A to 14E are cross-sectional views illustrating a transistor of one embodiment of this invention.

FIG. 14A shows an SOI substrate of this invention. In FIG. 14A, a base substrate 9200 is a substrate having an insulating surface or an insulating substrate, and a variety of glass substrates that are used in the electronics industry, such as aluminosilicate glass, aluminoborosilicate glass, or barium borosilicate glass, can be used. Alternatively, a quartz glass substrate or a semiconductor substrate such as a silicon wafer can be used. An SOI layer 9202 is a single-crystal semiconductor, and single-crystal silicon is typically applied thereto. Alternatively, a crystalline semiconductor layer which is formed using silicon, germanium, or a compound semiconductor such as indium phosphide or gallium arsenide, which can be separated from a single-crystal semiconductor substrate or a polycrystalline semiconductor substrate using a hydrogen ion implantation separation method, may be applied.

Between the base substrate 9200 and the SOI layer 9202 described above, a bonding layer 9204 which has a smooth surface and forms a hydrophilic surface is provided. A silicon oxide film is suitable for the bonding layer 9204. In particular, a silicon oxide film formed by a chemical vapor deposition method using an organosilane gas is preferable. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

The bonding layer 9204 which has a smooth surface and forms a hydrophilic surface is provided with a thickness of 5 to 500 nm. With such a thickness, roughness of a surface on which the bonding layer 9204 is formed can be smoothed and smoothness of a growth surface of the film can be ensured. In addition, distortion between the bonding substrate 9204 and a substrate to be bonded to the bonding substrate 9204 can be reduced. The base substrate 9200 may be provided with a similar silicon oxide film. That is, when the SOI layer 9202 is bonded to a substrate having an insulating surface or the insulating base substrate 9200, the base substrate 9200 and the SOI layer 9202 can be firmly bonded to each other when the bonding layer 9204 formed of a silicon oxide film which is preferably formed using organosilane as a material is provided on either one or both surfaces of the base substrate 9200 and the SOI layer 9202 which are to be bonded.

A method for manufacturing such an SOI substrate is described with reference to FIGS. 14B to 14E.

Figure 14B:
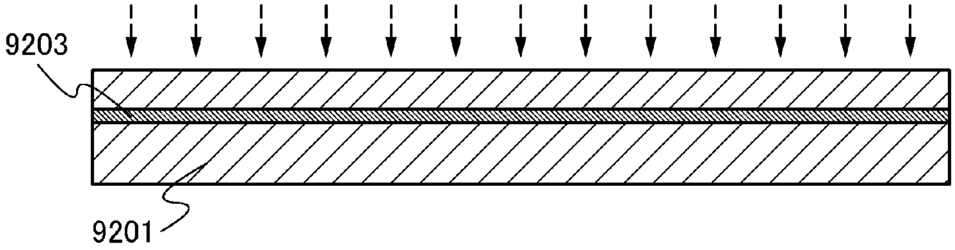

A semiconductor substrate 9201 shown in FIG. 14B is cleaned, and ions which are accelerated by an electric field are introduced to reach a predetermined depth from the surface of the semiconductor substrate 9201 to form a ion doping layer 9203. Introduction of ions is conducted in consideration of the thickness of an SOI layer which is to be transferred to a base substrate. The thickness of the SOI layer is 5 to 500 nm, preferably 10 to 200 nm. Accelerating voltage for introducing ions into the semiconductor substrate 9201 is set in consideration of such a thickness. The ion doping layer 9203 is formed by introducing ions of hydrogen, helium, or halogen typified by fluorine. In this case, it is preferable to use one ion or plural ions formed of the same atoms which have different mass. In the case of introducing hydrogen ions, the hydrogen ions preferably include $H^+$, $H_2^+$, and $H_3^+$ ions with a high percentage of $H_3^+$ ions. In the case of introducing hydrogen ions, introducing efficiency can be increased and introducing time can be shortened by making $H^+$, $H_2^+$, and $H_3^+$ ions contained and increasing the percentage of $H_3^+$ ions. With such a structure, separation can be easily performed.

In the case of introducing ions at a high dose, the surface of the semiconductor substrate 9201 is roughened in some cases. Therefore, a protective film against introduction of ions, such as a silicon nitride film, a silicon nitride oxide film, or the like with a thickness of 50 to 200 nm may be provided on a surface to which ions are introduced.

Figure 14C:
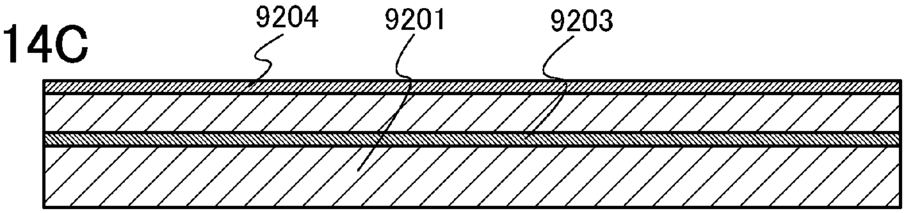

Next, as shown in FIG. 14C, a silicon oxide film is formed over a surface to which the base substrate is bonded as a bonding layer 9204. As the silicon oxide film, a silicon oxide film formed by a chemical vapor deposition method using an organiosilane gas as described above is preferably used. Alternatively, a silicon oxide film formed by a chemical vapor deposition method using a silane gas can be used. In film formation by a chemical vapor deposition method, film formation temperature at, for example, 350° C. or lower, at which degassing of the ion doping layer 9203 formed in a single-crystal semiconductor substrate does not occur, is used. Heat treatment for separating an SOI layer from a single-crystal or polycrystalline semiconductor substrate is performed at a higher temperature than the film formation temperature.

Figure 14D:
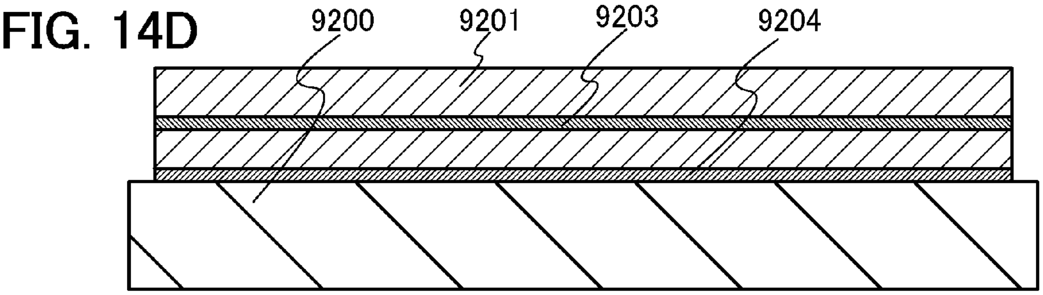

FIG. 14D shows a mode in which a surface of the base substrate 9200 and a surface of the semiconductor substrate 9201, on which the bonding layer 9204 is formed are disposed in contact to be bonded to each other. The surfaces which are to be bonded are cleaned sufficiently. Then, when the base substrate 9200 and the bonding layer 9204 are disposed in contact, a bond is formed. This bond is formed by Van der Waals forces. When the base substrate 9200 and the semiconductor substrate 9201 are pressed against each other, a stronger bond can be formed by hydrogen bonding.

In order to form a favorable bond, the surfaces may be activated. For example, the surfaces which are to form a bond are irradiated with an atomic beam or an ion beam. When an atomic beam or an ion beam is used, an inert gas neutral atom beam or inert gas ion beam of argon or the like can be used. Alternatively, plasma irradiation or radical treatment is performed. With such a surface treatment, a bond between different kinds of materials can be easily formed even at a temperature of 200 to 400° C.

After the base substrate 9200 and the semiconductor substrate 9201 are bonded to each other with the bonding layer 9204 interposed therebetween, heat treatment or pressure treatment is preferably performed. When heat treatment or pressure treatment is performed, bonding strength can be increased. Temperature of heat treatment is preferably lower than or equal to the upper temperature limit of the base substrate 9200. Pressure treatment is performed so that pressure is applied in a perpendicular direction to the bonded surface, in consideration of pressure resistance of the base substrate 9200 and the semiconductor substrate 9201.

Figure 14E:
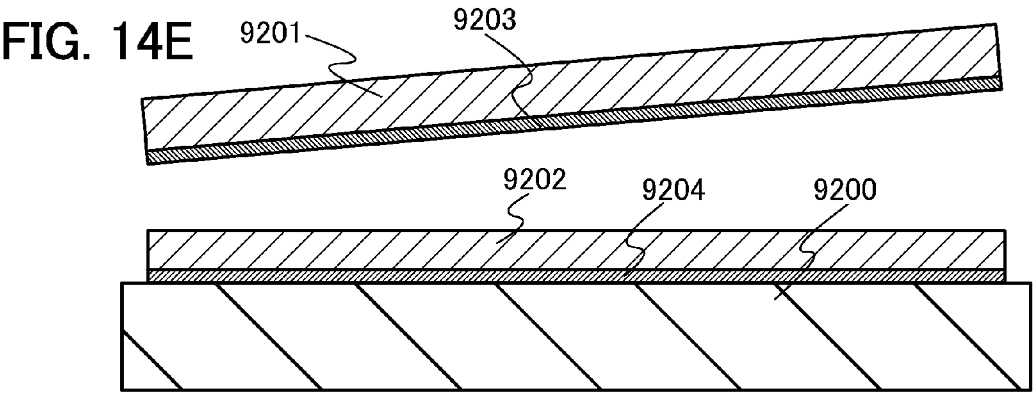

In FIG. 14E, after the base substrate 9200 and the semiconductor substrate 9201 are bonded to each other, heat treatment is performed to separate the semiconductor substrate 9201 from the base substrate 9200 with the ion doping layer 9203 used as a cleavage surface. The heat treatment is preferably performed at a temperature higher than or equal to the film formation temperature of the bonding layer 9204 and lower than or equal to the upper temperature limit of the base substrate 9200. When the heat treatment is performed at, for example, 400 to 600° C., the volume of fine voids formed in the ion doping layer 9203 is changed, so that separation can be performed along the ion doping layer 9203. Since the bonding layer 9204 is bonded to the base substrate 9200, the SOI layer 9202 having the same crystallinity as the semiconductor substrate 9201 remains over the base substrate 9200.

In this manner, in accordance with this mode, even if a substrate with an upper temperature limit of 700° C. or lower, such as a glass substrate, is used as the base substrate 9200, the SOI layer 9202 having strong adhesiveness of a bonded portion can be obtained. As the base substrate 9200, various glass substrates which are used in the electronics industry and are referred to as non-alkali glass substrates, such as aluminosilicate glass substrates, aluminoborosilicate glass substrates, and barium borosilicate glass substrates can be used. That is, a single-crystal semiconductor layer can be formed over a substrate which is longer than one meter on a side. When such a large-area substrate is used, not only a display device such as a liquid crystal display but also a semiconductor integrated circuit can be manufactured.

The transistor formed using the above-described semiconductor layer can be formed over a substrate which transmits light, such as a glass substrate. Accordingly, the pixel portion of the display device and the digital-analog converter portion described in Embodiment 1 can be formed over the same substrate.

The transistor formed using the above-described semiconductor layer has high mobility and small variations in characteristics. Therefore, by manufacturing the digital-analog converter portion described in Embodiment 1 with the use of the transistor, the layout area of the digital-analog converter portion can be made to be small.

In this manner, the structure of the transistor described in this embodiment can be employed for the transistor included in the digital-analog converter portion described in Embodiments 1 to 4. The digital-analog converter portion described in Embodiments 1 to 4 can generate signals corresponding to respective subpixels without using a look-up table. Therefore, heat generation, an increase in power consumption, or the like due to reading a look-up table from a memory element can be prevented.

Further, since a look-up table is not used, a portion for generating a video signal and a pixel portion can be formed over the same substrate. Accordingly, since the number of connection between a panel and an external component can be reduced, improvement in reliability, an increase in yield, reduction in cost, high-definition, or the like can be achieved.

(Embodiment 8)

In this embodiment, examples of electronic devices will be described.

FIGS. 15A to 15H and FIGS. 16A to 16D are diagrams illustrating electronic devices. These electronic devices can each include a housing 5000, a display portion 5001, a speaker 5003, an LED lamp 5004, an operation key 5005, a connecting terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 15A:
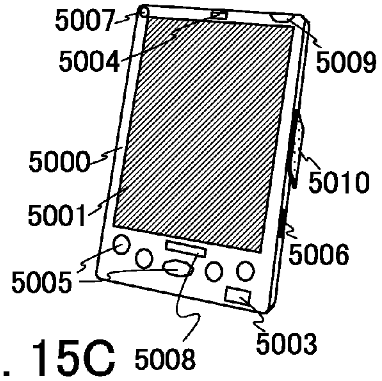
FIGS. 15A to 15H are diagrams each illustrating an electronic device of one embodiment of this invention.
Figure 15B:
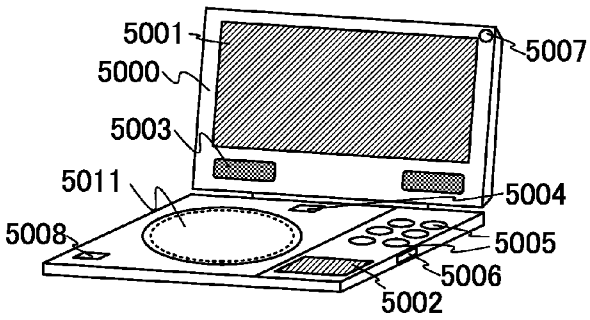
Figure 15C:
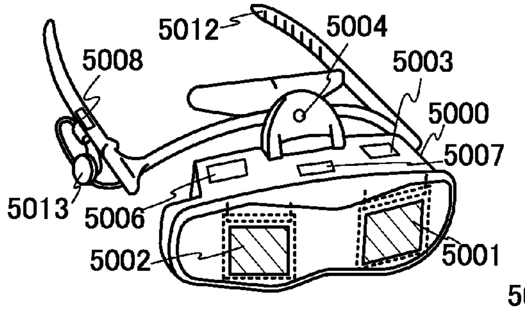
Figure 15D:
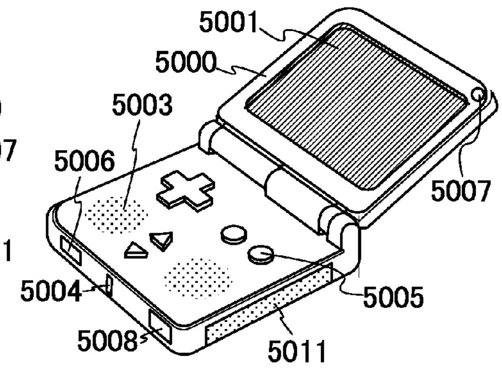
Figure 15E:
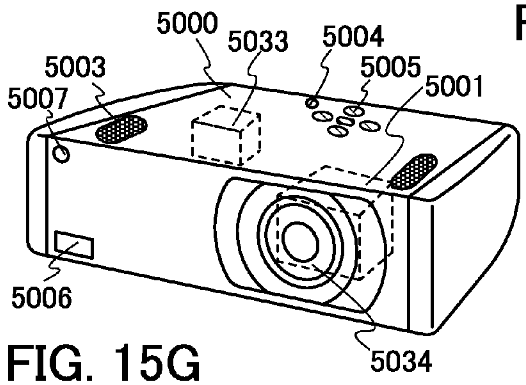
Figure 15F:
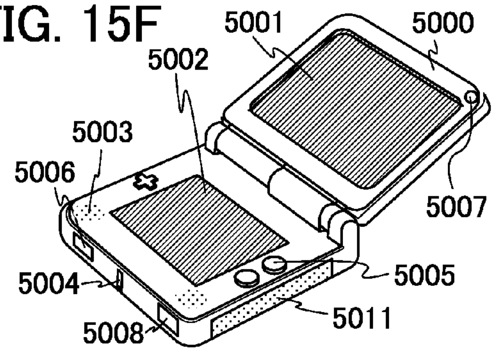
Figure 15G:
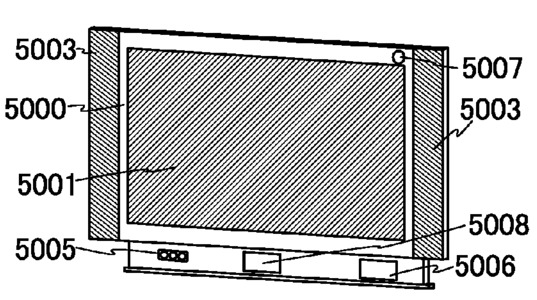
Figure 15H:
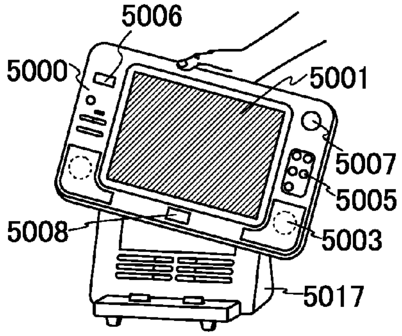
Figure 16A:
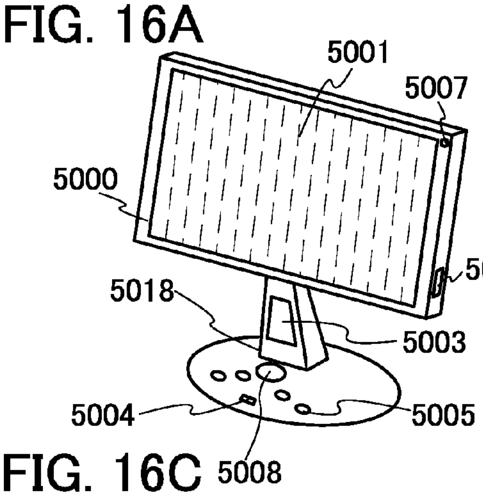
FIGS. 16A to 16H are diagrams each illustrating an electronic device of one embodiment of this invention.
Figure 16B:
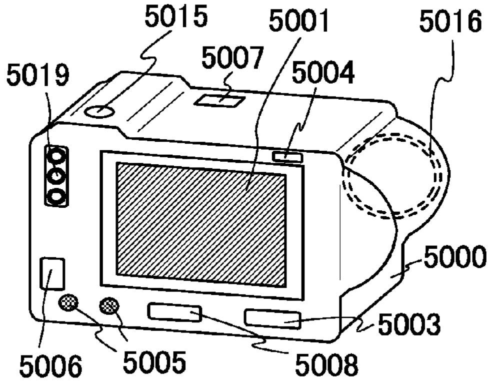
Figure 16C:
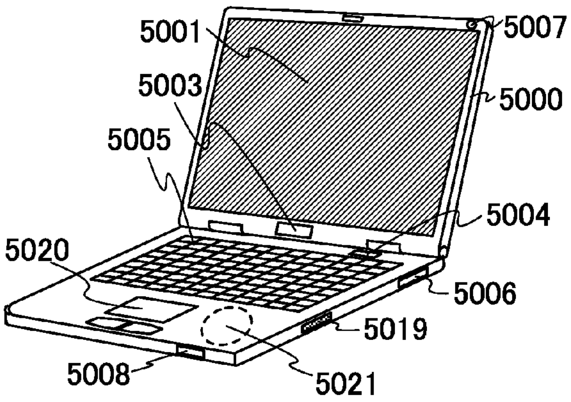
Figure 16D:
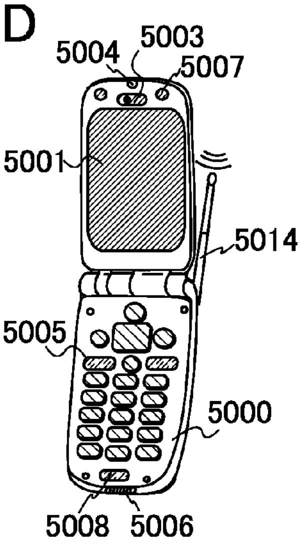

FIG. 15A is a mobile computer which can include a switch 5009, an infrared rays port 5010, and the like in addition to the above-described objects. FIG. 15B is a portable image reproducing device (e.g., a DVD reproducing device) provided with a memory medium which can include a second display portion 5002, a memory medium reading portion 5011, and the like in addition to the above-described objects. FIG. 15C is a goggle-type display which can include a second display portion 5002, a supporting portion 5012, an earphone 5013, and the like in addition to the above-described objects. FIG. 15D is a portable game machine which can include a memory medium reading portion 5011 and the like in addition to the above-described objects. FIG. 15E is a projector which can include a light source 5033, a projecting lens 5034, and the like in addition to the above-described objects. FIG. 15F is a portable game machine which can include a second display portion 5002, a memory medium reading portion 5011, and the like in addition to the above-described objects. FIG. 15G is a television receiver which can include a tuner, an image processing portion, and the like in addition to the above-described objects. FIG. 15H is a portable television receiver which can include a charger 5017 which can transmit and receive signals and the like in addition to the above-described objects. FIG. 16A is a display which can include a supporting board 5018 and the like in addition to the above-described objects. FIG. 16B is a camera which can include an external connecting port 5019, a shutter button 5015, an image receiver portion 5016, and the like in addition to the above-described objects. FIG. 16C is a computer which can include a pointing device 5020, an external connecting port 5019, a reader/writer 5021, and the like in addition to the above-described objects. FIG. 16D is a mobile phone which can include an antenna 5014, a tuner of one-segment partial reception service for mobile phones and mobile stations, and the like in addition to the above-described objects.

The electronic devices shown in FIGS. 15A to 15H and FIGS. 16A to 16D can have a variety of functions. For example, a function of displaying a variety of information (a still image, a moving image, a text image, and the like) on a display portion, a touch panel function, a function of displaying a calendar, date, time, and the like, a function for controlling a process with a variety of software (programs), a wireless communication function, a function of being connected to a variety of computer networks with a wireless communication function, a function of transmitting and receiving a variety of data with a wireless communication function, a function of reading program or data stored in a memory medium and displaying the program or data on a display portion, and the like can be given. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiver portion can have a function of shooting a still image, a function of shooting a moving image, a function of automatically or manually correcting a shot image, a function of storing a shot image in a memory medium (an external memory medium or a memory medium incorporated in the camera), a function of displaying a shot image on the display portion, or the like. Note that functions which can be provided for the electronic devices shown in FIGS. 15A to 15H and FIGS. 16A to 16D are not limited thereto, and the electronic devices can have a variety of functions.

The electronic devices described in this embodiment each include the display portion for displaying some sort of information. By using the display device described in Embodiment 5 for a display portion of an electronic device, improvement in viewing angle characteristics can be achieved. Since the display device described in Embodiment 5 can be driven with the small number of signals, the number of components of an electronic device can be reduced. Further, since the display device described in Embodiment 5 does not need a look-up table, an electronic device can be manufactured at low cost.

Next, applications of a semiconductor device will be described.

Figure 16E:
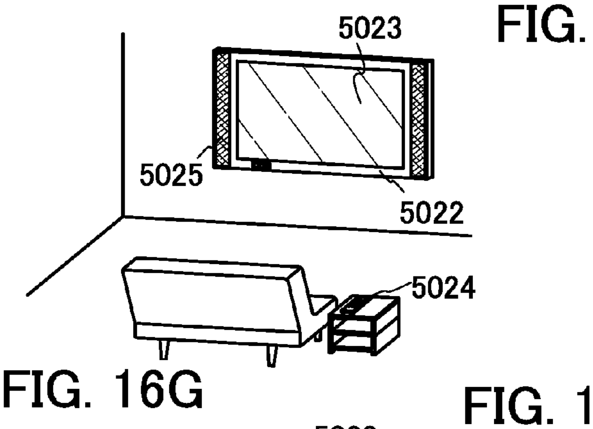

FIG. 16E shows an example in which a semiconductor device is provided so as to be integrated with a building. In FIG. 16E, a housing 5022, a display portion 5023, a remote controller device 5024 which is an operation portion, a speaker 5025, and the like are included. The semiconductor device is integrated with the building as a hung-on-wall type and can be provided without a large space for provision.

Figure 16F:
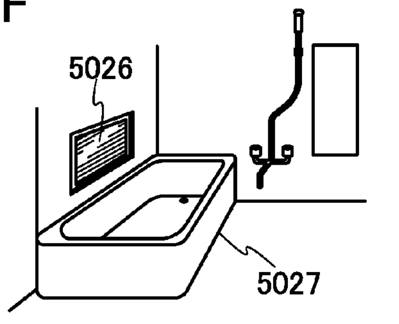

FIG. 16F shows another example in which a semiconductor device is provided so as to be integrated within a building. The display panel 5026 is integrated with a prefabricated bath 5027, so that a person who takes a bath can watch the display panel 5026.

Note that although this embodiment gives the wall and the prefabricated bath as examples of the building, this embodiment is not limited to them and the semiconductor device can be provided in a variety of buildings.

Next, an example in which the semiconductor device is provided so as to be integrated with a moving body will be shown.

Figure 16G:
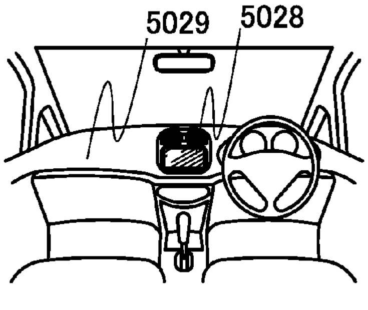

FIG. 16G shows an example in which the semiconductor device is provided in a vehicle. A display panel 5028 is provided in a body 5029 of the vehicle and can display information input from the operation of the body or the outside of the body on demand. Note that the display panel 5028 may have a navigation function.

Figure 16H:
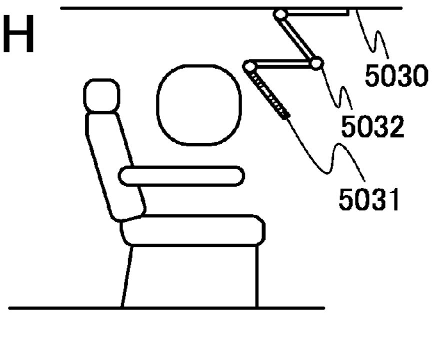

FIG. 16H shows an example in which the semiconductor device is provided so as to be integrated with a passenger airplane. FIG. 16H shows a usage pattern when a display panel 5031 is provided on a ceiling 5030 above a seat in the passenger airplane. The display panel 5031 is integrated with the ceiling 5030 through a hinge portion 5032, and a passenger can watch the display panel 5031 by extending and contracting the hinge portion 5032. The display panel 5031 has a function of displaying information when operated by the passenger.

Note that although this embodiment gives the body of the vehicle and the body of the plane as examples of the moving body, this embodiment is not limited thereto. The semiconductor device can be provided to a variety of moving bodies such as a two-wheel motor vehicle, a four-wheel vehicle (including a car, bus, and the like), a train (including a monorail, a railway, and the like), and a ship.

In this manner, the structure of the display device in the electronic device and the semiconductor device which are described in this embodiment can be employed for the display device provided with the digital-analog converter portion described in Embodiment 5. The digital-analog converter portion described in Embodiments 1 to 4 can generate signals corresponding to respective subpixels without using a look-up table. Therefore, heat generation or an increase in power consumption, or the like due to reading a look-up table from a memory element can be prevented.

Further, since a look-up table is not used, a portion for generating a video signal and a pixel portion can be formed over the same substrate. Accordingly, since the number of connection between a panel and an external component can be reduced, improvement in reliability, an increase in yield, reduction in cost, or high-definition can be achieved.

This application is based on Japanese Patent Application serial no. 2008-150608 filed with Japan Patent Office on Jun. 9, 2008, the entire contents of which are hereby incorporated by reference.

What is claimed is:

1. A liquid crystal display device comprising:

a pixel comprising a first to n-th (n is a natural number of 2 or more) subpixels each provided with an electrode for driving a liquid crystal element; and first to n-th circuits each having a function of converting a digital signal with N (N is a natural number of 2 or more) bits into an analog signal by using M (M is a natural number of 2 or more) different voltages supplied from a wiring group, wherein the first to n-th circuits are configured to convert the digital signal into first to n-th analog signals concurrently, respectively, wherein the first to n-th subpixels are configured to be controlled by a same scanning line, and wherein the first to n-th circuits are electrically connected to the first to n-th subpixels via different signal lines, respectively such that the first to n-th circuits input the first to n-th analog signals to the first to n-th subpixels, respectively.

2. The liquid crystal display device according to claim 1, wherein a wiring group electrically connected to the first to n-th circuits applies the M voltages which are different between the first to n-th circuits.

3. A liquid crystal display device comprising:

a pixel comprising a first subpixel and a second subpixel each provided with an electrode for driving a liquid crystal element; and a circuit having a function of converting a digital signal with N (N is a natural number of 2 or more) bits into a first analog signal and a second analog signal concurrently by using M (M is a natural number of 2 or more) different voltages supplied from a first wiring group and a second wiring group, wherein the first subpixel and the second subpixel are configured to be controlled by a same scanning line, and wherein the circuit is electrically connected to the first subpixel and the second subpixel via different signal lines such that the circuit inputs the first analog signal to the first subpixel and the second analog signal to the second subpixel.

4. The liquid crystal display device according to claim 3, wherein a wiring group electrically connected to the circuit supplies M voltages which are different between the first wiring group and the second wiring group.

5. A liquid crystal display device comprising:

a pixel comprising a first subpixel and a second subpixel each provided with an electrode for driving a liquid crystal element;

a first circuit having a function of decoding a first digital signal with N (N is a natural number of 2 or more) bits and converting the first digital signal into a second digital signal; and a second circuit and a third circuit each having a function of converting the second digital signal into an analog signal by using M (M is a natural number of 2 or more) different voltages supplied from a wiring group, wherein the second circuit and the third circuit are configured to convert the second digital signal into a first analog signal and a second analog signal concurrently, respectively, wherein the first subpixel and the second subpixel are configured to be controlled by a same scanning line, and wherein the second circuit and the third circuit are electrically connected to the first subpixel and the second subpixel via different signal lines, respectively such that the second circuit and the third circuit input the first analog signal and the second analog signal to the first subpixel and the second subpixel, respectively.

6. The liquid crystal display device according to claim 5, wherein a wiring group electrically connected to each of the second and the third circuit supplies M voltages which are different with respect to each of the second and the third circuit.

7. A liquid crystal display device comprising:

a first subpixel;

a second subpixel;

a first signal line electrically connected to the first subpixel;

a second signal line electrically connected to the second subpixel;

a first plurality of wirings to which a digital signal with a plurality of bits is input;

a first digital-analog converter circuit configured to convert the digital signal into a first analog signal and output the first analog signal to the first signal line; and a second digital-analog converter circuit configured to convert the digital signal into a second analog signal and output the second analog signal to the second signal line, wherein the first subpixel and the second subpixel are configured to be controlled by a same scanning line, wherein the first digital-analog converter circuit is electrically connected to the first subpixel via the first signal line such that the first digital-analog converter circuit inputs the first analog signal to the first subpixel, wherein the second digital-analog converter circuit is electrically connected to the second subpixel via the second signal line such that the second digital-analog converter circuit inputs the second analog signal to the second subpixel, wherein each of the first plurality of wirings is electrically connected to the first digital-analog converter circuit, and wherein each of the first plurality of wirings is electrically connected to the second digital-analog converter circuit.

8. The liquid crystal display device according to claim 7, further comprising:

a second plurality of wirings, each of the second plurality of wirings being supplied with a different voltage; and a third plurality of wirings, each of the third plurality of wirings being supplied with a different voltage, wherein each of the second plurality of wirings is electrically connected to the first digital-analog converter circuit, and wherein each of the third plurality of wirings is electrically connected to the second digital-analog converter circuit.

9. A liquid crystal display device comprising:

a first subpixel;

a second subpixel;

a first signal line electrically connected to the first subpixel;

a second signal line electrically connected to the second subpixel;

a first plurality of wirings to which a first digital signal with a plurality of bits is input;

a second plurality of wirings, each of the second plurality of wirings being supplied with a different voltage;

a third plurality of wirings, each of the third plurality of wirings being supplied with a different voltage;

a decoder circuit configured to generate a second digital signal with a plurality of bits in accordance with the first digital signal;

a first selector circuit configured to establish electrical continuity between the first signal line and one of the second plurality of wirings in accordance with the second digital signal; and a second selector circuit configured to establish electrical continuity between the second signal line and one of the third plurality of wirings in accordance with the second digital signal, wherein the first subpixel and the second subpixel are configured to be controlled by a same scanning line, wherein the first selector circuit is electrically connected to the first subpixel via the first signal line, wherein the second selector circuit is electrically connected to the second subpixel via the second signal line, and wherein each of the first plurality of wirings is electrically connected to the decoder circuit.

* * * * *